US008583511B2

(12) United States Patent  (10) Patent No.: US 8,583,511 B2
Hendrickson  (45) Date of Patent: Nov. 12, 2013

(54) SYSTEMS AND METHODS FOR STORING CUSTOMER PURCHASING AND PREFERENCE DATA AND ENABLING A CUSTOMER TO PRE-REGISTER ORDERS AND EVENTS

(75) Inventor: Bradley Marshall Hendrickson, Manchester, MO (US)

(73) Assignee: Bradley Marshall Hendrickson, Manchester, MO (US)

( * ) Notice: Subject to any disclaimer, the term of this patent is extended or adjusted under 35 U.S.C. 154(b) by 183 days.

(21) Appl. No.: 12/783,304

(22) Filed: May 19, 2010

(65) Prior Publication Data
US 2011/0040655 A1  Feb. 17, 2011

Related U.S. Application Data

(60) Provisional application No. 61/179,554, filed on May 19, 2009.

(51) Int. Cl.
*G06Q 30/00* (2012.01)

(52) U.S. Cl.
USPC ... 705/26.8; 705/14.4; 705/14.49; 705/14.65; 705/26.41; 705/26.9; 701/2; 701/36; 701/408

(58) Field of Classification Search
USPC .............. 705/14.4, 14.49, 14.51, 15–16, 705/26.1–27.2, 1.1, 14.57–14.58, 14.62, 705/14.65–14.67; 701/1–2, 23–24, 36, 300, 701/400
See application file for complete search history.

(56) References Cited

U.S. PATENT DOCUMENTS

| | | | |
|---|---|---|---|
| 5,502,806 | A | 3/1996 | Mahoney et al. |
| 5,918,014 | A | 6/1999 | Robinson |
| 5,930,764 | A | 7/1999 | Melchione et al. |
| 5,933,827 | A | 8/1999 | Cole et al. |

(Continued)

OTHER PUBLICATIONS

"3Com Honors Winners of Fourth Annual Retail Network Innovation Awards; E-Commerce and Web Technologies Transform Business for Creative Retailers" (excerpt).Business Wire , p. 1655 Apr. 18, 2000.*

(Continued)

*Primary Examiner* — William Allen

(57) ABSTRACT

A real time management system for marketing to customers and vendors with customer purchasing and preference data in specific consumer markets including restaurant, retail, travel, hospitality, entertainment, and combinations thereof. The management database allows the consumer to make Precision Purchasing™ transactions, reservation transactions, and Precision Gifting™ transactions via a web-based interface, POS based touch screen interface, and mobile device-based interface. The consumer profile database is comprised of mainly consumer inputted preference and consumer purchase data which is stored into each customer profile and can be accessed/verified with a GPS recognition of the customer's phone, biometric hand or finger scan, access card, retinal scan, password, key fob, or other terminal kiosk, touch screen, or mobile application of the like. Consumers may also gift dollars to each other's account using the customized, consumer authorized Precision Gifting™ system. All data inputted into the Precision Marketing™ system will be stored in each consumer's personal/business account. Only consumer-authorized parties may access the account holder's personal preference information for the purposes of Precision Gifting™ and Precision Purchasing™, but he/she may never access the customer's confidential information. All changes made to each profile and the purchase preference information will be updated in real-time. All reservations, fund transfers, purchases, and other transactions are stored in the central database system and used for the purposes of Precision Marketing™ and Precision Gifting™.

19 Claims, 78 Drawing Sheets

(56) References Cited

U.S. PATENT DOCUMENTS

| | | | |
|---|---|---|---|
| 5,999,975 | A | 12/1999 | Kittaka et al. |
| 6,006,218 | A | 12/1999 | Breese et al. |
| 6,039,244 | A | 3/2000 | Finsterwald |
| 6,041,311 | A | 3/2000 | Chislenko et al. |
| 6,119,933 | A | 9/2000 | Wong et al. |
| 6,227,447 | B1 | 5/2001 | Campisano |
| 6,286,756 | B1 | 9/2001 | Stinson et al. |
| 6,341,724 | B2 | 1/2002 | Campisano |
| 6,585,598 | B2 | 7/2003 | Nguyen et al. |
| 6,739,975 | B2 | 5/2004 | Nguyen et al. |
| 6,791,575 | B2 | 9/2004 | Abboud |
| 6,873,969 | B2 | 3/2005 | Stone et al. |
| 6,876,973 | B1 | 4/2005 | Visconti |
| 6,920,435 | B2 | 7/2005 | Hoffman et al. |
| 6,950,810 | B2 | 9/2005 | Lapsley et al. |
| 7,006,986 | B1 | 2/2006 | Sines et al. |
| 7,022,017 | B1 | 4/2006 | Halbritter et al. |
| 7,069,228 | B1 | 6/2006 | Rose et al. |
| 7,080,048 | B1 | 7/2006 | Sines et al. |
| 7,110,964 | B2 | 9/2006 | Tengler et al. |
| 7,328,169 | B2 | 2/2008 | Temares et al. |
| 2002/0198790 | A1* | 12/2002 | Paulo et al. .......... 705/26 |
| 2003/0061132 | A1 | 3/2003 | Yu, Sr. et al. |
| 2003/0088491 | A1 | 5/2003 | Liu et al. |
| 2003/0158776 | A1 | 8/2003 | Landesmann |
| 2003/0216956 | A1 | 11/2003 | Smith et al. |
| 2004/0012613 | A1 | 1/2004 | Rast |
| 2004/0158494 | A1 | 8/2004 | Suthar |
| 2004/0177008 | A1* | 9/2004 | Yang .................. 705/26 |
| 2005/0091118 | A1* | 4/2005 | Fano .................. 705/26 |
| 2005/0261987 | A1 | 11/2005 | Bezos et al. |
| 2006/0076397 | A1* | 4/2006 | Langos ................ 235/375 |
| 2006/0136589 | A1 | 6/2006 | Konig et al. |
| 2006/0206395 | A1* | 9/2006 | Vallabh ............... 705/26 |
| 2007/0050259 | A1* | 3/2007 | Wesley ............... 705/16 |
| 2007/0077944 | A1 | 4/2007 | Bellenger et al. |
| 2007/0083400 | A1 | 4/2007 | Katz |
| 2007/0088624 | A1* | 4/2007 | Vaughn et al. ........ 705/26 |
| 2007/0250355 | A1 | 10/2007 | Leet et al. |
| 2007/0265937 | A1* | 11/2007 | Aitkins ............... 705/26 |
| 2008/0082424 | A1* | 4/2008 | Walton ............... 705/26 |
| 2008/0147514 | A1* | 6/2008 | Shuster et al. ........ 705/26 |
| 2008/0235108 | A1* | 9/2008 | Kulakowski et al. .... 705/26 |
| 2008/0270230 | A1 | 10/2008 | Hendrickson et al. |
| 2009/0099941 | A1* | 4/2009 | Berkowitz ............ 705/26 |
| 2010/0114677 | A1* | 5/2010 | Carlson et al. ........ 705/14.1 |
| 2010/0262502 | A1* | 10/2010 | Adelman et al. ....... 705/14.73 |
| 2010/0299208 | A1* | 11/2010 | Carlson et al. ....... 705/14.64 |

OTHER PUBLICATIONS

"Buffalo Wild Wings® Sauces up Food Quality with Complete Kitchen Management Solution from QSR Automations; Service Pioneer Relies on QSR's Industry Leading Kitchen Software and Hardware to Coordinate Preparation of its Award-Winning Menu Items," Business Wire, New York, Jul. 25, 2006, p. 1.

OpenTable:24/7 Online Reservations, http://www.opentable.com/info/aboutus.aspx, © 2007, 1 page.

Magellan Reservations Overview, Online Restaurant Reservations and Guest Management/Magellan, http://www.themagellannetwork.cpm/products, © 2007, 2 pages.

Reservations-GuestBridge, Inc., http://www.guestbridge.com/reserve/reservereservations.html, Downloaded from Internet Apr. 24, 2007, 1 page.

Avenista, Table Reservation Software, http://www.avenista.com/overview.aspx, © 2004, 2 pages.

Restaurant Reservation Software-iMagic restaurant Reservation, http://www.imagicrestaurantsoftware.com, © 2007, 1 page.

ProHost Seating Management, Products & Services: Seating Management: ProHost, http://www/ntnwireless.com/hospitalityandsoftware/seating_management/prohost.asp Downloaded from Internet Apr. 24, 2007, 2 pages.

QSR Automations: XSK (kitchen) & Hostess (seating), http://www.qsrautomation.com/products/software/Hostess.asp, © 2007, 2 pages.

QSR Automations, Inc., "With Successful Pilot Implementations QSR Automations Makes Generally Available the ConnectSmart Hostess," http://www.cisrautomation.com/news/press_releases.asp, Downloaded from Internet Apr. 24, 2007, 2 pages.

Restaurant Floor and Table Management Software-GuestBridge, Inc., http://www.guestbridge.com/reserve/reservetablemgmt.html, Downloaded from Internet Apr. 24, 2007, 1 page.

Wait List Management Software-Guestbridge, Inc., http://www.questbridge.com/reserve/reservewaitlist.html, Downloaded from Internet Apr. 24, 2007, 1 page.

NuRol: Point of Sale and Barcoding, http://www/nurol.com/verticalcategory. Downloaded from Internet Apr. 24, 2007, 3 pages.

Magellan Online Restaurant Reservations and Gues Management Services, http://www.themagellannetwork.com, Downloaded from Internet Sep. 4, 2007, 1 page.

Restaurant Management Software: Restaurant POS Software, Menu Point of Sale System, http://www/capterra.com/restaurant-management-software, Downloaded from Internet Sep. 4, 2007, 12 pages.

* cited by examiner

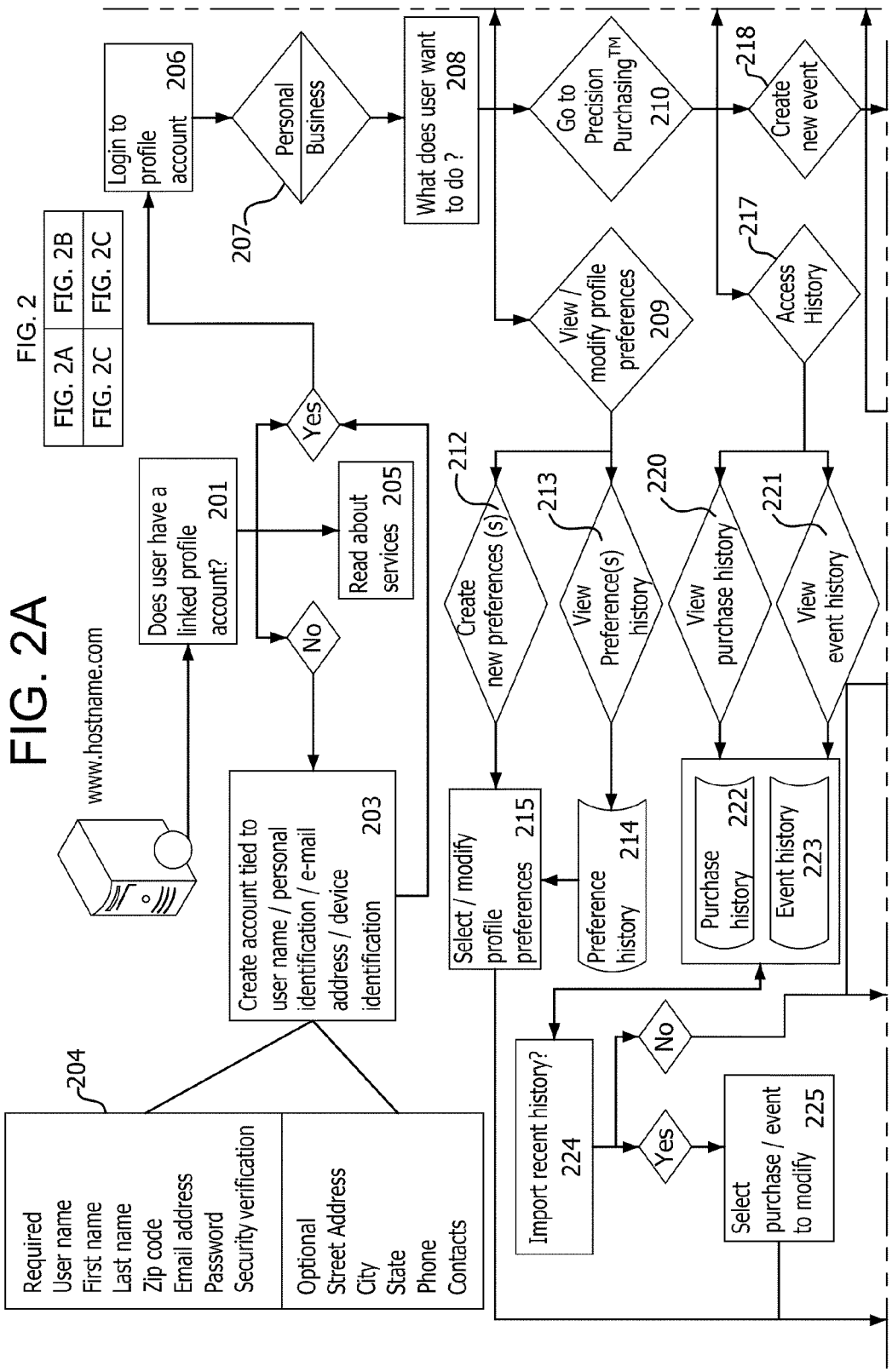

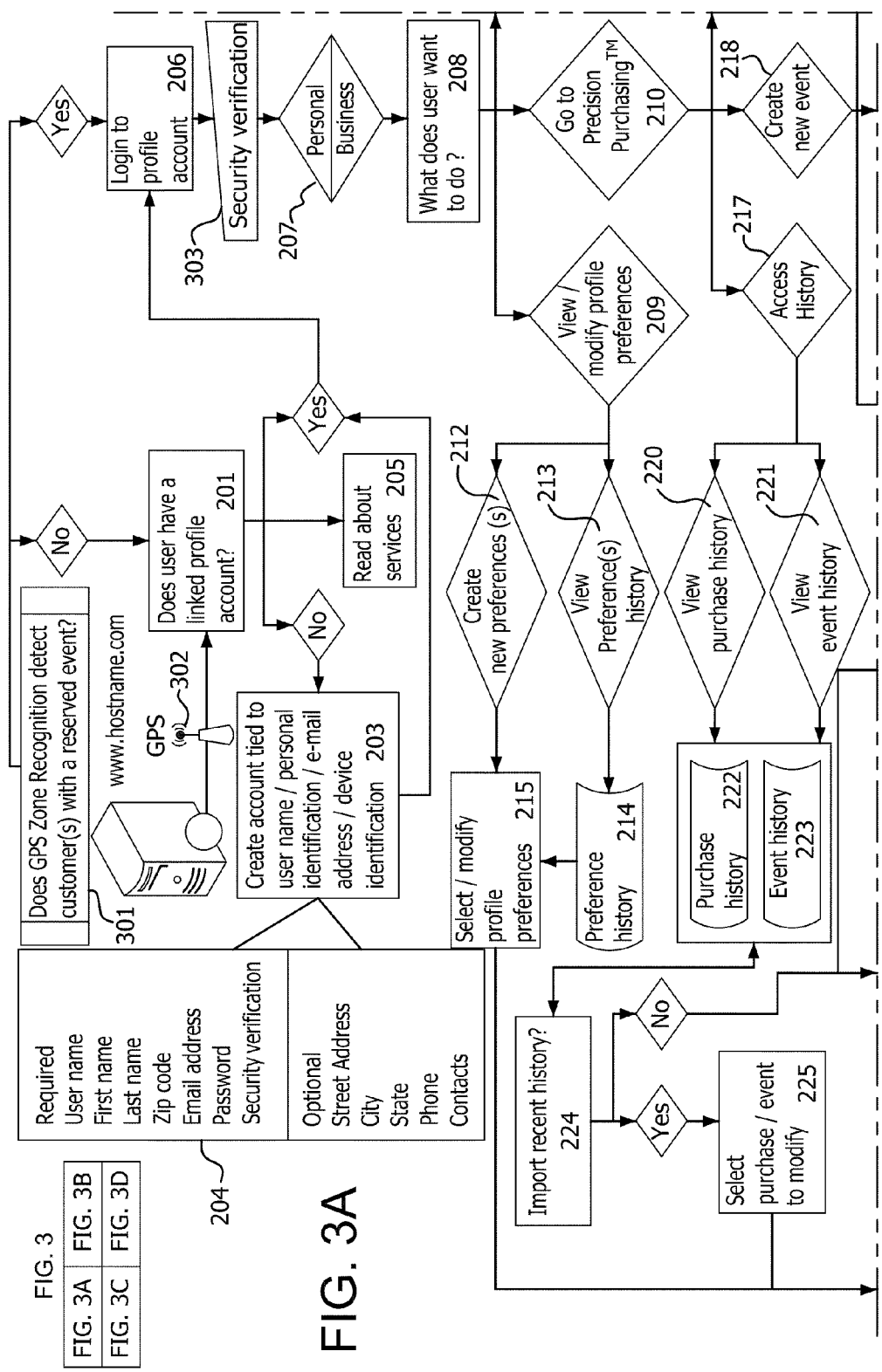

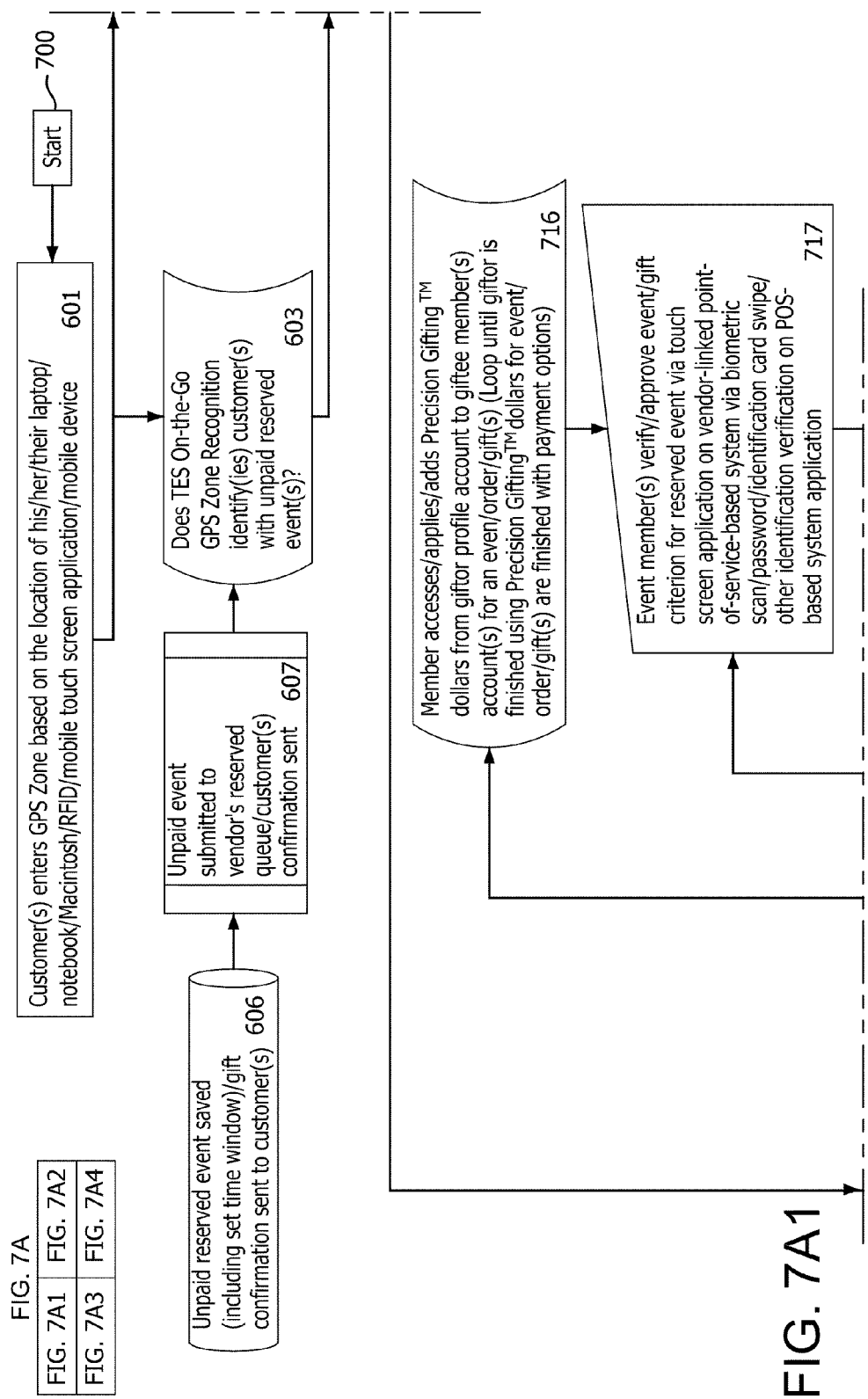

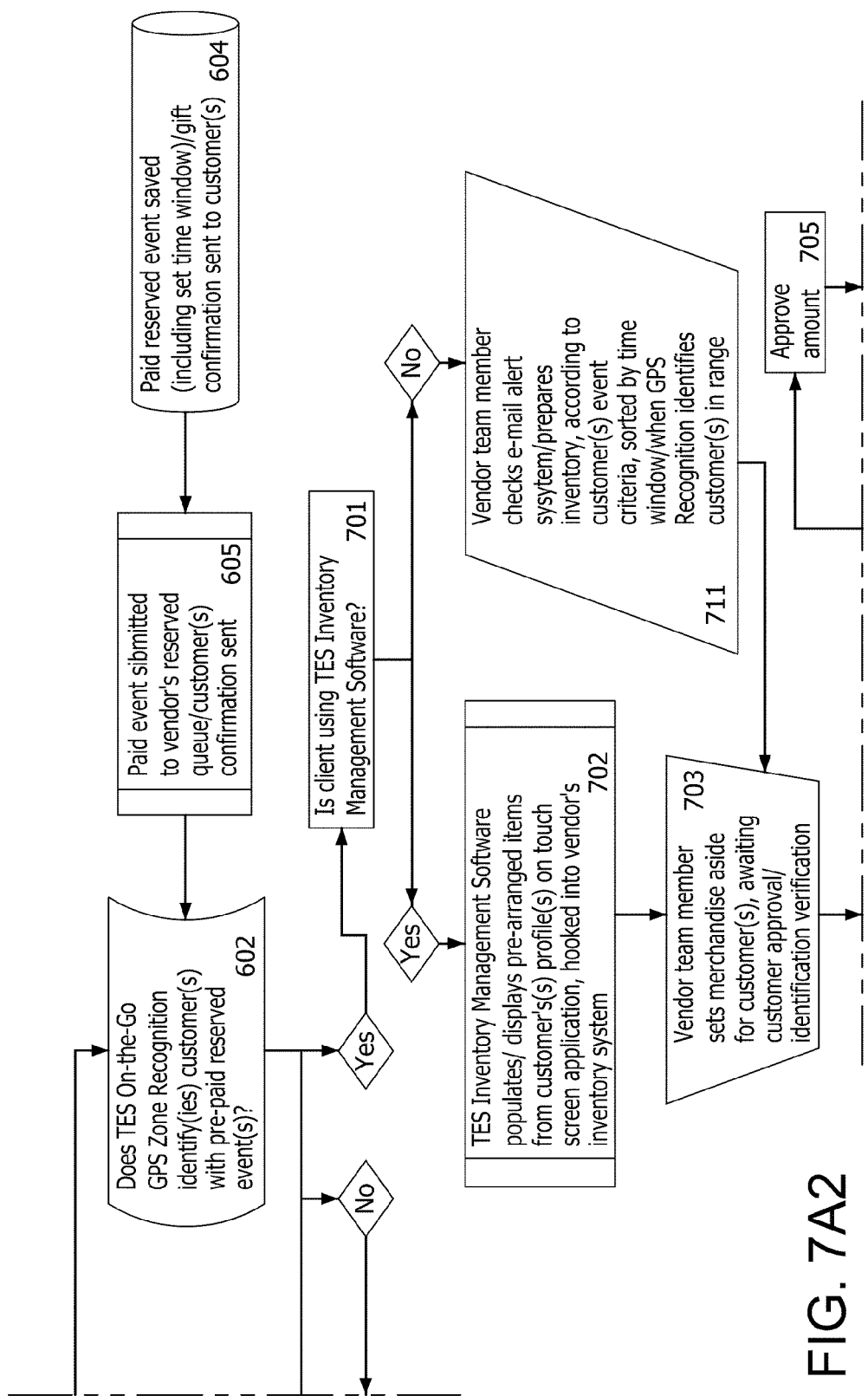
FIG. 7A2

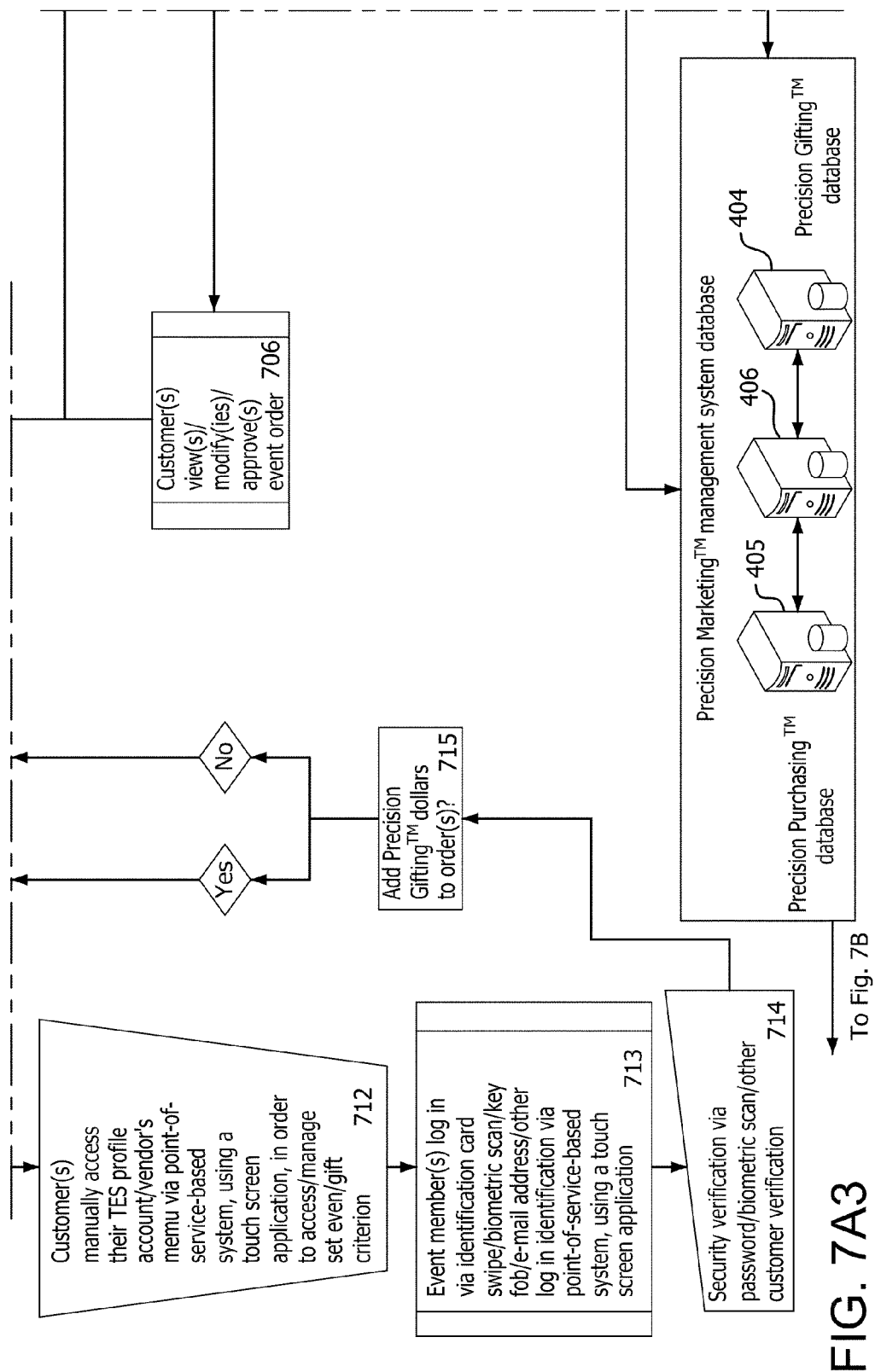
FIG. 7A3

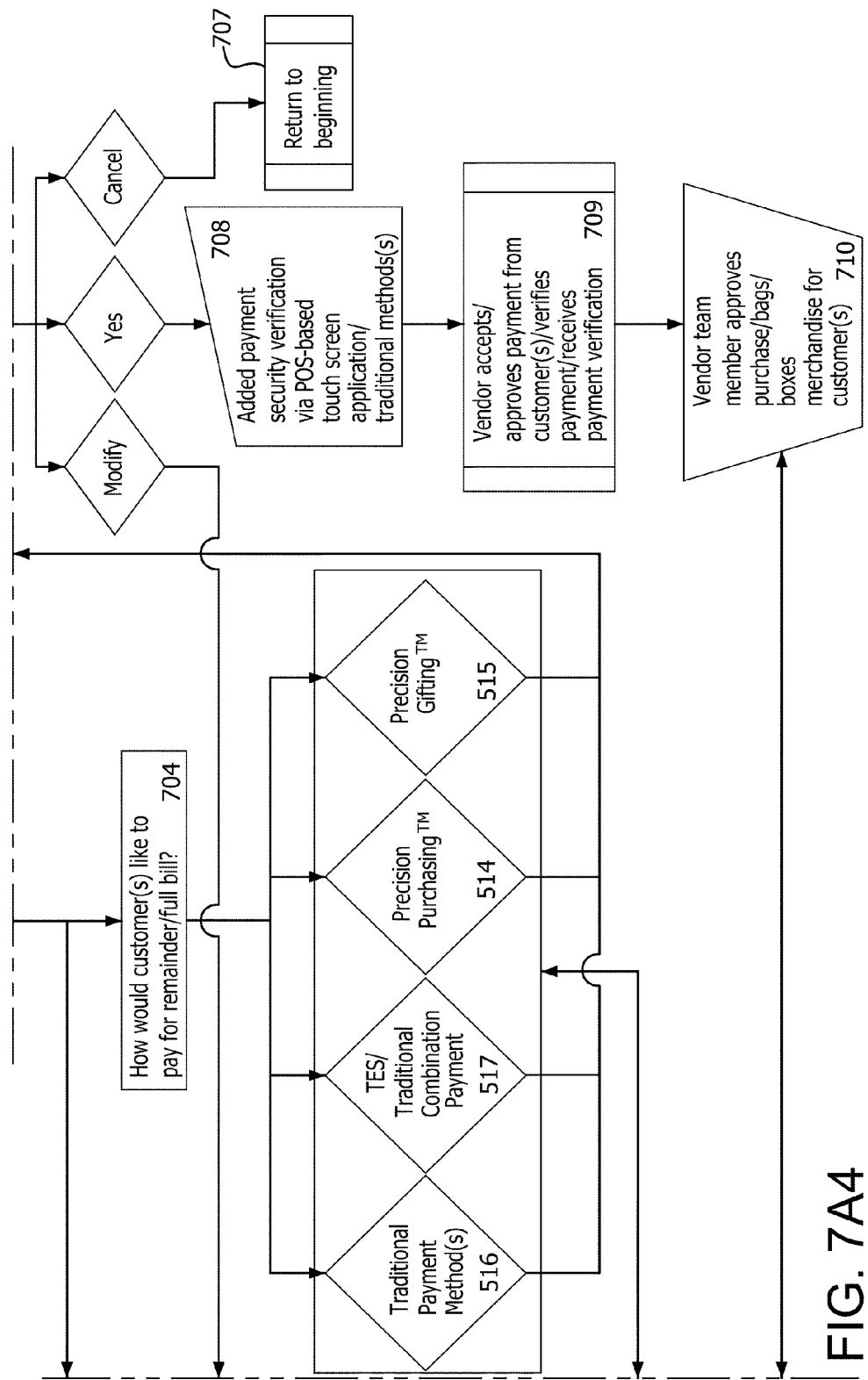
FIG. 7A4

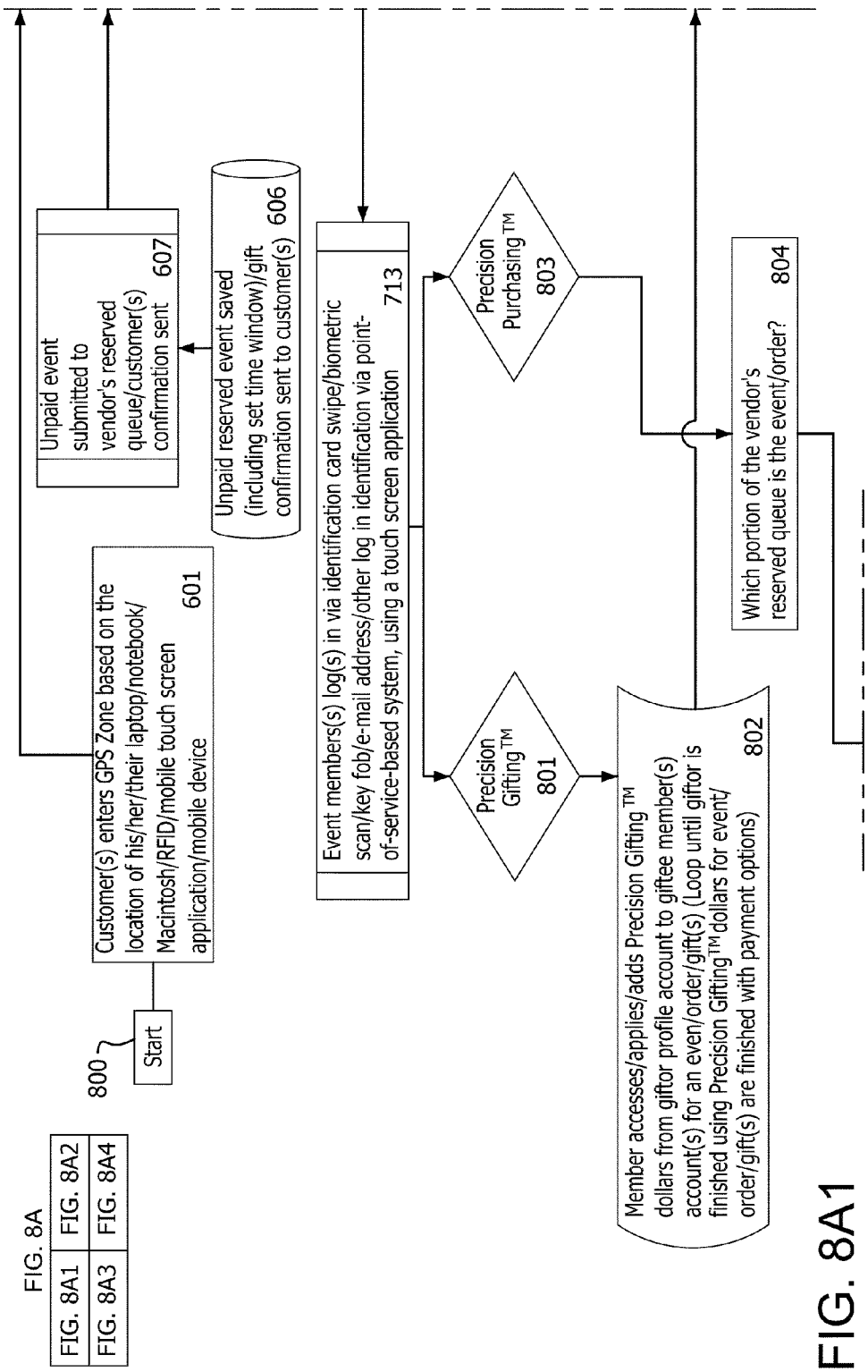
FIG. 8A1

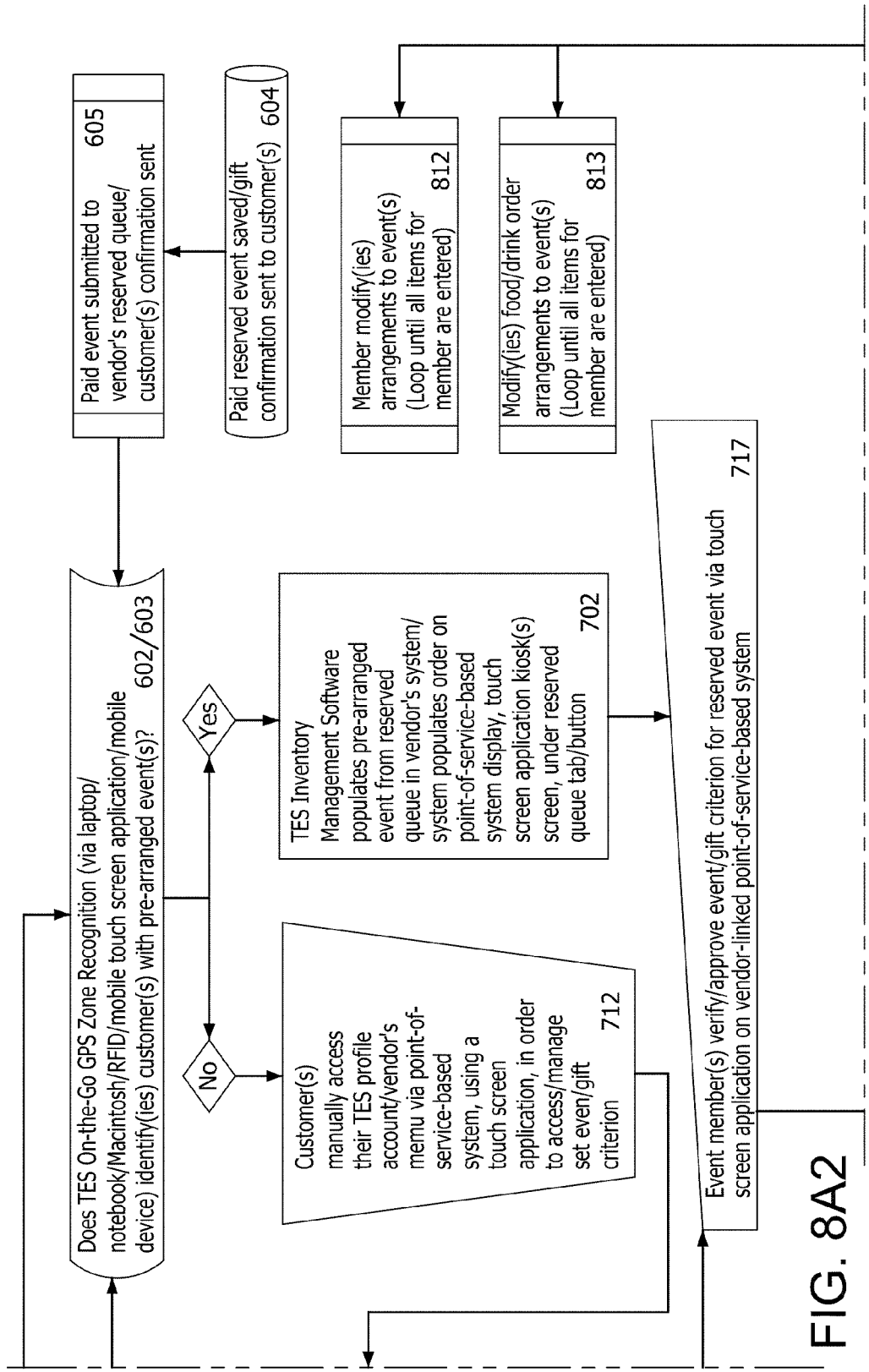
FIG. 8A2

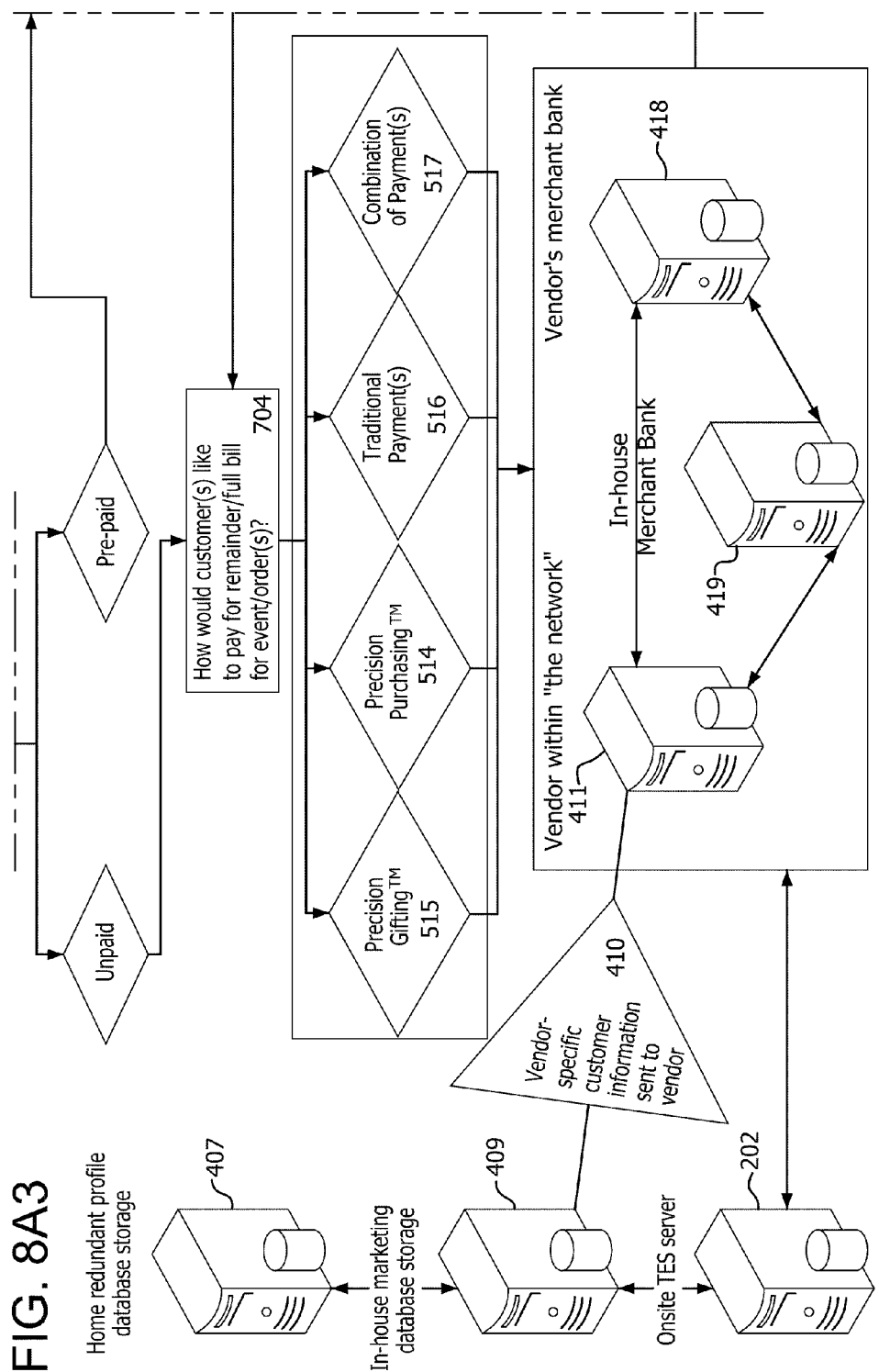
FIG. 8A3

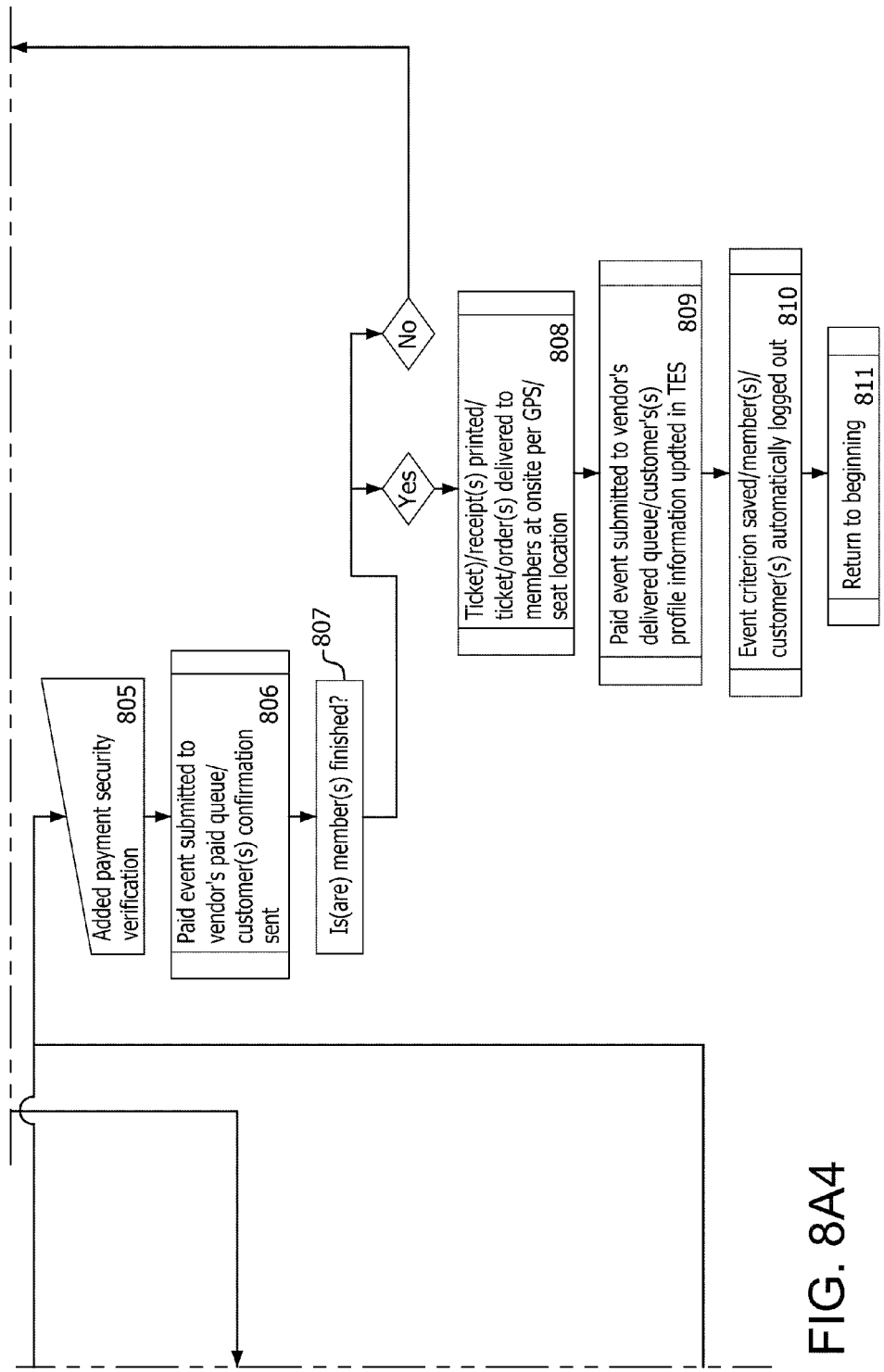
FIG. 8A4

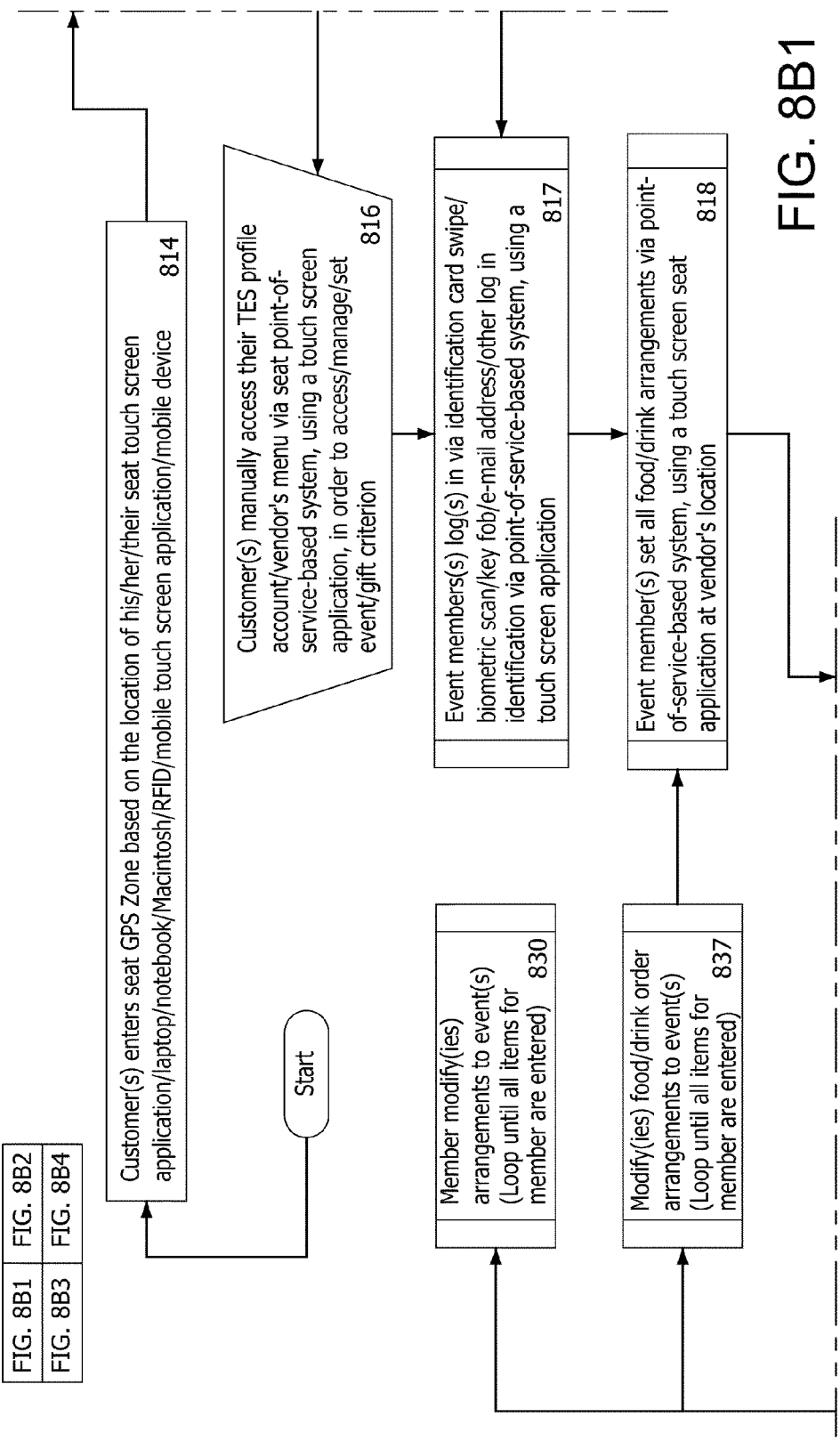

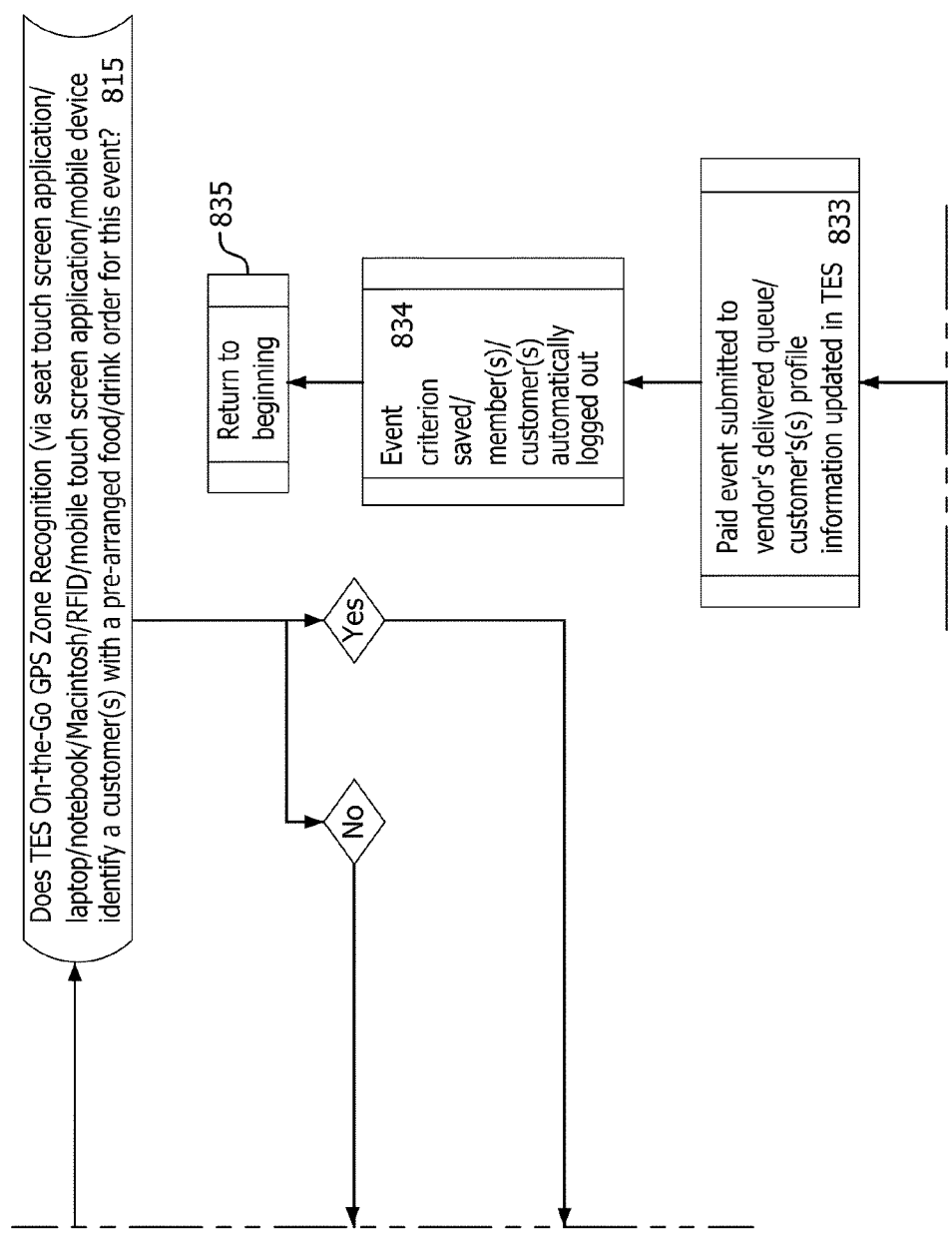

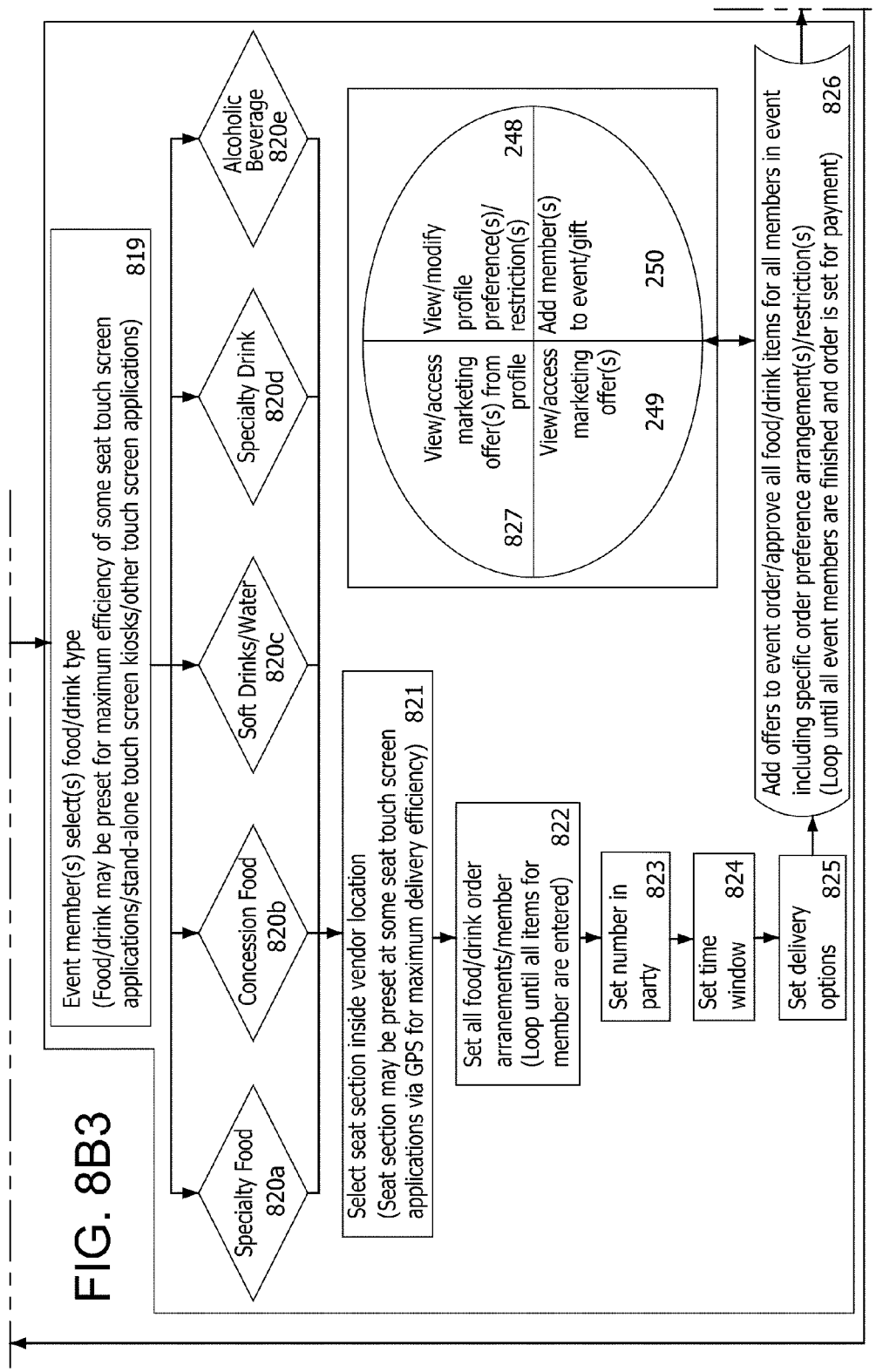
FIG. 8B3

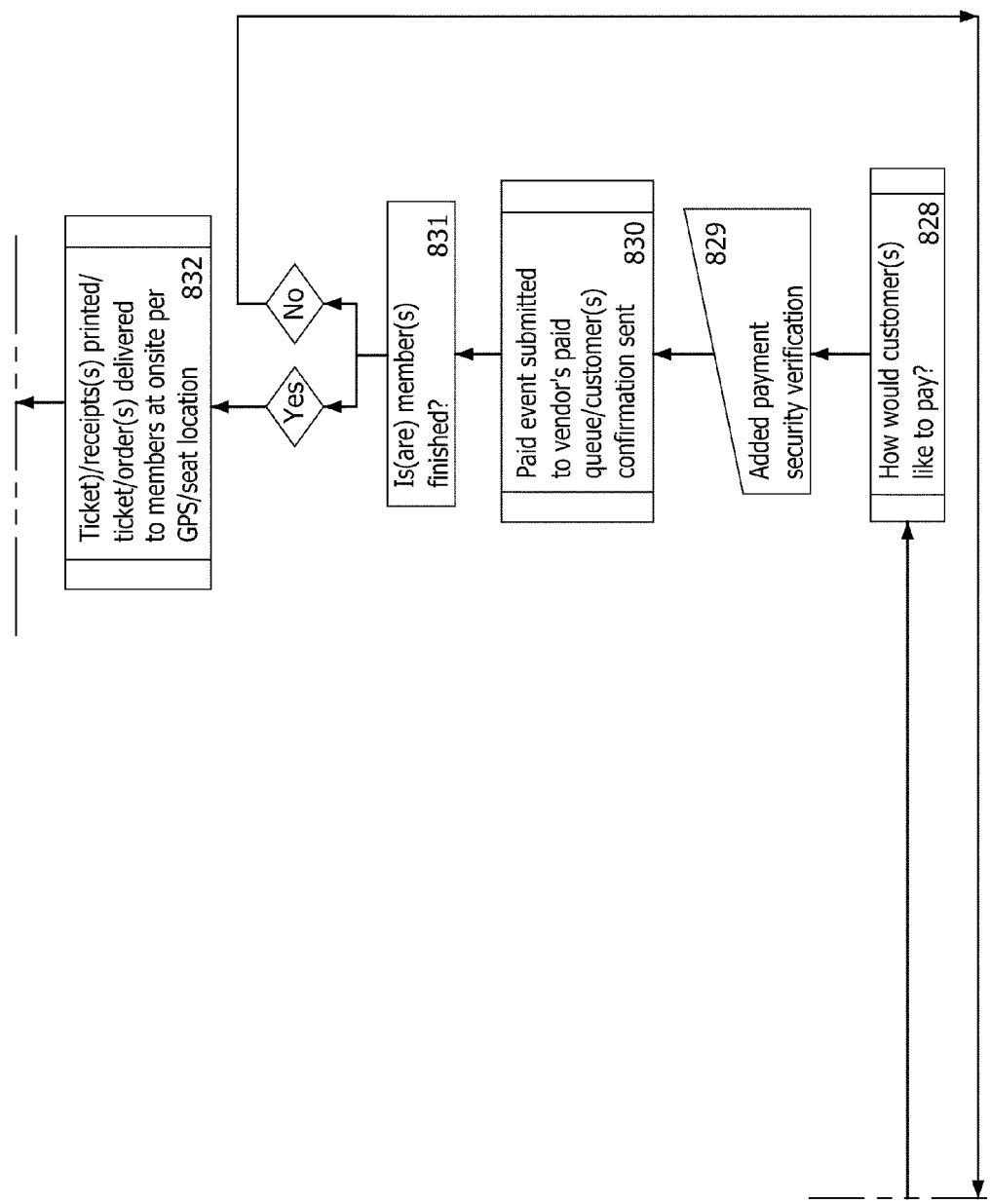
FIG. 8B4

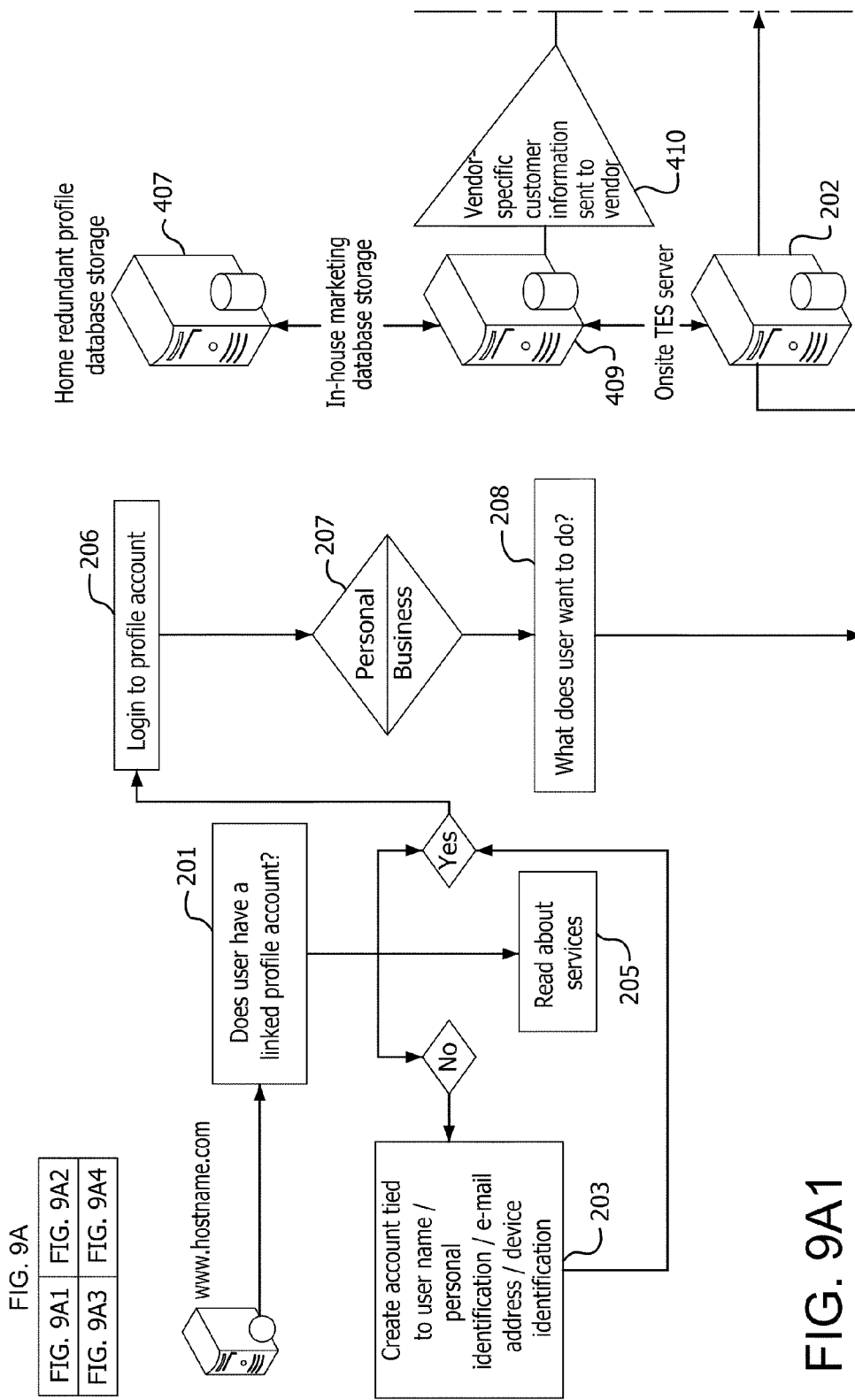

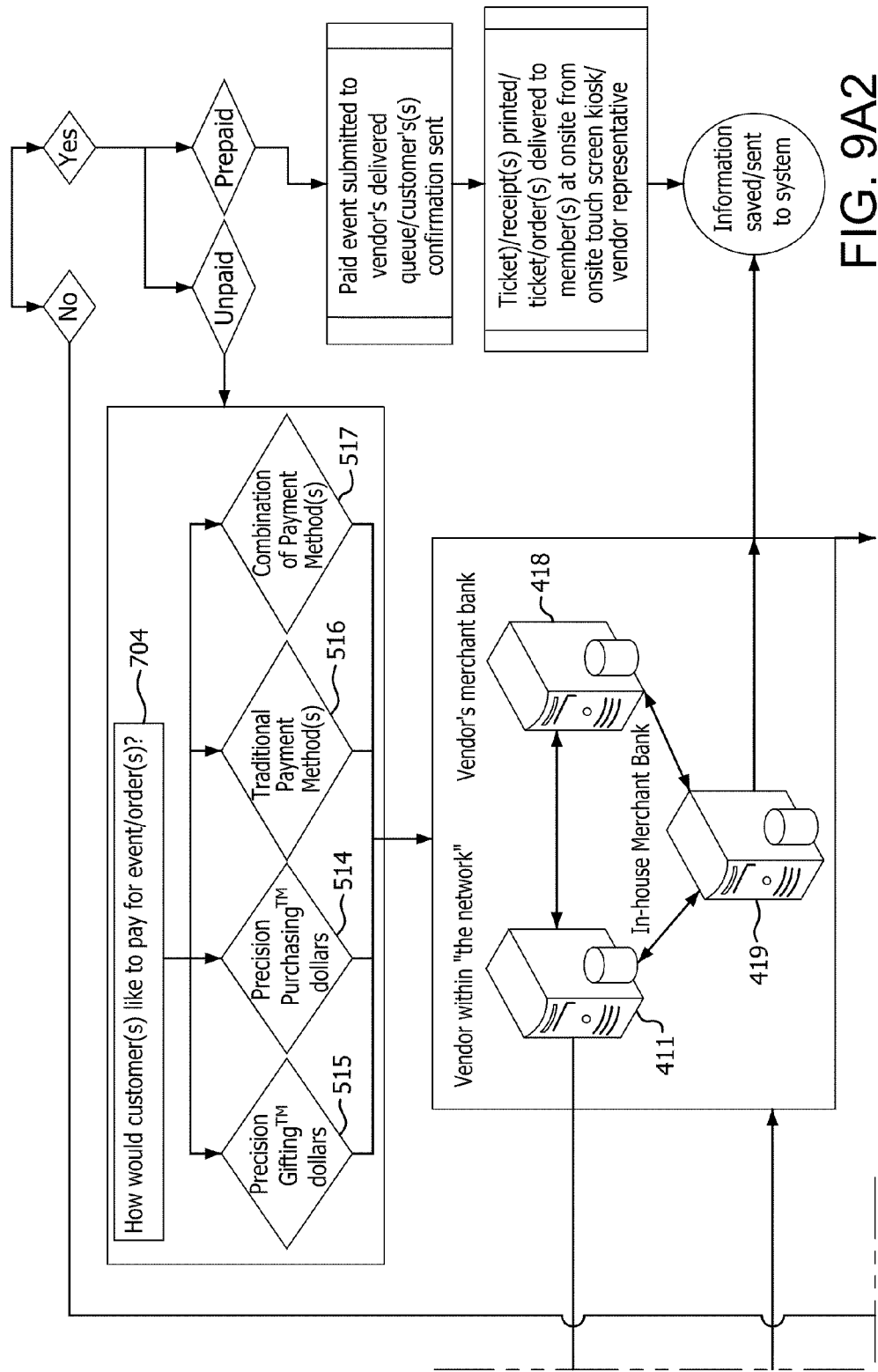

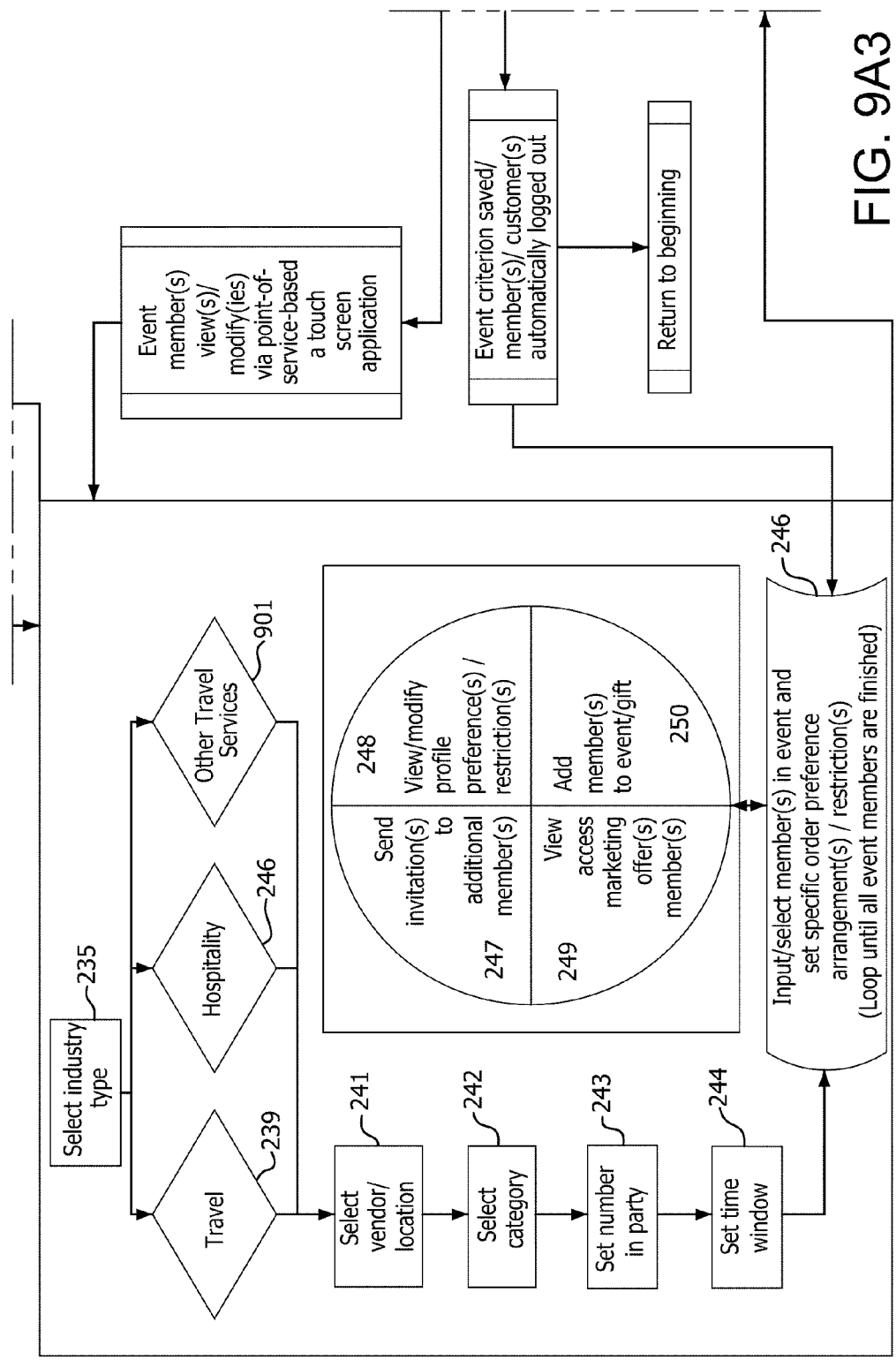
FIG. 9A3

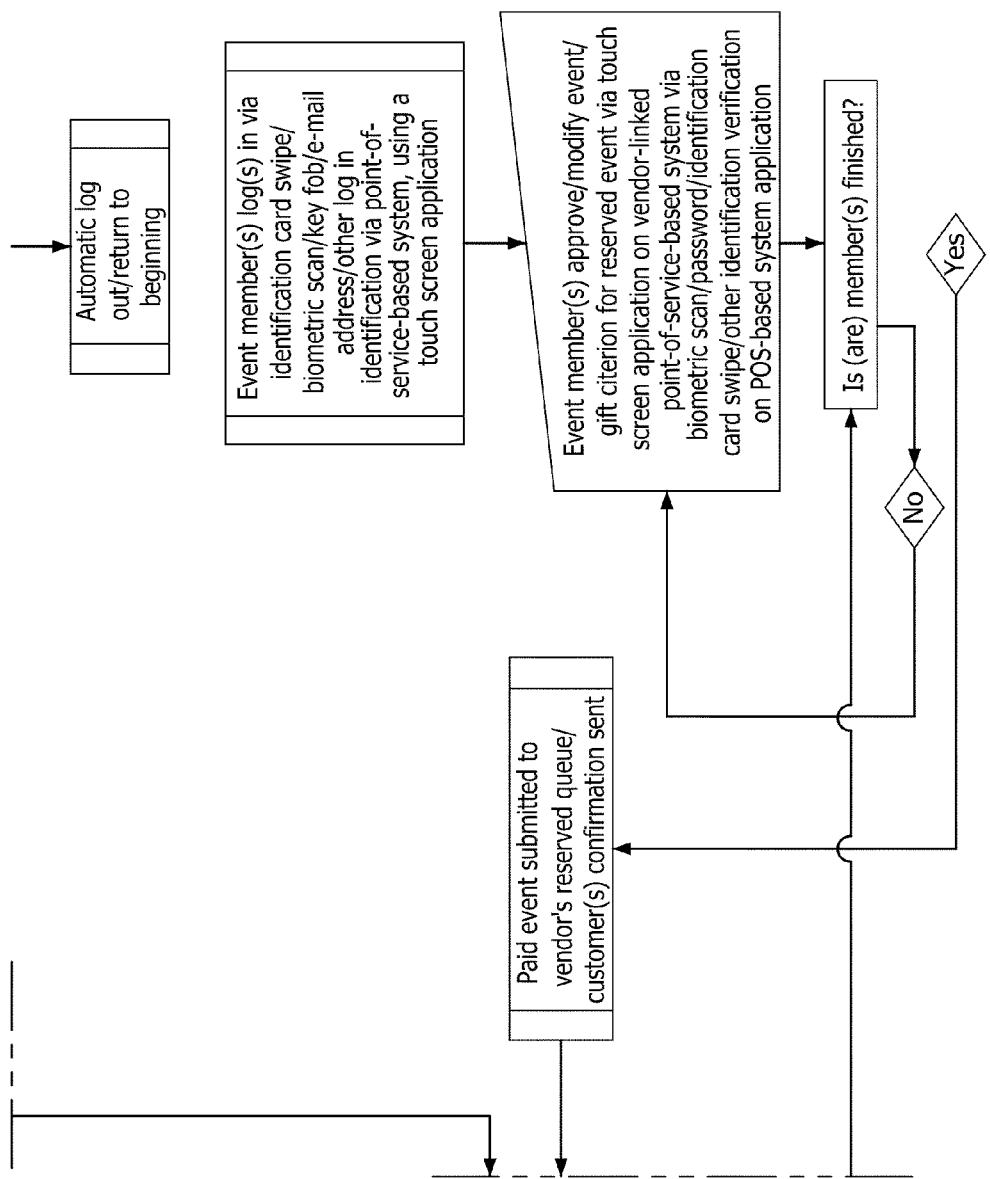

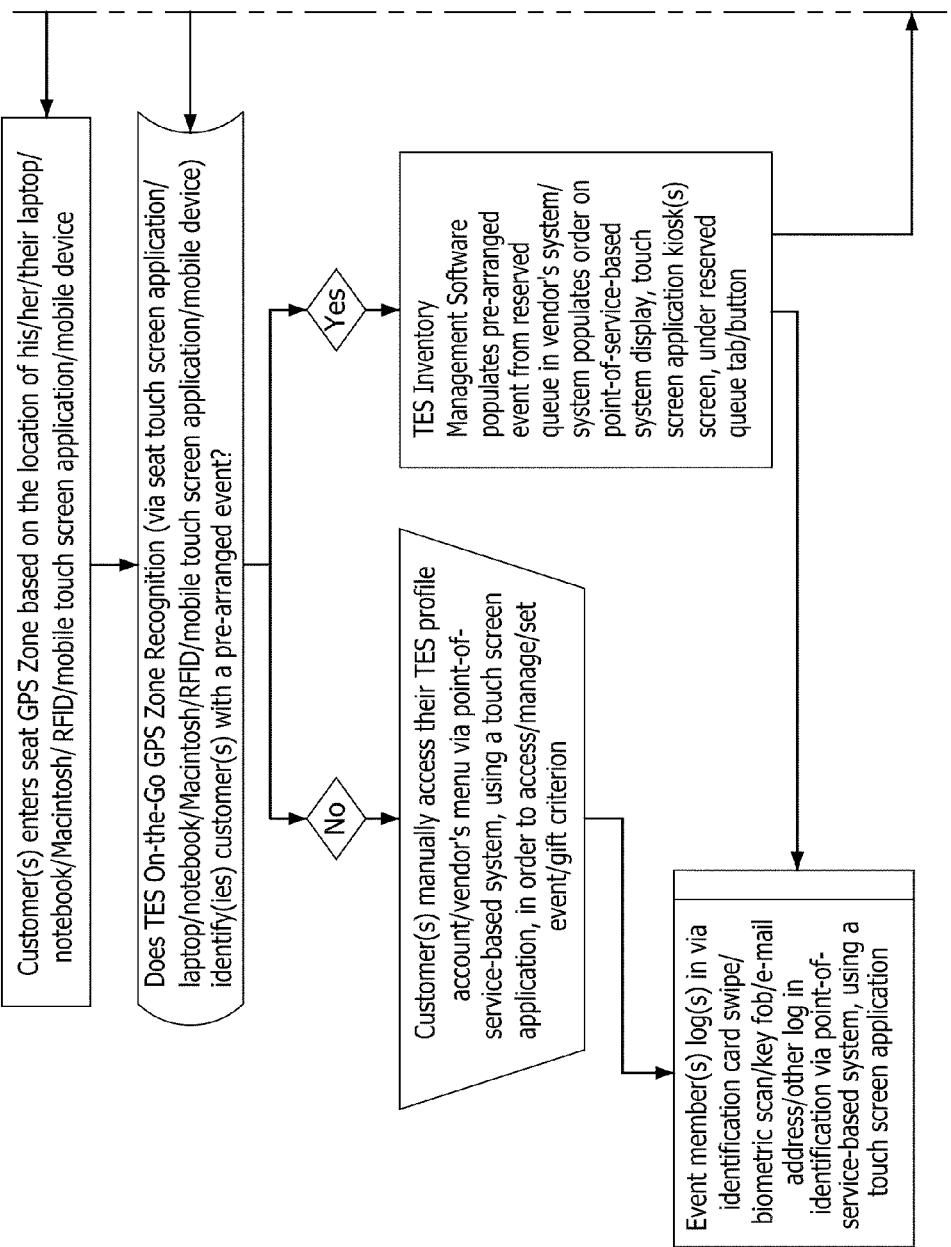

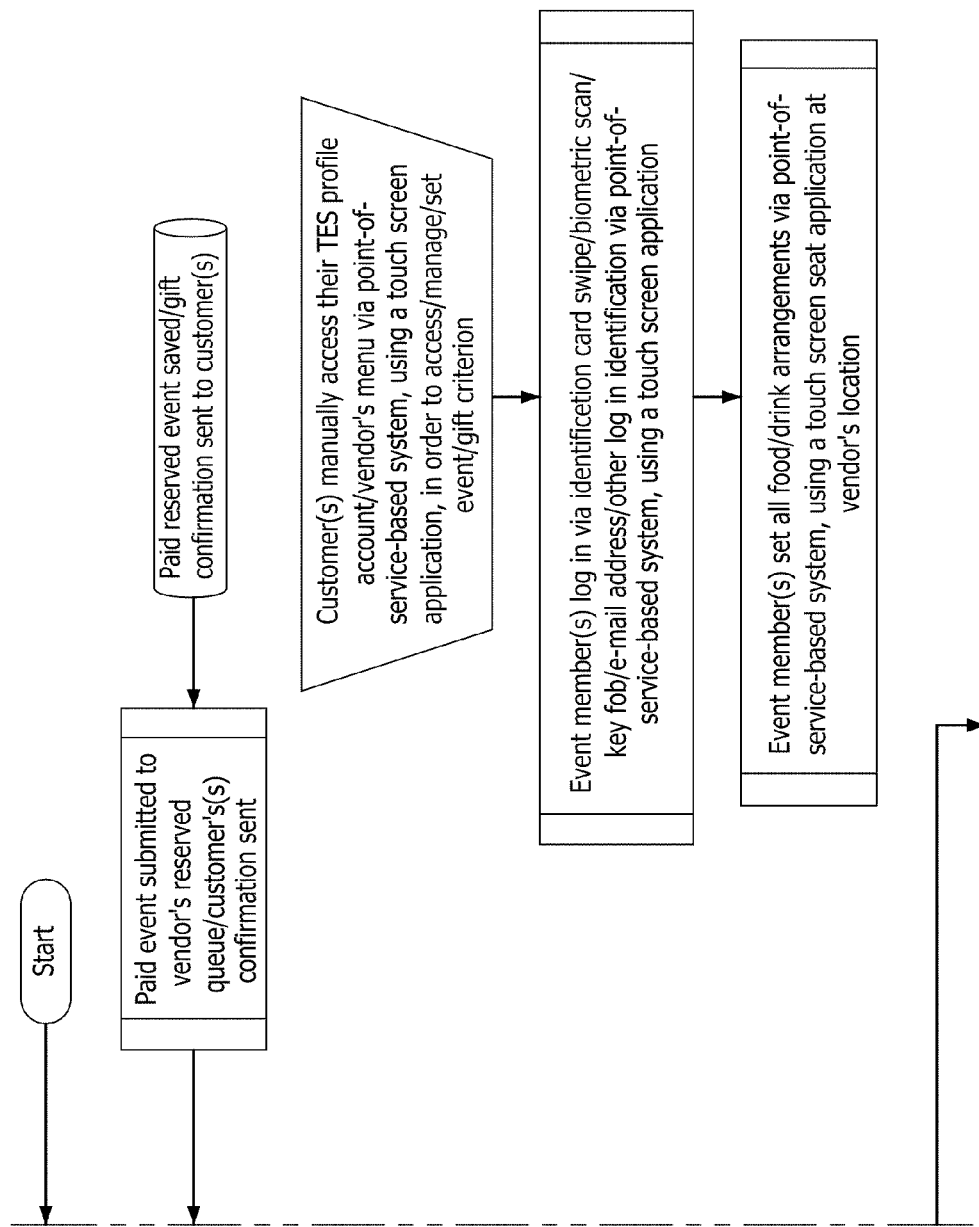
FIG. 9B2

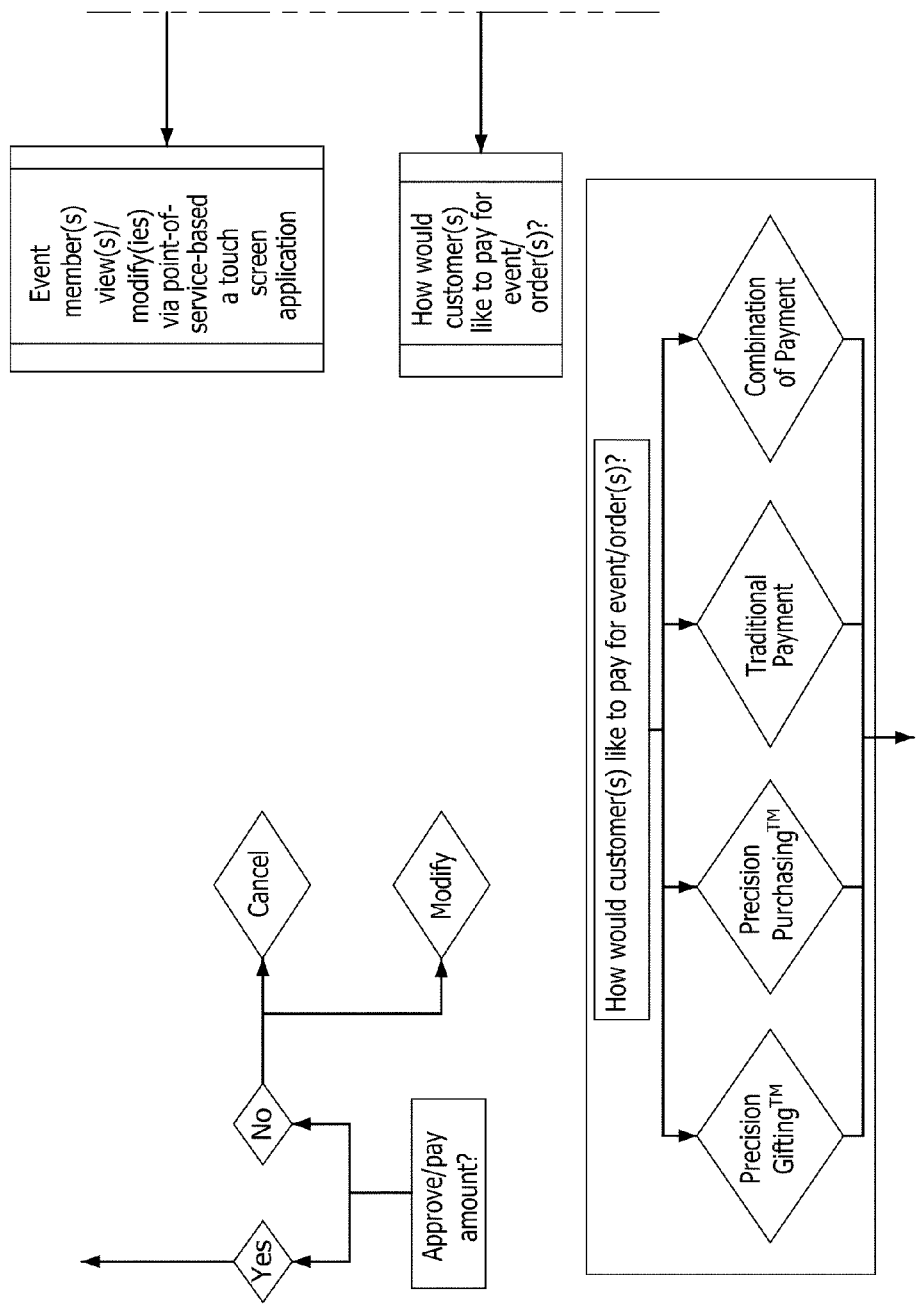
FIG. 9B3

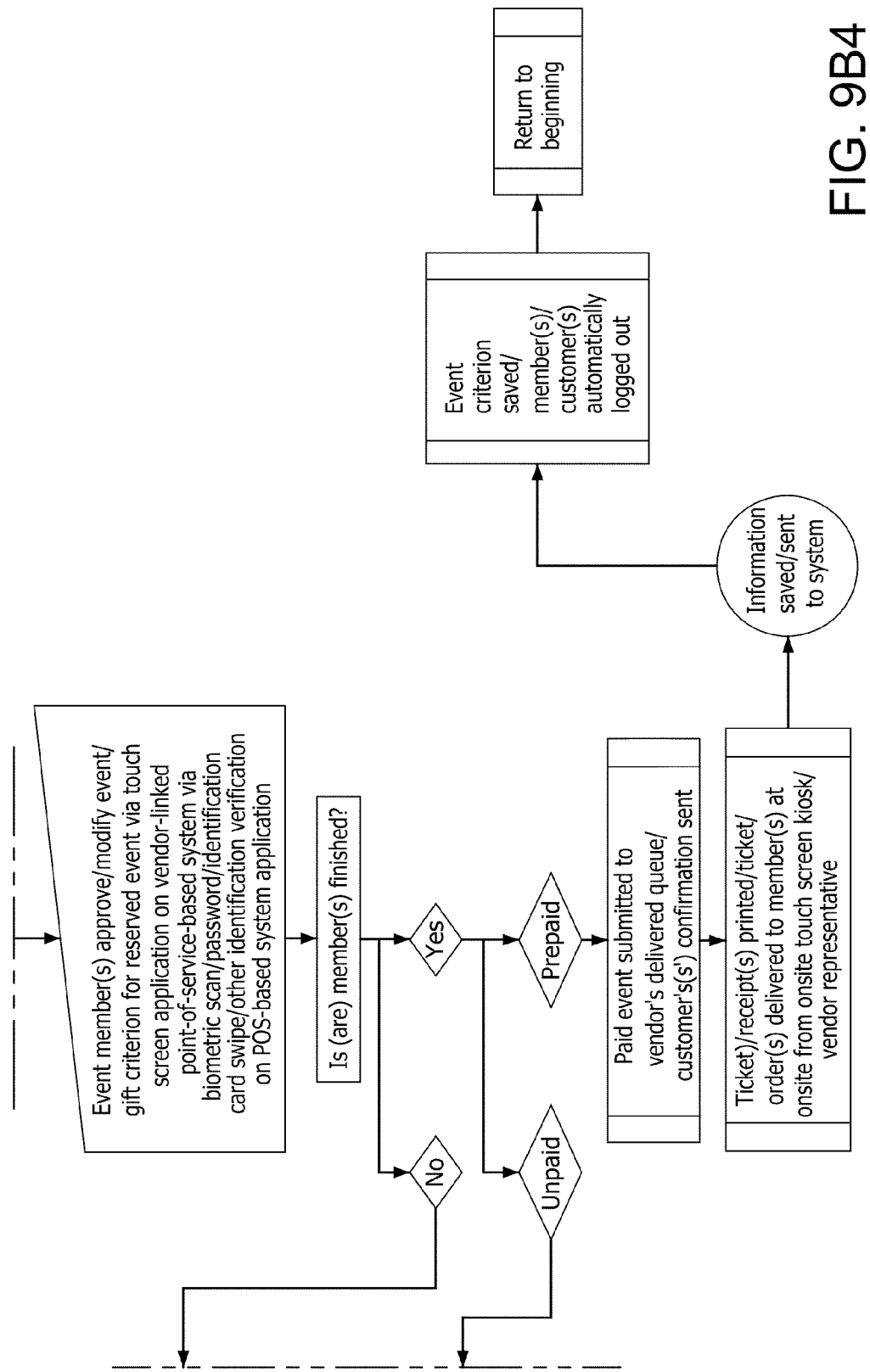
FIG. 9B4

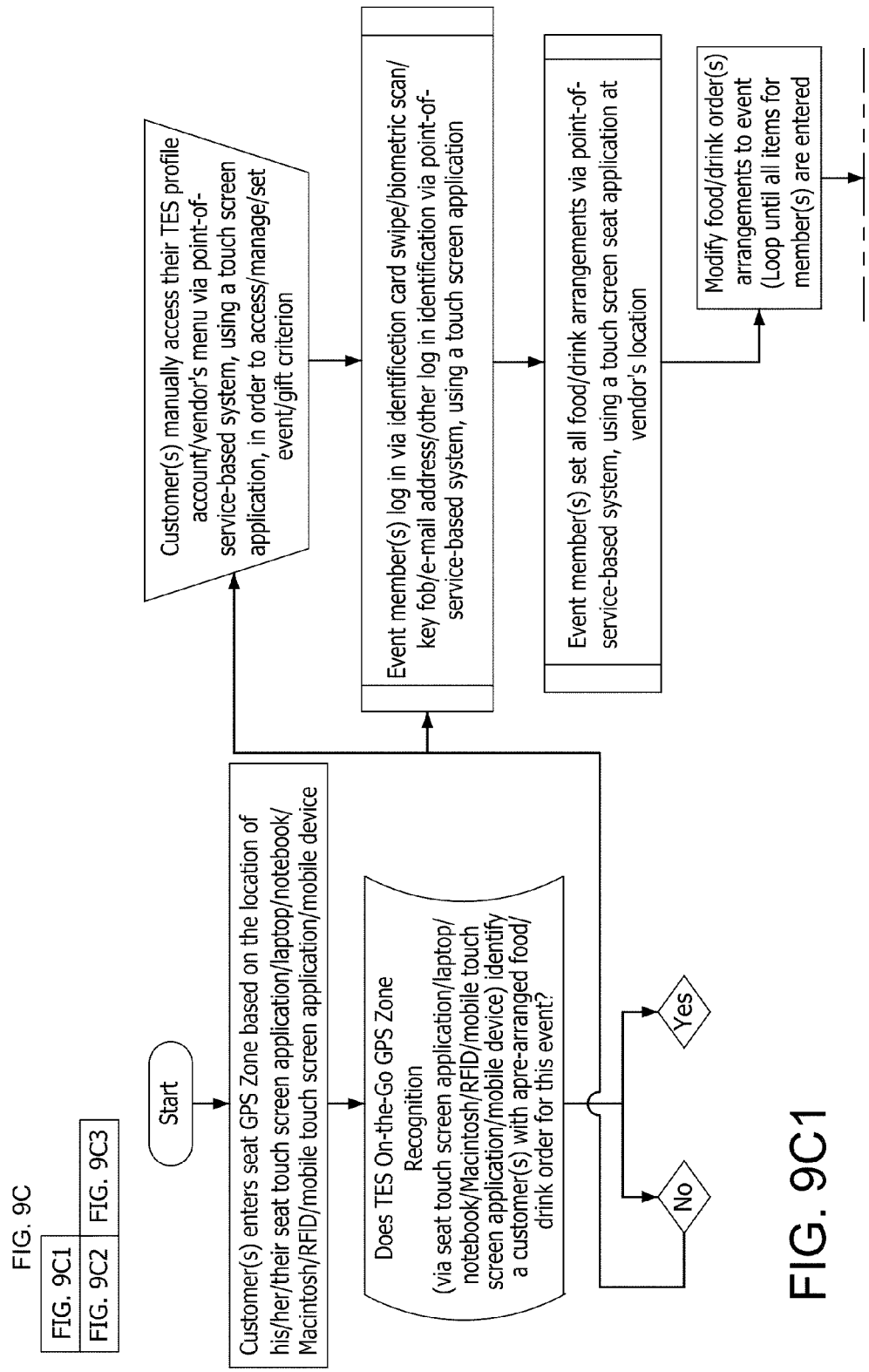

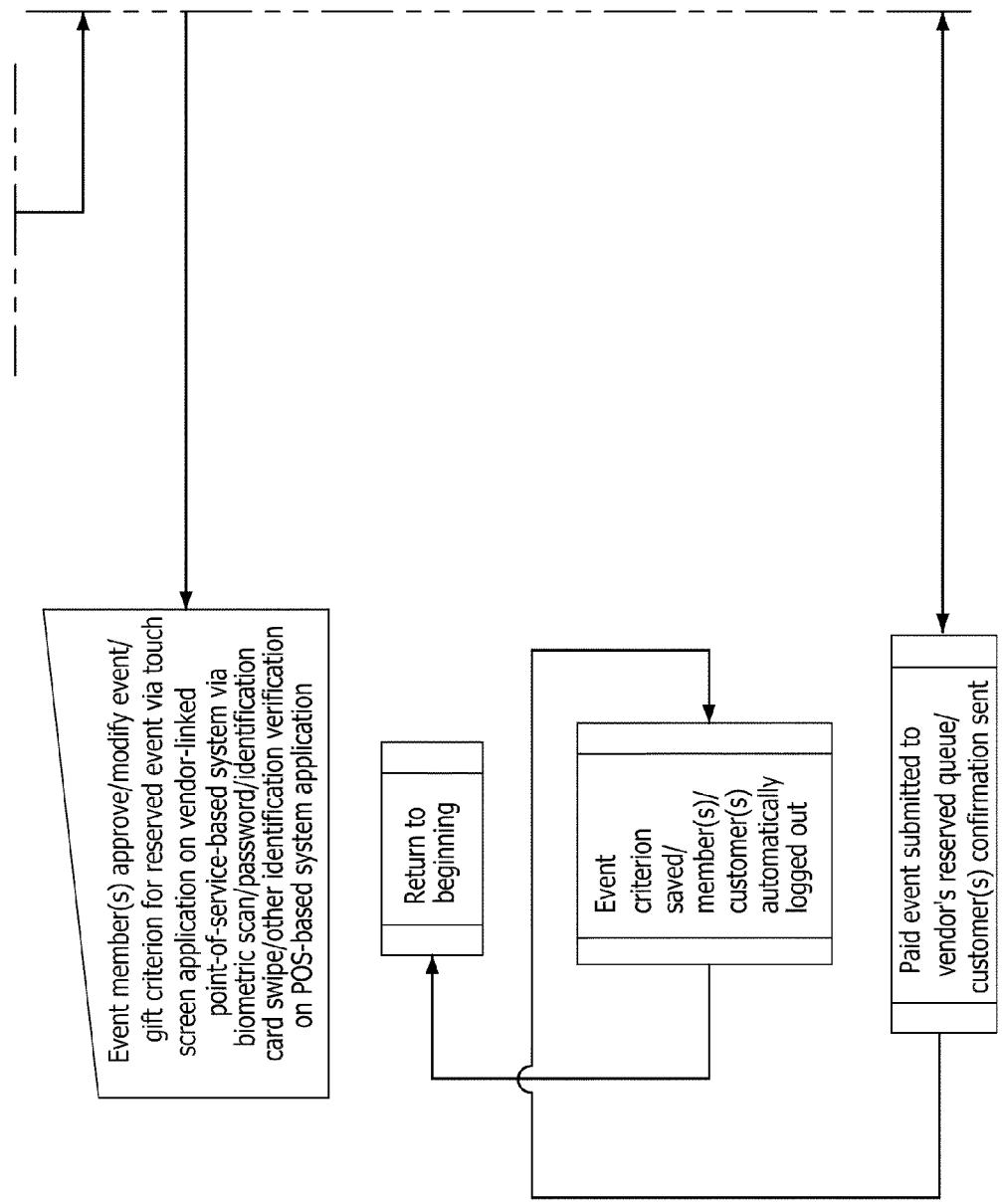
FIG. 9C2

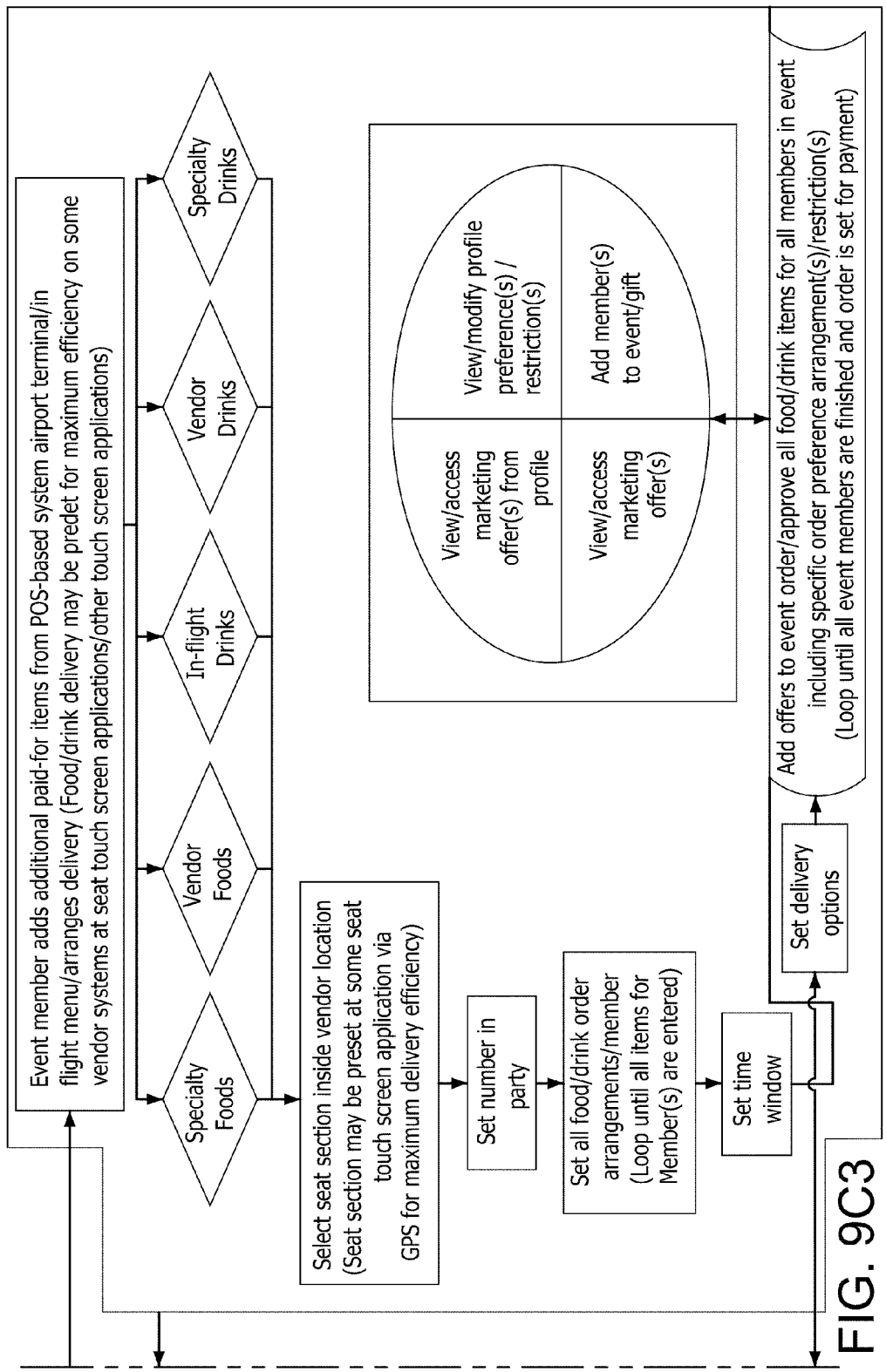
FIG. 9C3

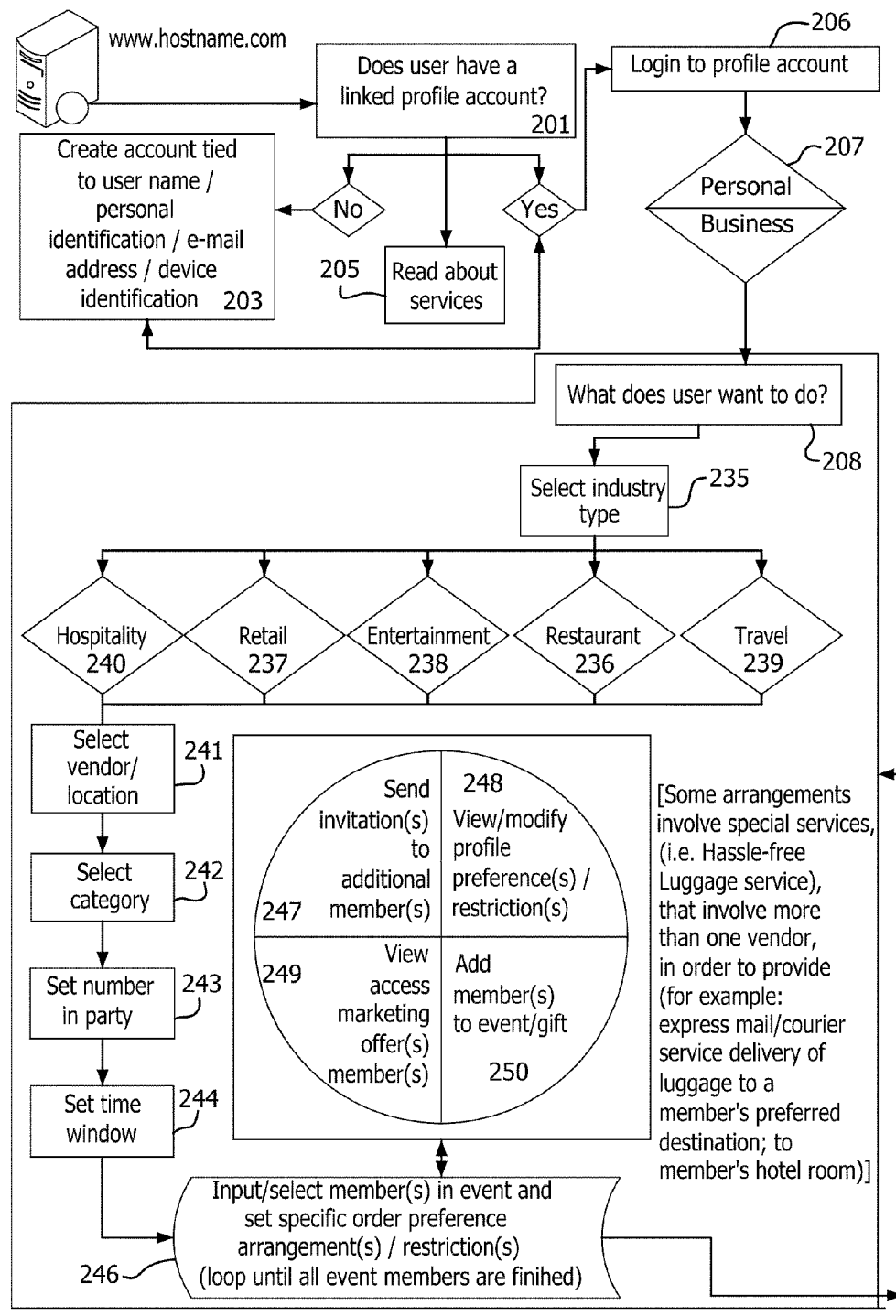

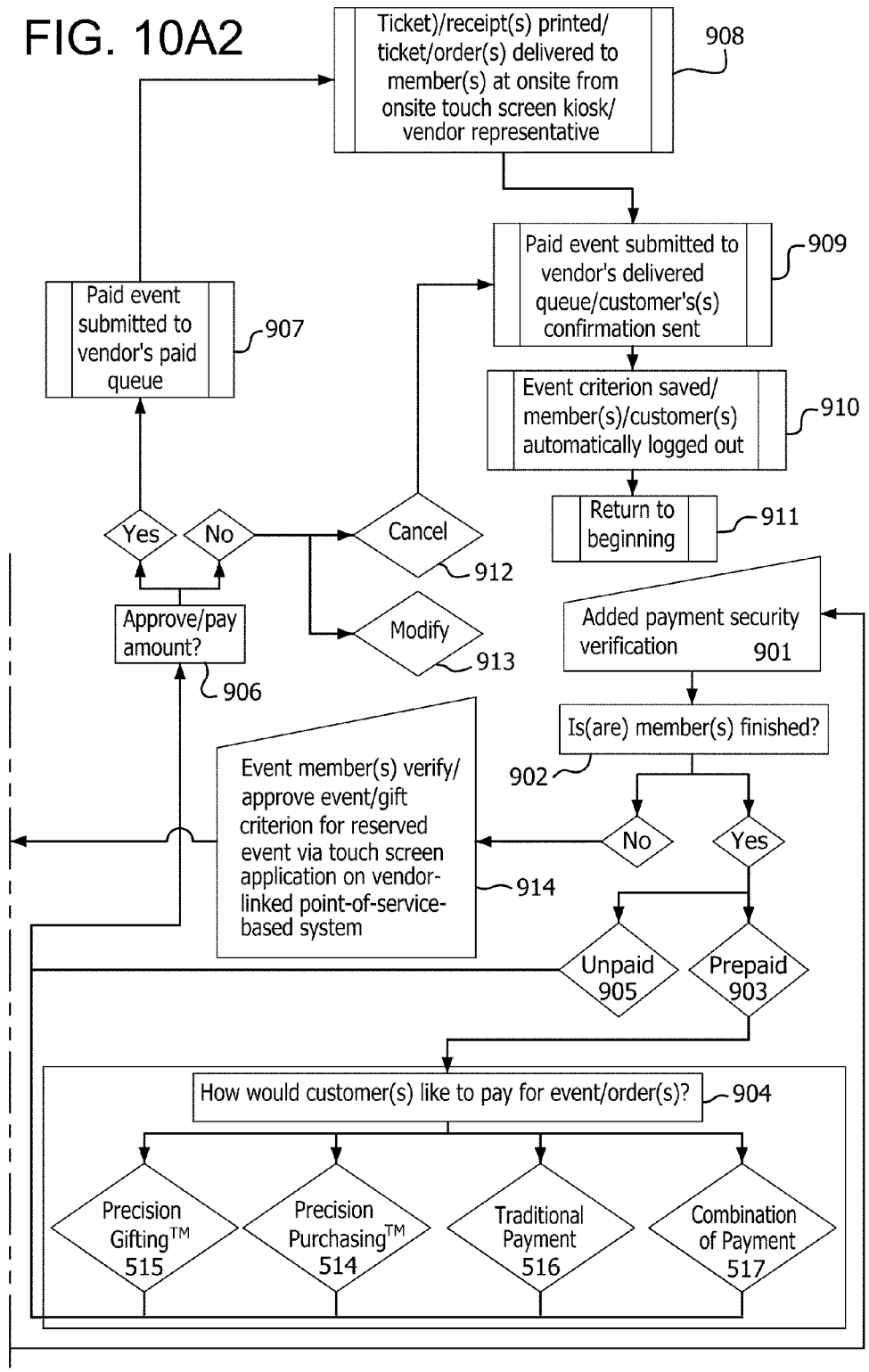

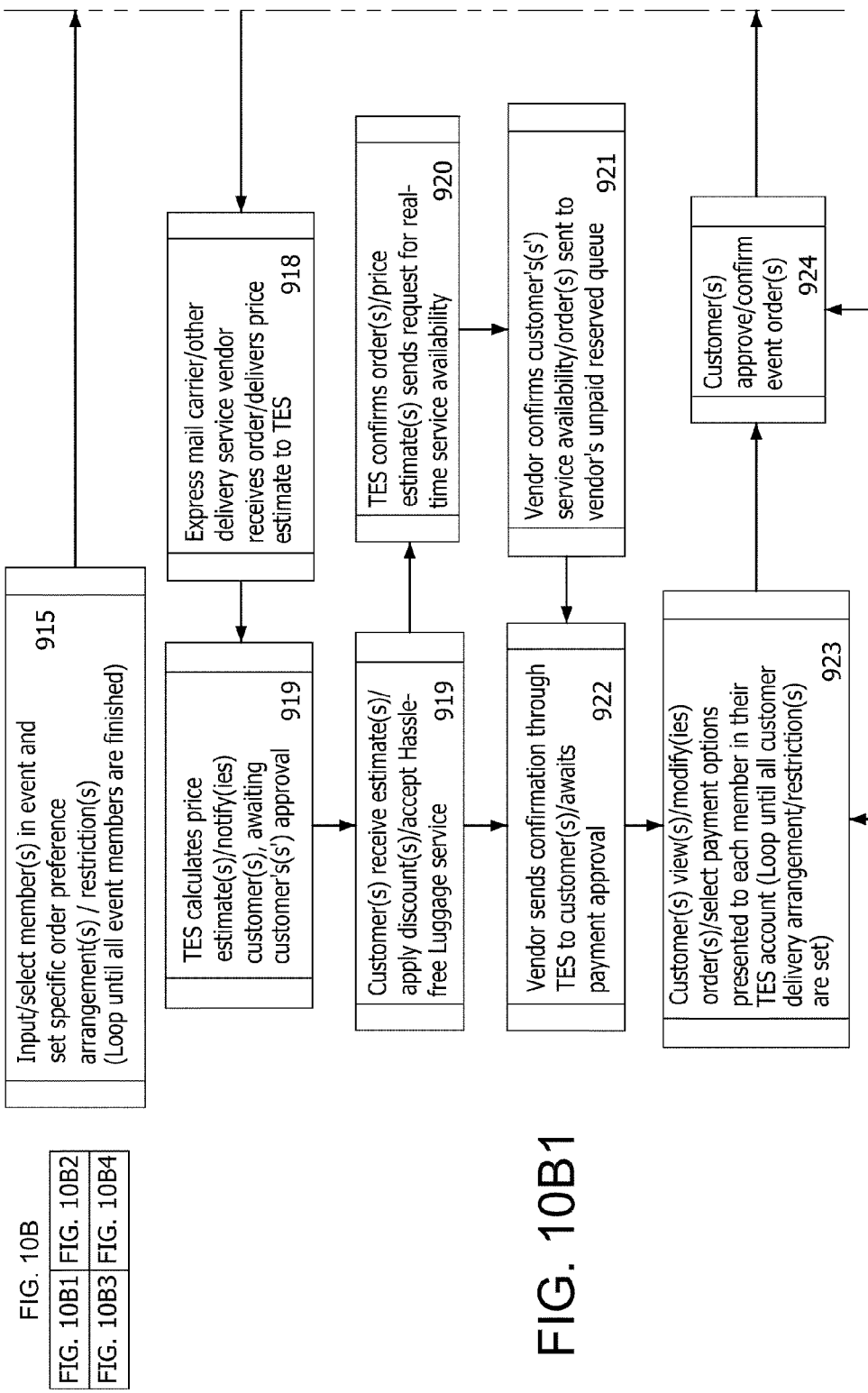

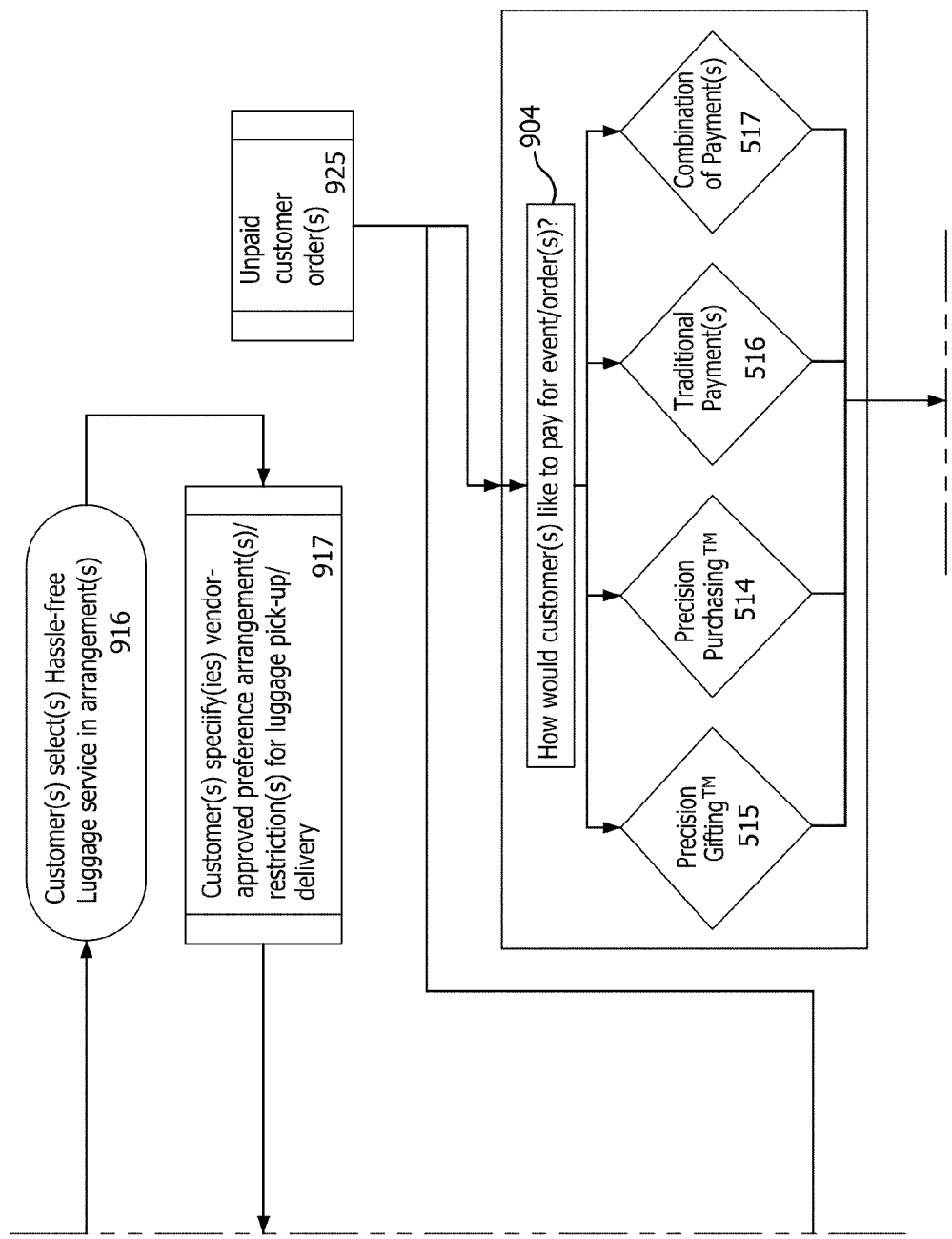
FIG. 10B2

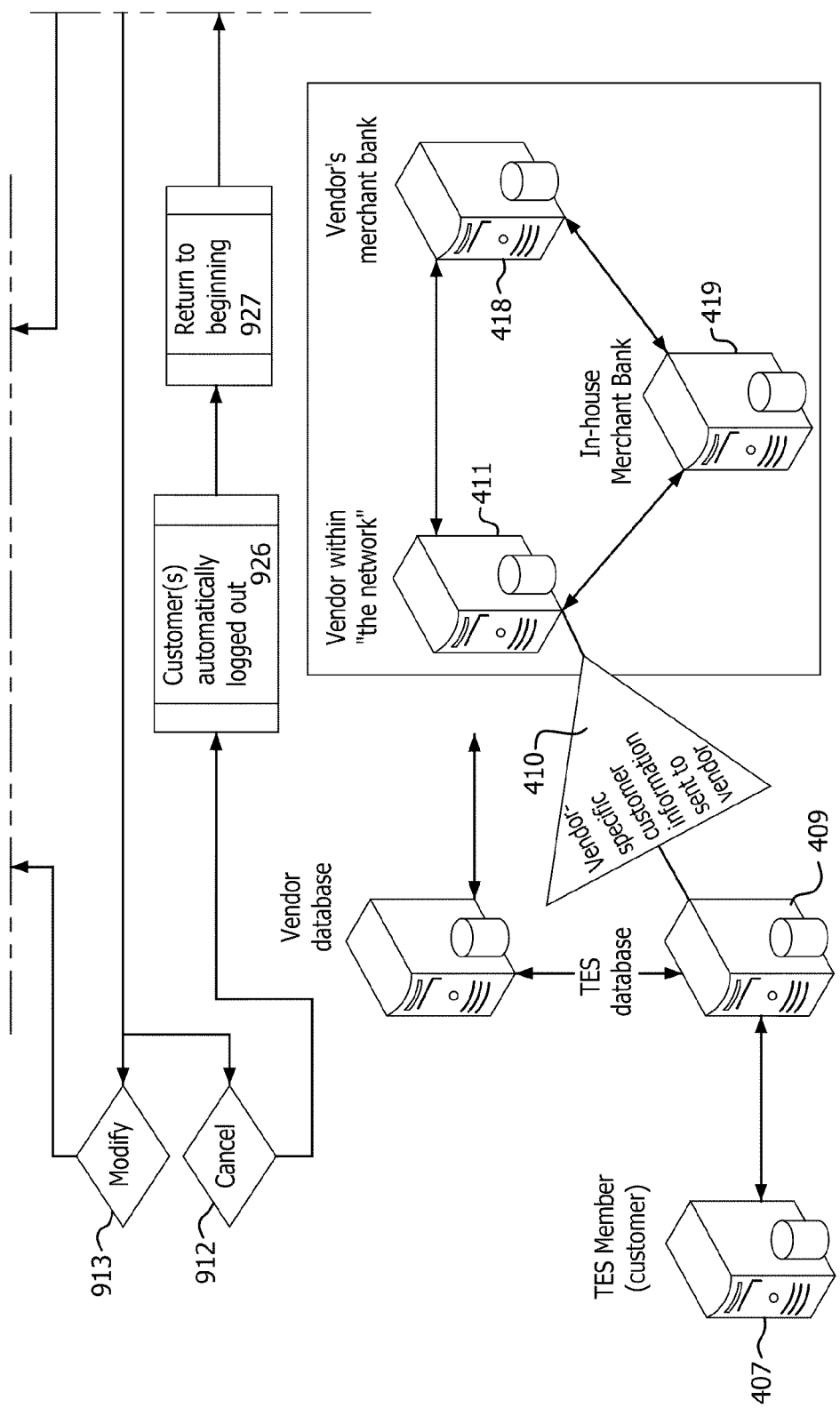
FIG. 10B3

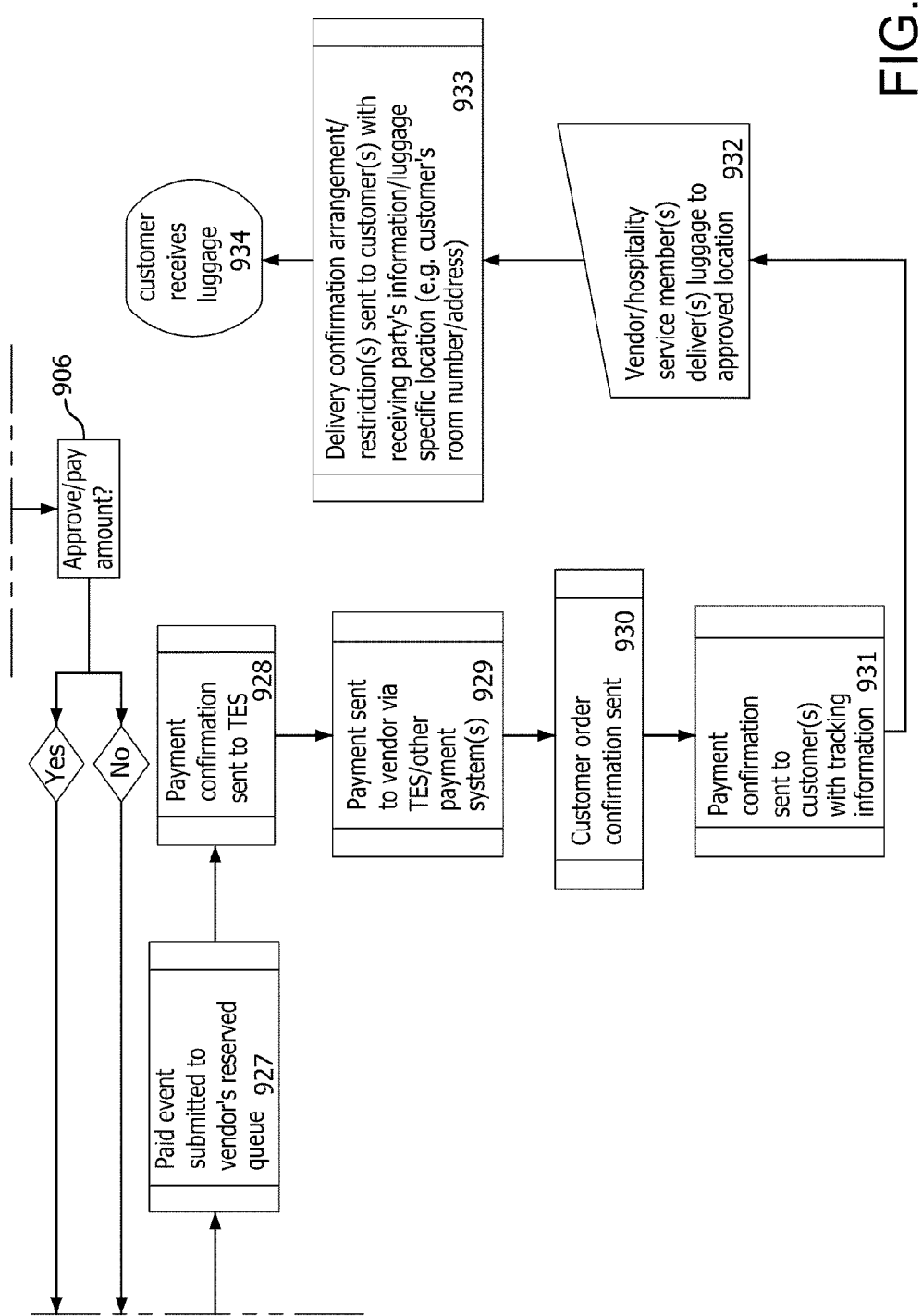
FIG. 10B4

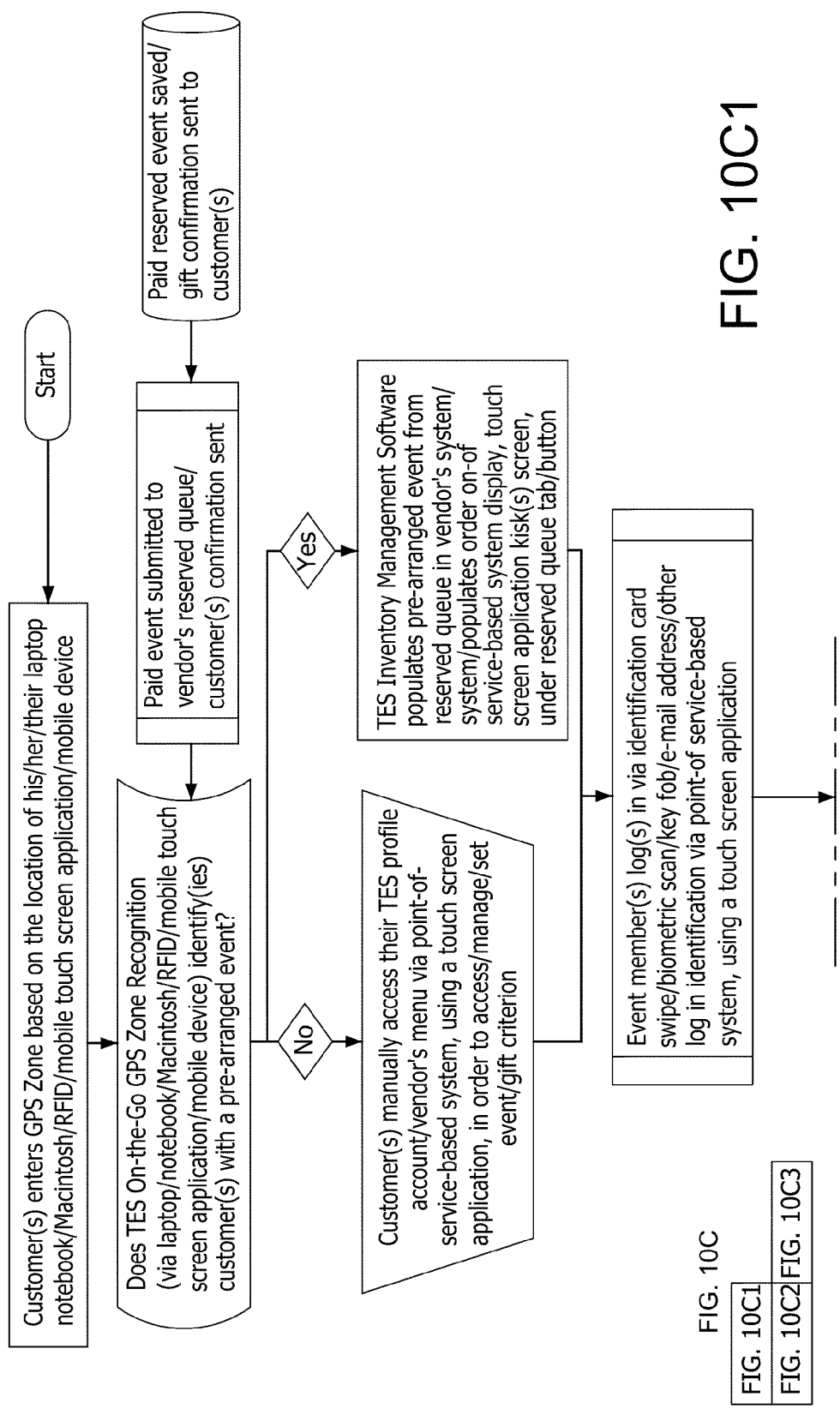
FIG. 10C1

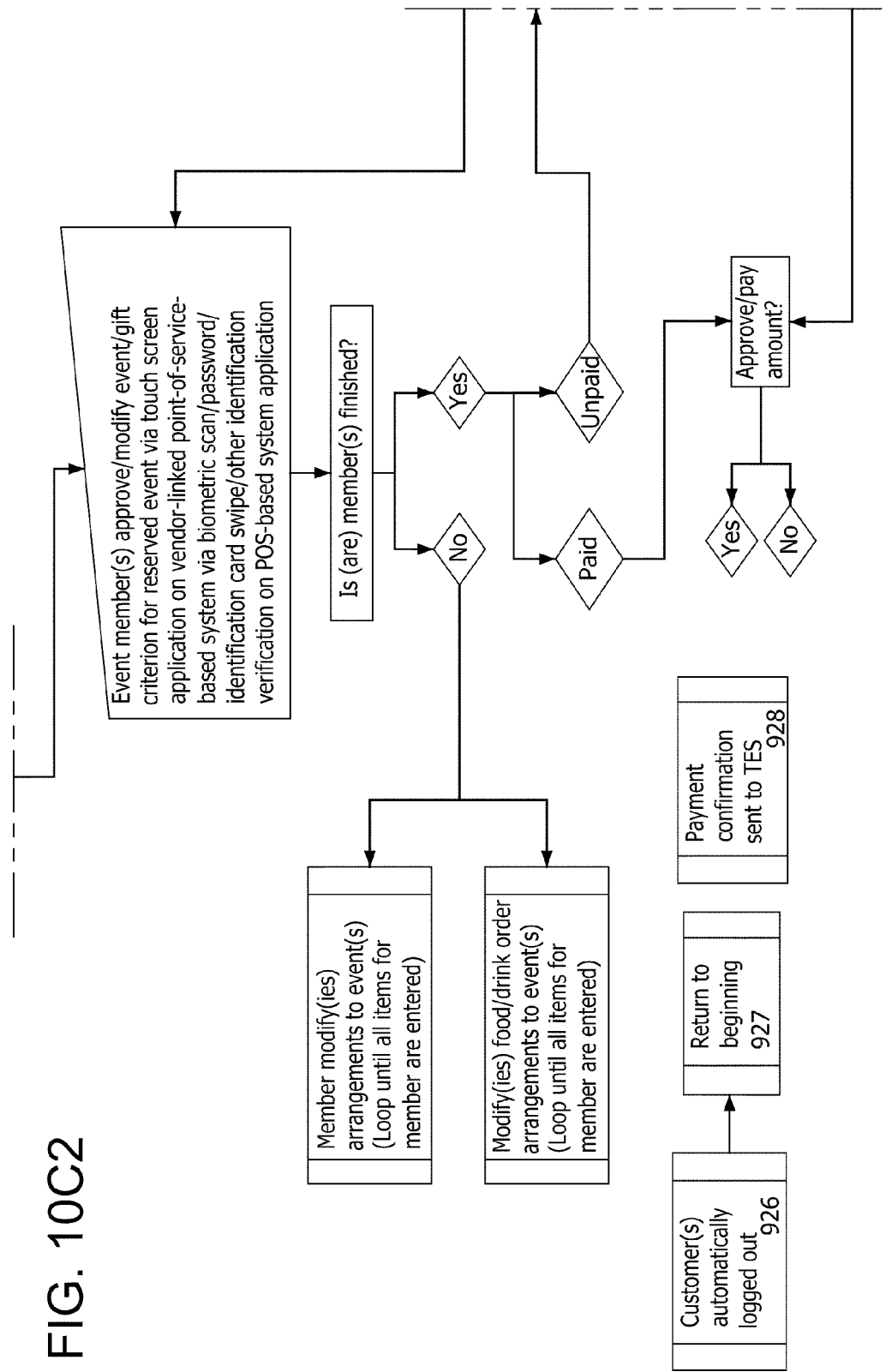
FIG. 10C2

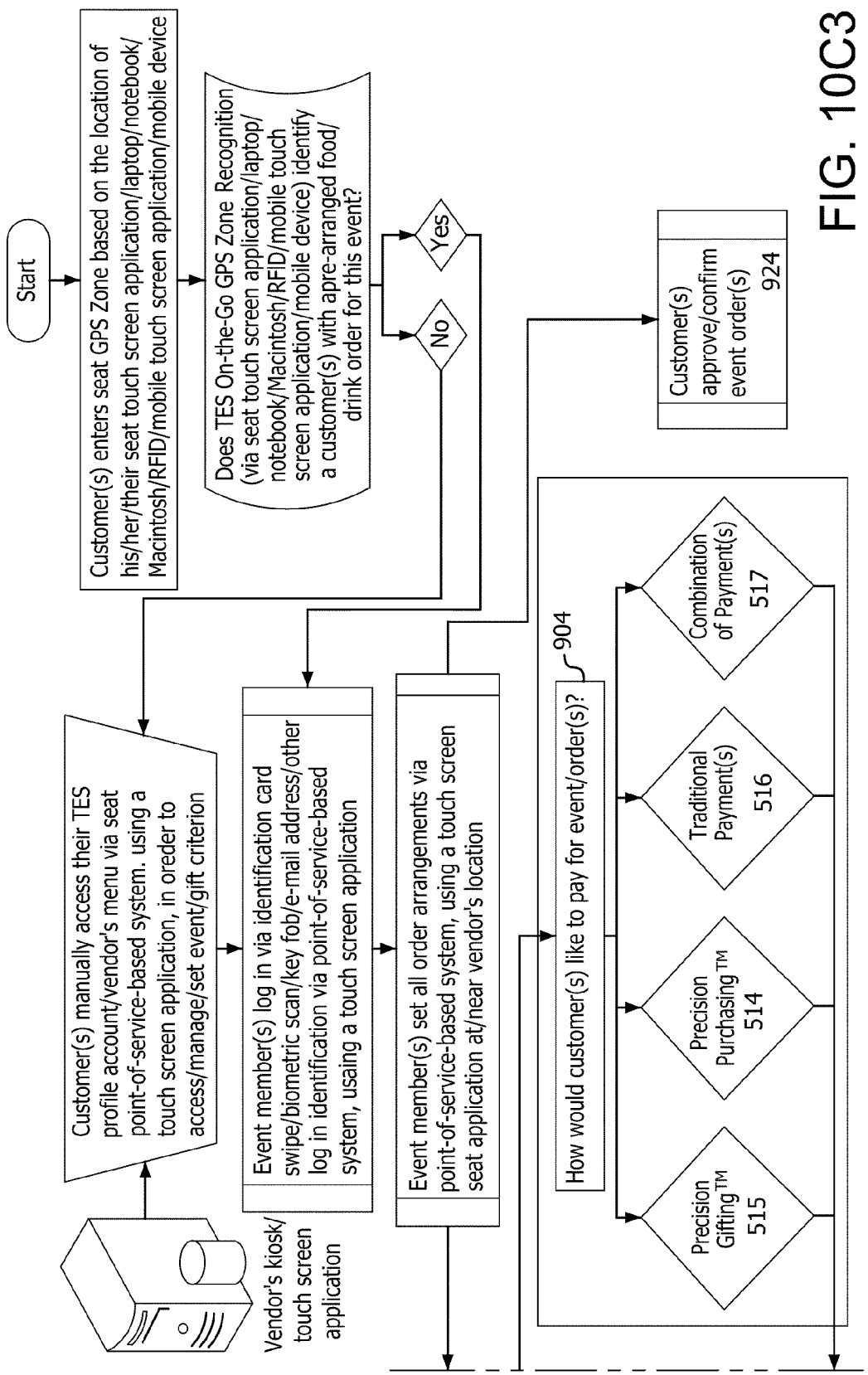
FIG. 10C3

FIG. 11

Online TES Restaurant Web Look

<- - SPECIAL INTEREST TICKER -> - ->

| 03/11 | 61° | | | | | | |
|---|---|---|---|---|---|---|---|
| Sign In/Sign Up Today | | TES http://www.tesonthego.com/expressway/restaurant | | | | | |
| PERSONAL CALENDAR | | | welcome, david! | expressway | business | friends | communities |
| BUSINESS CALENDAR | | | Search: | | | TES | Search Web |
| WHO'S ON ? | | TES | | | | | |
| ☐ JANE DAVIS | | RESTAURANTS | ENTERTAINMENT | | SHOPPING | | TRAVEL |
| ☐ RUSSELL BENDEL | | Starbucks | | | | | WOULD YOU |
| ☐ TOM BROCK | | | Work Group | | ▼ | | LIKE ANYONE |
| ☐ SCOTT WILLIAMSON | | Cheesecake | ● Cheryl Slomann | | | | ELSE TO |
| ☐ THOMAS WORTHINGTON | | P.F. Changs | ● Russell Bendel | | | | JOIN YOU? |
| ☐ JASON WEBER | | | ● David Overton | | | | YES   NO |
| FRIEND LINK | | Carrabbas | ☐ Howard Gordon | | | | |
| COMMUNITIES | | Red Lobster | ☐ Jill Peters | | | | Confirmation: |
| ☐ HOME TEAM | | | ● Matt Clark | | | | |
| ☐ THE BOYS | | Joe's Crab | ☐ Mark Mears | | | | Cheryl |
| ☐ FANTASY FOOTBALL | | More... | ☐ Marshall Hendrickson | | | | has accepted |
| ☐ MORE COMMUNITIES... | | | | | | | your invitation! |
| SHOPPING | | Search by Zip Code | | ADD MEMBERS... | | | |
| ☐ ENTERNTAINMENT | | 63117 | | | | | 5:45pm |
| ☐ RESTAURANTS | | | | | | | |
| ☐ CHEESECAKE FACTORY | | Russell: So that makes 5 of us, right? | | | | | 5:43pm |
| ☐ P.F. CHANGS | | Russell: Do you think that Cheryl will want to join us? | | | | | 5:43pm |
| ☐ CARRABBAS | | David:   Sure thing...I'll ask...sending invite... | | | | | 5:44pm |
| ☐ MORE RESTAURANTS... | | | | | | | |
| TRAVEL | | | | | | | |
| BUY/SELL | | | | | | | |
| MUSIC SHARE | | | | | | | |
| PHOTO SHARE | | | | | | | |
| BOOKMARKS | | <- - <- NEW BUSINESS ADS -> - -> (FLASH) | | | | | |
| TIPS / HINTS / DEALS | | | | | | | |

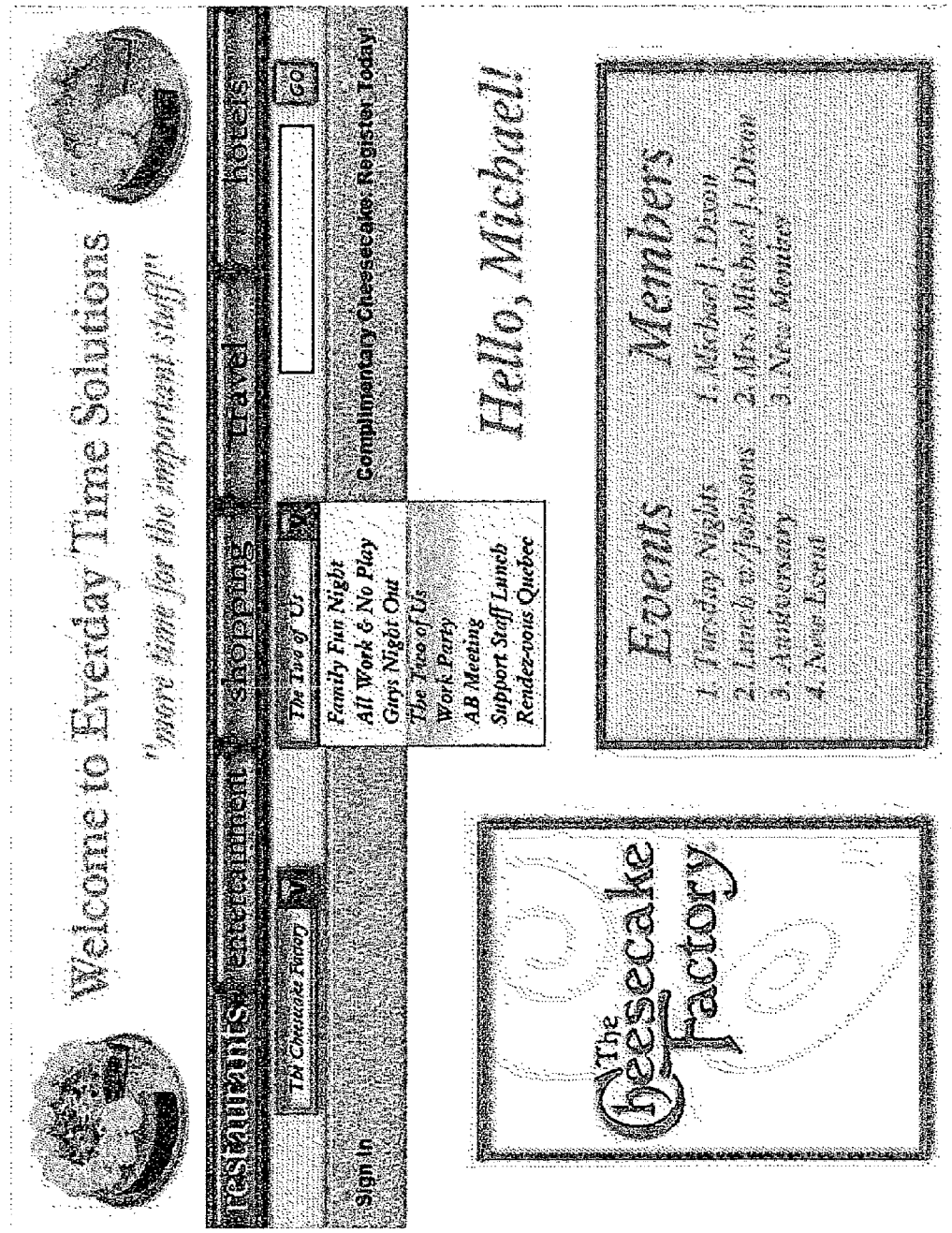
Figuure 12B

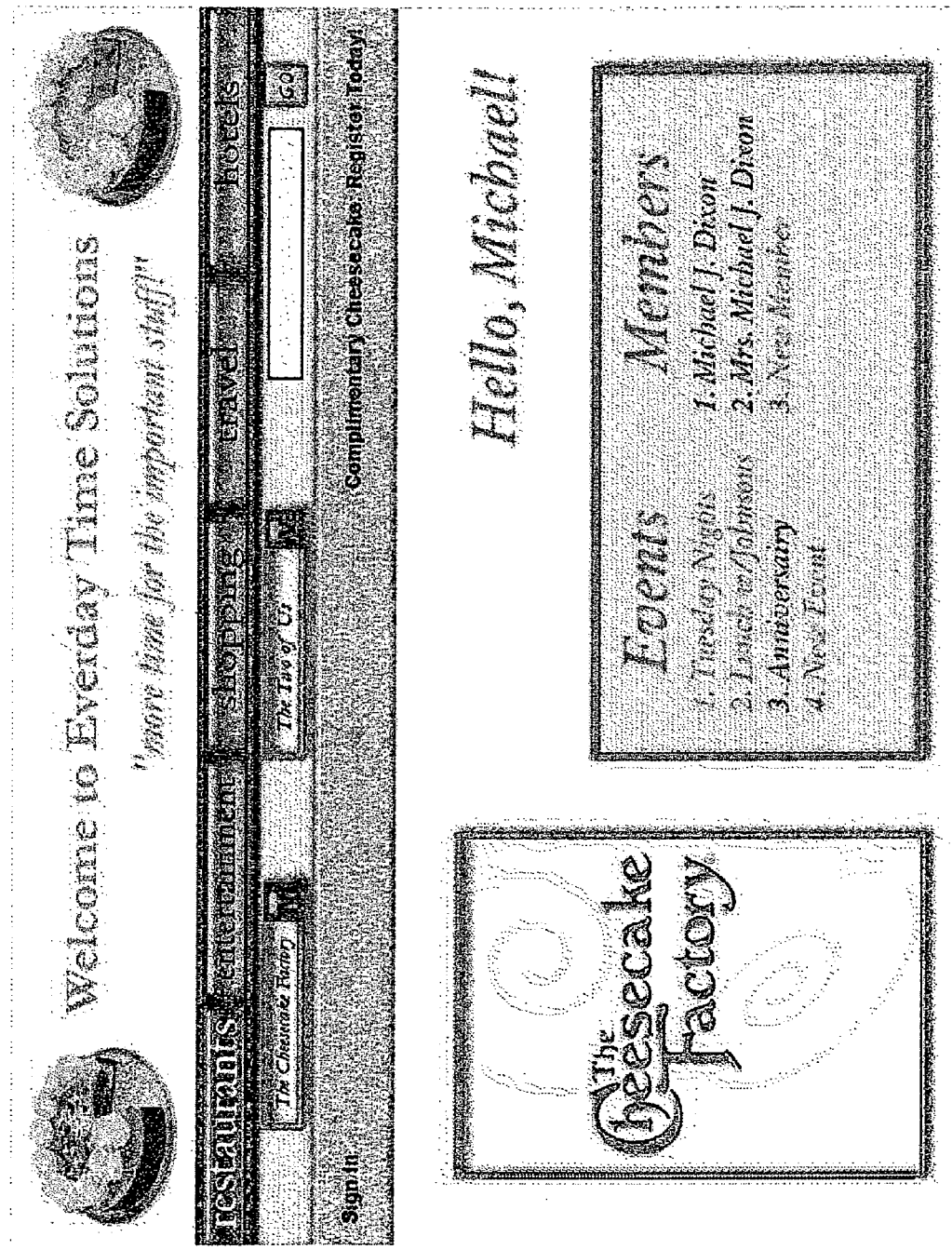
Figuure 12C

Figuure 12D

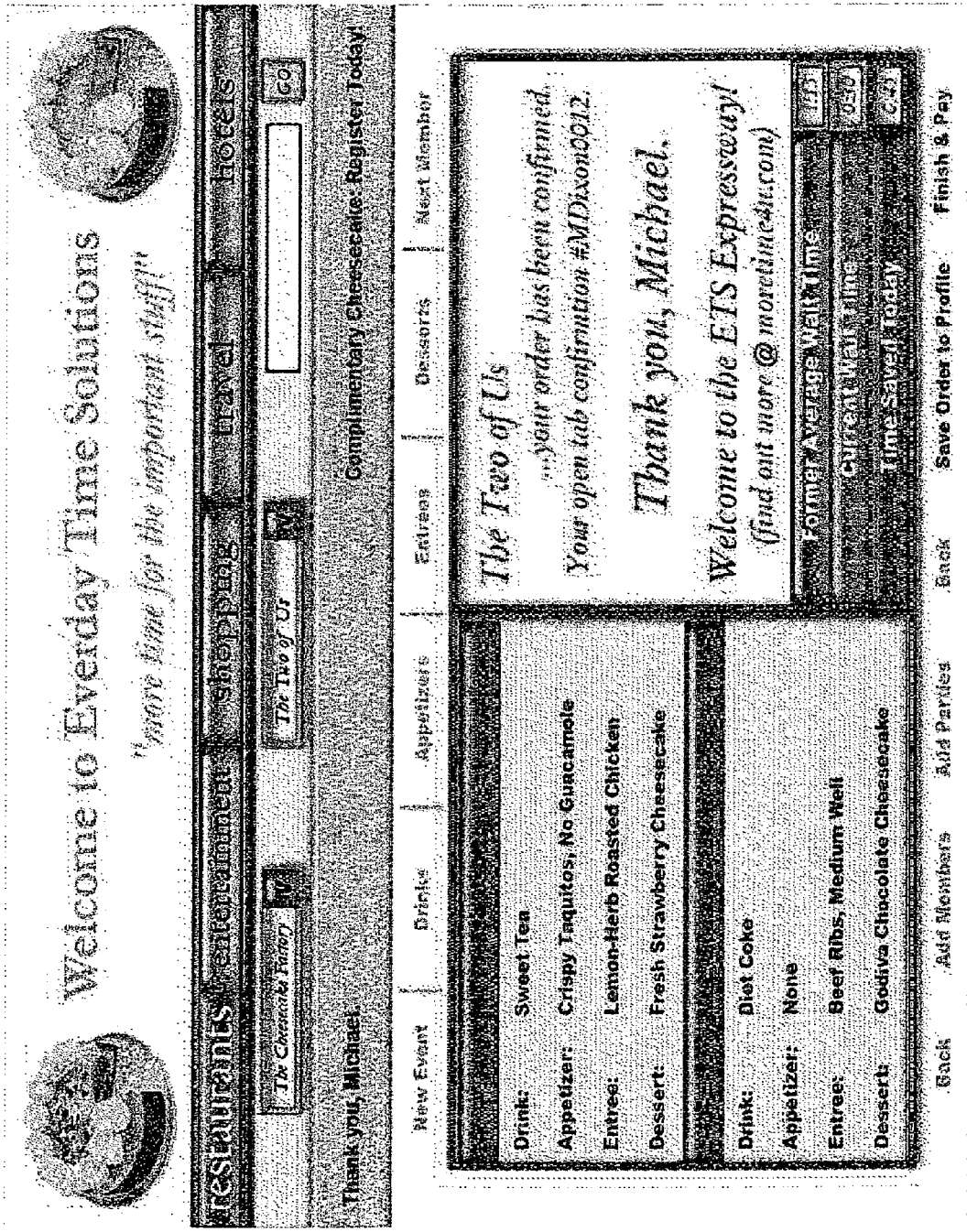
Figuure 12G

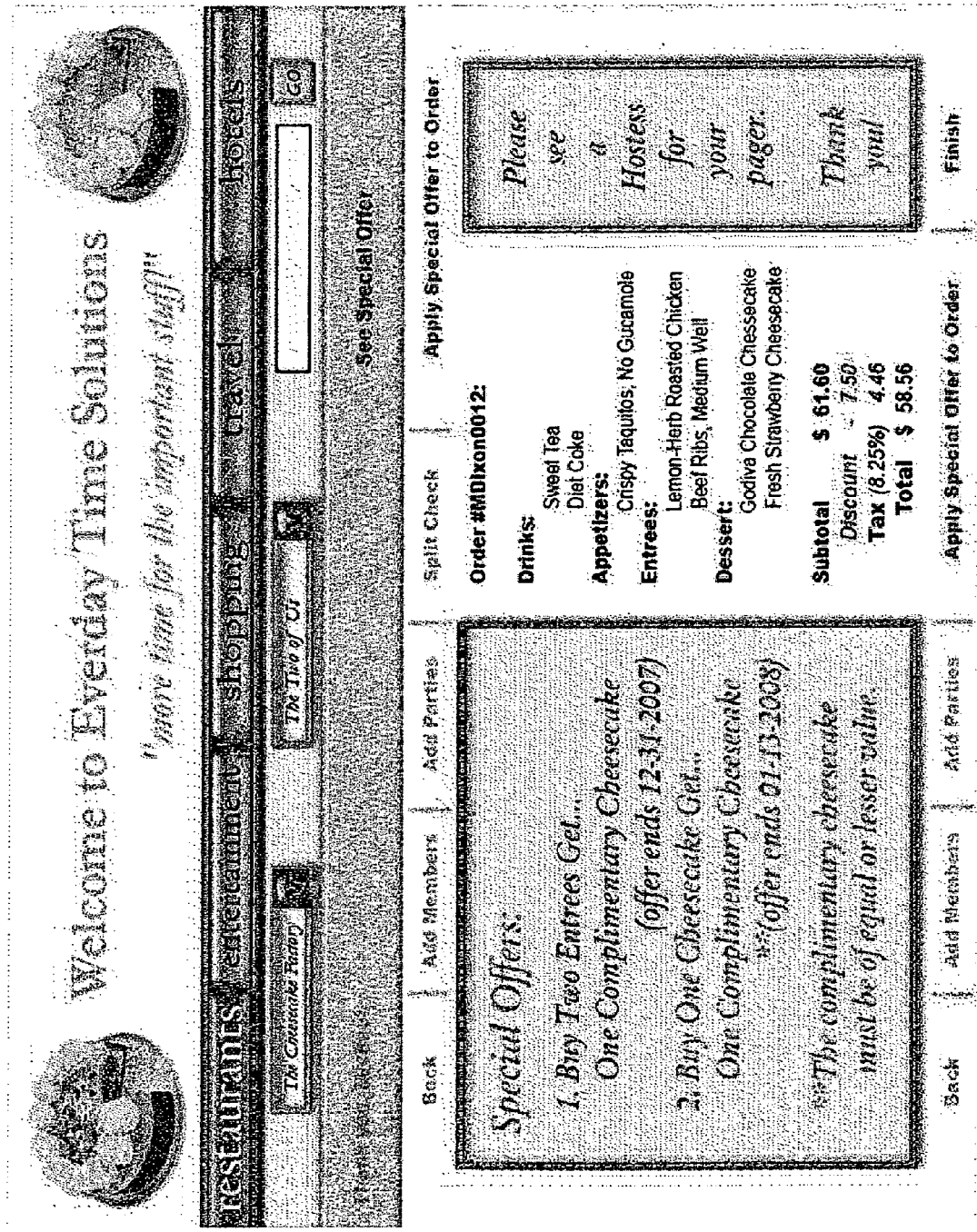
Figuure 12H

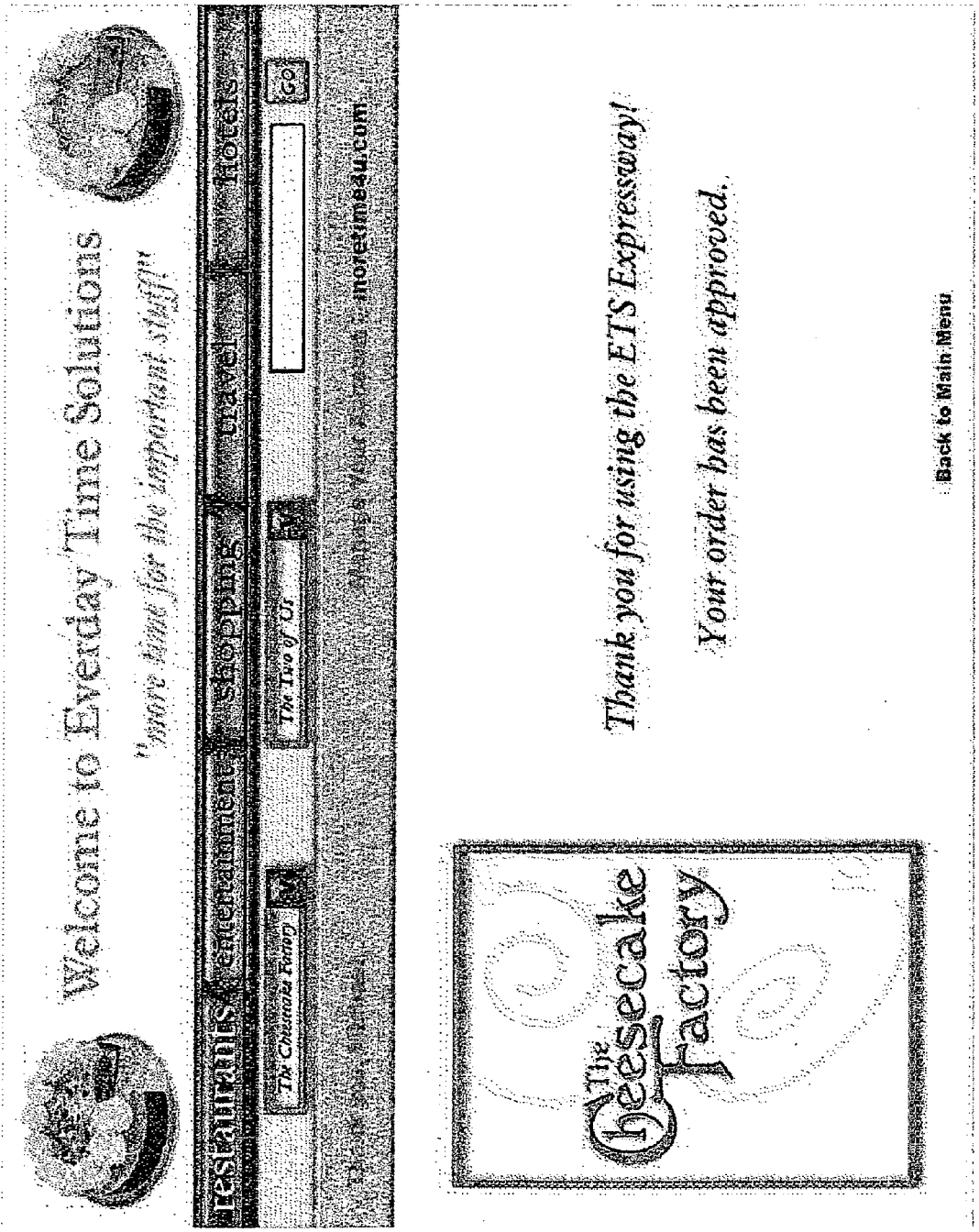
Figuure 12I

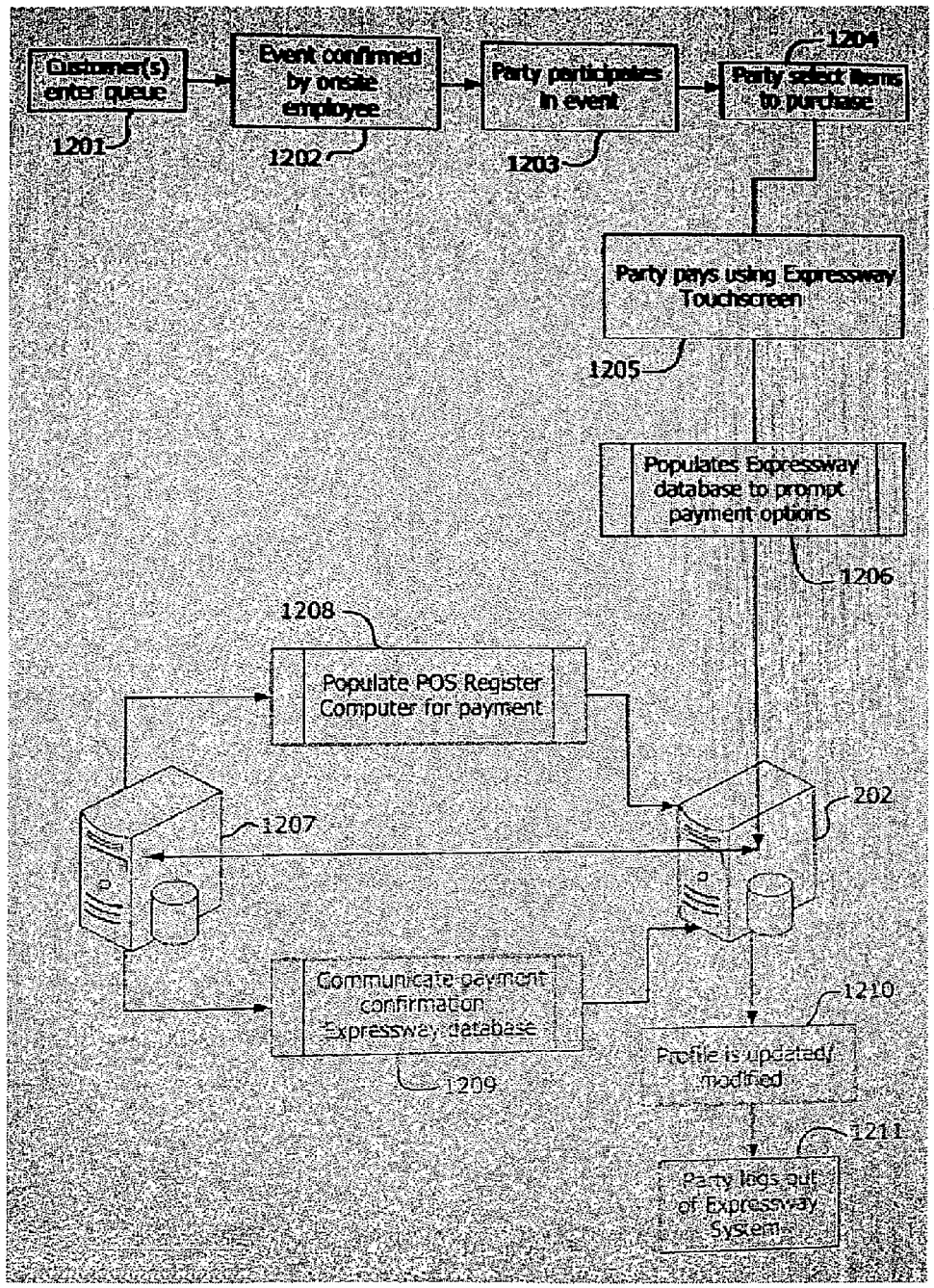
Figuure 12J

Steering Cover Automobile Application
Full Screen: Round Cover
TES Full Screen View Steering Cover Automobile Application
Wide Screen: Semi-circle Cover
TES Full Screen View Steering Cover Automobile Application
Wide Screen: Flat Cover
TES Full Screen View

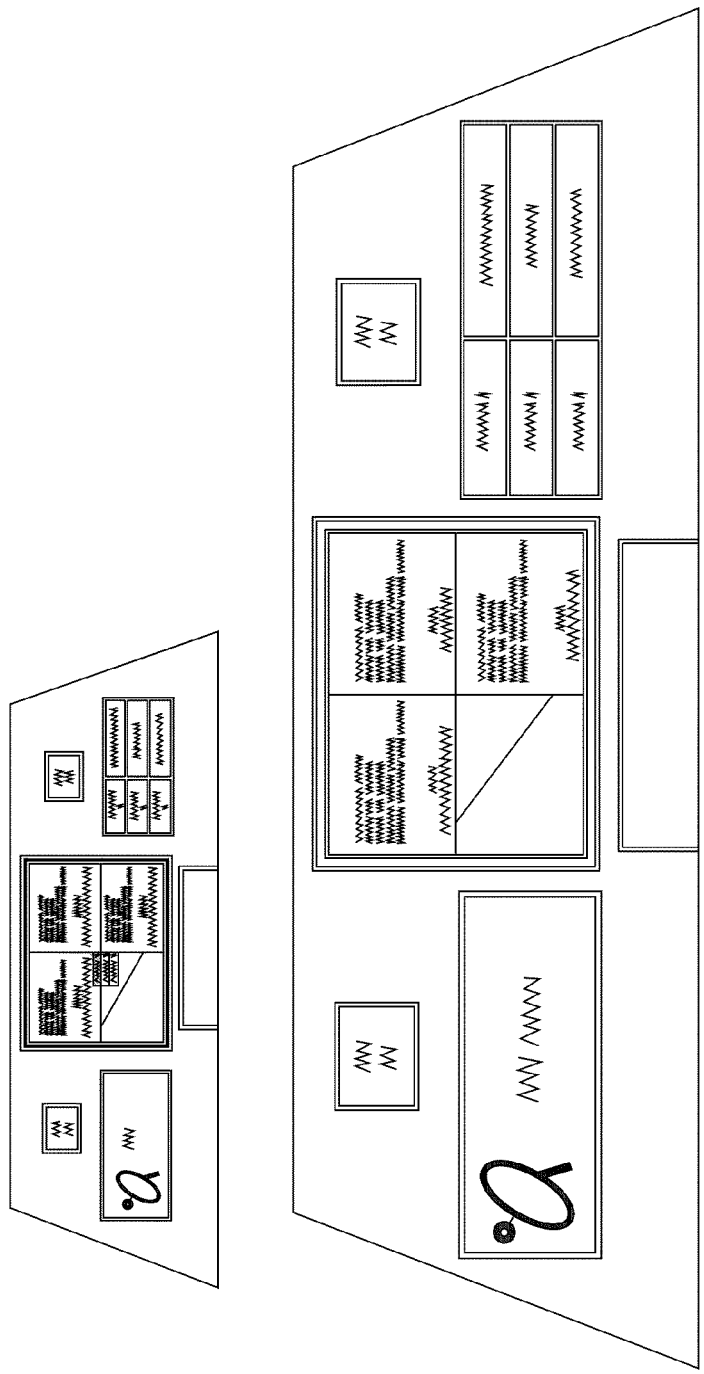

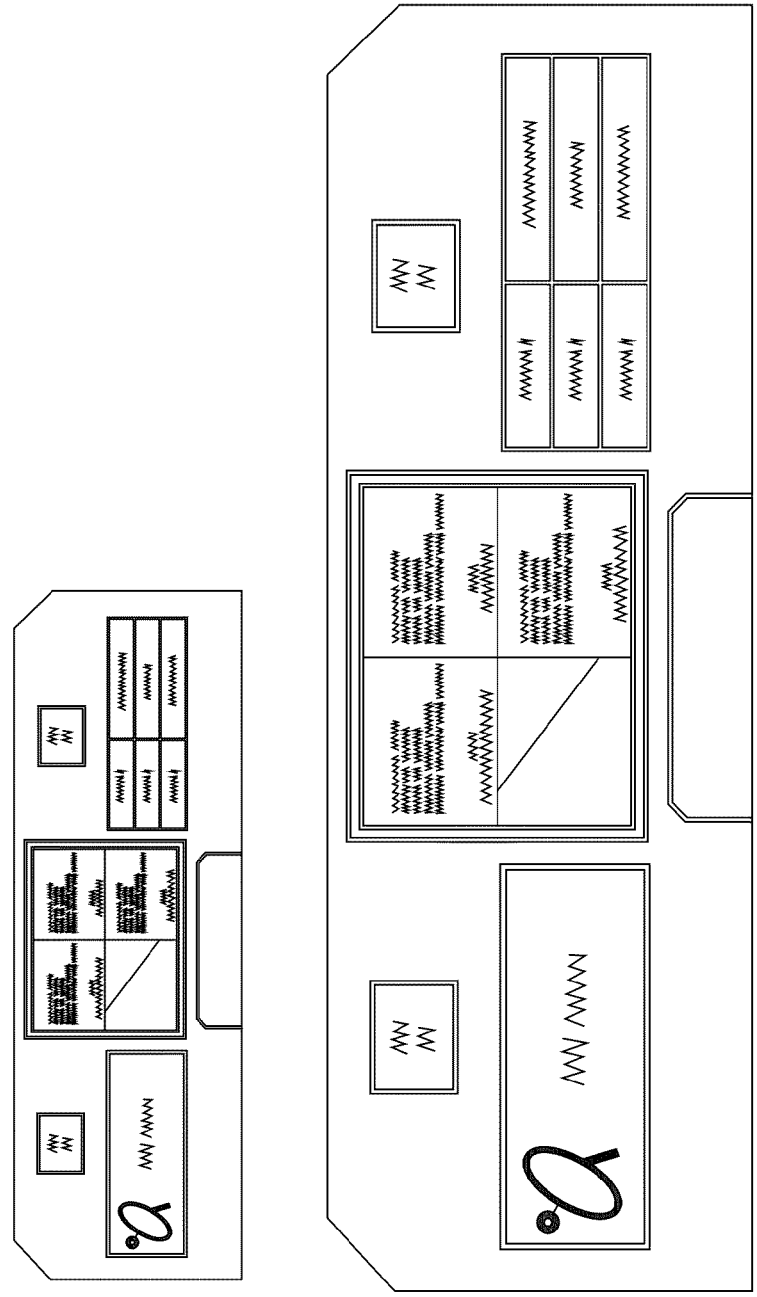

SYSTEMS AND METHODS FOR STORING CUSTOMER PURCHASING AND PREFERENCE DATA AND ENABLING A CUSTOMER TO PRE-REGISTER ORDERS AND EVENTS

CROSS REFERENCE TO RELATED APPLICATIONS

The present application claims benefit of U.S. Provisional Patent Application No. 61/179,554 filed May 19, 2009 and is related to U.S. patent application Ser. No. 11/741,704, filed Apr. 27, 2007. The contents of these applications are incorporated herein by reference in their entireties.

TECHNICAL FIELD

The present invention relates to a system and method for improving the accuracy of marketing to consumers by compiling a consumer profile database using inputs from web-based, point-of-service-based, and mobile device-based systems that collect data relating to consumer preferences and purchased, by developing profiles based on consumer preferences and purchases in certain industry sectors and the like, and by using such profiles and purchase information in conjunction with the geographic position of the customer to make purchasing recommendations and marketing offers across several industry sectors and to submit preregistered retail orders for purchase.

BACKGROUND

Companies in the restaurant, retail, travel, hospitality, and entertainment industries are constantly seeking new promotions for attracting new customers, moving them through the purchasing process more efficiently, increasing revenues, and improving customer loyalty. Additionally, these entities also constantly seek new ways to improve customer retention by obtaining more precise data about their customer's preferences that may be used to target market those customers. In recent years, technology has been used to implement new ways to attract customers and to create store-specific customer profiles and the like for purposes of improving target marketing. The Internet has facilitated such efforts by enabling data management of the collected customer information. However, target marketing efforts to data have been relatively ineffective as they group, score, and mine the customer data but do not effectively reach each customer at the appropriate time and place, instead using broad advertising calls, mailers, e-mails, surveys, and other methods of contacting the customer with general marketing campaigns. In short, the methods to date have not enabled vendors to gather the depth of information that they need in order to specifically tailor offers to meet each customer's needs while accounting for the customer's buying preferences. Better knowledge of the customer's specific purchasing and profile preference information will allow vendors to send precision offers to customers based on real-time purchasing and profile preference data of that customer. Moreover, an approach is needed whereby the precision offers reach the customers at the appropriate time (e.g., when the customers are in the proximity of the vendor's location) in the way that the customer prefers to receive such offers. For example, the system described herein reaches customers via a web-based profile account within a closed social network and network of vendors by contacting the customers with alerts in the form of a text, email, phone call, or other form of communication.

Conventionally, credit card companies collect empirical data from a customer's purchase history by scoring, which incorporates purchases made by the customer, to predict, based on probability, future purchases by that customer. The vendors, and sometimes the credit card merchants, sell this information after collecting the customer purchase information via scoring. The scores can take many different forms, from number signs to strings of entire data structures, but the most common are numerical scores. For example, in U.S. Pat. No. 7,328,169, a system is described that collects data about purchases by groups or "clusters" of customers and makes predictions of customer behavior based on the expected actions of members of the clusters using complicated algorithms.

Other companies specialize in loyalty programs based on transaction histories. For example, U.S. Pat. No. 6,119,933 describes a rewards program based on a customer's past transactional history at retailers within a network. One application of this method is in the form of a rewards card known as a retail "smart card." The vendors may access some of the customer purchase information based on purchases made at the vendors' stores. However, such a system does not include the purchasing preference data of the customer and does not incorporate purchasing information from other industries in order to create a more robust purchase preference profile. On the contrary, the collected information is generally limited to demographic information and purchase information when goods are purchased from specific vendors.

Another type of loyalty rewards program used by some banks is related to scoring data based on a purchase "relationship." The rewards include reduced loan rates, increased deposit amounts, and incentives. Management compiles reports based on this data and used the reports in the marketing efforts of the bank. This sort of internal marketing program is used for the specific purpose of reaching a customer when they have a specified credit rating or are in a particular financial position.

Other methods, such as those described in U.S. Pat. No. 6,039,244, are used to reward customers for repeat purchases. Customer purchase data is collected and used to generate rebates and coupons by identifying each customer with a unique customer code that remains invisible to the customer. This system uses a label or tag instead of a specific client username/account number for identifying the customer.

Still other marketing methods include the methods described in U.S. Pat. No. 5,930,764, whereby a customer's bank history is used to reach the customer for financial marketing campaigns. These records are also used to track sales and service performance of internal operations. The collected information is housed internally and organized according to geographic region and other such groupings. The information is gathered using queries from bank recorded transactions and the results are housed in a central database system for sharing with other internal departments for purposes of marketing campaigns. The data is not shared with the customers and does not enable customers to utilize customer preference data of other customers within their business and/or personal network of contacts for purposes of, for example, buying gifts for the other person.

Existing systems allow customers to customize their profiles with items from any vendor within the network of vendors at his/her choice. Also, some methods, such as those described in U.S. Pat. Nos. 5,933,827 and 5,999,975, link websites and users into categories in order to search for potential matches of what vendor or site the customer may like if they like another vendor or site. However, rather than using such automated matching systems, it is desirable to leave it up to the customer to group and customize the web-based application of the profile system to his/her own business/personal preference of grouping vendors, web pages, and users and to add vendors and websites to his/her web-based profile account within a closed social network and network of vendors.

Another method of calculating user choices in the prior art is based on probability of previous user choices by way of ranking popularity. Thus, if the known data ranks at the top of the priority, then a system of probability will add relevant matches using collaborative filters. Such a system is described, for example, in U.S. Pat. No. 6,006,218. It is desired to instead use "controllable parameters" whereby the user determines exactly what vendors, items, and privacy options for other users that they wish to set themselves for their business/personal profile. In addition, it is desirable for the customer to be able to choose the popularity of vendors and users within his/her network based upon, for instance, events they have scheduled, users that they have recently held conversations with, and other selections that he/she has chosen within his her business/personal interests within a web-based application.

Yet another approach to collaborative advertising/marketing in the prior art is in the form of the automated filtering of users into a community based on other users with similar interests. More specifically, U.S. Pat. No. 5,918,014 describes a system in which users that view a certain site on the World Wide Web simultaneously will be offered the same advertisement by means of "cookies." However, it is desirable for the user to choose with whom he/she would like to be associated within a social network, for instance, by way of the web-based application of his/her business/personal profile. In addition, it is desirable that recent purchases and personal preference updates be what triggers offers into his/her account. For example, if a user chooses a flight to a city and stays at a hotel within the "network" and perhaps dines at a restaurant or participates in an entertainment event within the "network," the user may be offered a return visit and may set how often he/she would like to receive offers to his/her profile account. In the same example, it may be desirable for the user to be offered a similar "trip" to a similar city, whereby he/she may be offered incentives to choose similar restaurant, retail, travel, hospitality, and/or entertainment offers from vendors within the "network." Again, it is desirable for the user to set who may contact him/her by way of his/her web-based profile within a particular window of time designated by the user.

A different type of collaborative filtering, similar to Amazon's customer "Who Bought" feature, is described in U.S. Pat. No. 6,041,311. This method of filtering is stored into the "memory" of user profiles. The item is stored with the user's rating of the item. When a similar item becomes available, the user is presented with an offer. Users can be grouped, then, into clusters based on the plurality of his/her selections. It is desirable to use a similar method to gather customer data whereby the customer may choose what items he/she values as "popular" and may modify his/her "popular" picks over time. However, it is also desirable that each user further have the ability to set who they may be grouped with and what vendors he/she would like to receive offers from within the "network." In other words, it is desirable that the grouping be specific to the item(s) or category of item(s) from any number of vendors in any area of business, restaurant, retail, travel, hospitality, and/or entertainment, within the "network." Also, if a user wishes to travel to a new destination, based on the user's restaurant, retail, travel, hospitality, and entertainment preferences in his/her profile, the user may wish to receive package offers that he/she may also like. Moreover, it may be desirable for a package offer to include types of restaurants, retail, travel, hospitality, entertainment, and a combination thereof that are customized to the user's specific preference choices and previous purchase history. Although the offers may be made by grouping choices of previous preferences and purchases, the offers may be customized based on the user's profile information.

In addition, there are a handful of applications, such as described in US Patent Application 2006/0136589, where a computer generated profile system is used to make recommendations based on probability calculations, instead of finite preferences. However, such an approach requires complicated algorithms and does not effectively integrate actual customer choices.

Other prior art methods of marketing that include the use of customer purchase history shared in a community are limited to purchases only. For example, US Patent Application 2005/0261987 is a good example of a content-based system of filtering in a collaborative environment where the community can see all or a limited purchase history in order to find products with which the user has interest. However, this sort of group is limited to purchases that the user has made and often does not give the user the ability to choose who may see what data or, more specifically, who is in his/her "community."

Still other prior art methods, such as described in US Patent Application 2003/0216956, build customer preferences by way of questionnaires. With this method, a customer is given further insight to his/her purchase history by way of answering questions detailed in the questionnaires. Although this method gathers information based on transaction history, it does not access customer preferences in a convenient manner. For example, it is desirable to enable a user to choose to purchase a pair of pants from a store whereby the user is offered items in the same category according to his/her personal criteria which he/she has detailed in his/her profile. A shirt of the same line, detailed to his/her shirt cut, style, color, and other preferences, may be offered to accompany the order. Therefore, the user has customized his/her preferences in his/her profile in order to avoid items that are not related to his/her preferences. With no questionnaire needed, the customer could input directly his/her preferences.

Another prior art method of marketing is based on offering incentives and determining if the incentives were redeemed in a tracking system, as is the case in US Patent Application 2003/0158776. These incentives are tracked by way of proof of purchase and "cookies." This is a very complicated system that has very little input from the customer. It is another method of predicting what the customer may like based on what offers have been accepted. It is desirable that the customer instead be offered incentives based on a combination of his/her personal preferences detailed in his/her profile and purchase history and that vendors send offers that are popular to the customer rather than predicting what the user likes based on redeemed offers. The logic is similar whereby a general offer may be sent to the customer in order to induce a repeat purchase. However, it is desired that the preferences be compiled in a system by the customer based on the customer's purchases. For example, if during a recent visit to a restaurant within the "network," a customer purchased a piece of cheesecake, it is desired that the offer that he/she may receive from the vendor from whom he/she has recently made the purchase, as well as all other customers that have elected to make purchases from or build a profile for this vendor's restaurant within the "network" by way of the invention's database, may be an offer for a "sign-up a friend" marketing campaign. In this offer, he/she would be offered his/her favorite, most recently purchased, or other criteria specified by the restaurant vendor, piece of cheesecake when the customer refers a friend to create a profile. In this case, the customer's follow-up could be used for future offers or the like by this or all vendors within the "network." As another example, the original customer could sent an e-vite through the system's web application to tell a friend about the offer and add his/her comments to the invitation. The original customer may also receive an incentive built into the vendor's promotional offer when the new member accepts and registers an account.

An example of data mining of purchase information in a prior art system is described in US Patent Application 2003/0088491. The intent of that method is to create cross-promotional marketing opportunities by creating "association rules" and "profit levels" for each product. However, it is desirable that the association of the cross promotional marketing opportunities be paired in a much different way. For example, it is desirable to provide a method to (1) allow vendors within the "network" to join together, for a single or multiple campaigns, in order to reach a specific set of users based on their elected, collaborative criteria, and (2) allow the user to use the customer preference data within the customer-built profile database system to consult companies within and outside of the "network" in order to offer business consulting on company campaigns and the opportunity to invite other businesses to join the "network" for cross-promotional marketing opportunities. Unlike many systems, however, this information would preferably not be sold or shared within any company outside of the "network."

Possibly the broadest method of grouping customer data as it relates to the current invention is detailed in US Patent Application 2003/0061132. In this method, categorizing, aggregating, and analyzing consumer and business payment transaction data according to geographic, demographic, topological, meteorological, chronological, and other parameters for analysis are used in different industries of commerce to assess customer's future purchases based on purchase amounts, rather than by actual items purchased. It is desirable to further market to the customer based on his/her profile preferences and purchase history within the "network" of vendors and vendor products.

Travel companies, such as Expedia, Hotwire, Tripit, and the like, present offers to customers who have trips to destinations within their "network." They offer trip packages to customers based on his/her previous purchase history. Sometimes these offers will be accompanied by offers within their stock of promotions from their "partners." However, in these systems, customers do not build a total profile detailing services and items that the customer prefers. In addition, the marketing offers that the customer receives is a "bottom-of-the-barrel" or "last minute discount" offer, instead of a specifically tailored offer that meets all of the customer-preferred criterion. Moreover, the medium with which this method is used is via e-mail offers. It is desirable that the system instead utilize each customer's business/personal profile in order to provide the customer with offers that meet all of his/her preferred criteria and/or past purchase transactional history. Going beyond virtual personal assistant solutions, it is desired to market to each customer based on a combination of his/her past purchases and current Profile preferences in the areas of restaurant, retail, travel, hospitality, entertainment, and a combination thereof by sending relevant offers to the customer based on his/her profile so that he/she may access them onsite and/or online using web-based applications via a mobile device, onsite touch screens, stand-alone kiosk touch screens, and all other methods of accessing a web-based profile database.

A system is further desired whereby a customer may be presented with giving options, whereby a customer can gift a pair of pants, for example, to another customer within his/her approved network of contacts and accurately choose the size, color, cut, and other specific preference information of another customer without needing to know the customer's personal information, such as street name, banking institution, and other such private information. Therefore, a system is desired that reaches beyond capturing and organizing customer data based on purchases alone. A system is also desired that gives customers the ability to utilize the customer preference data of other customers within their business/personal network of contacts for the purposes of providing personalized gifts in the areas of restaurant, retail, travel, hospitality, and entertainment. A system that supports marketing campaigns that are tailored to a combination of each customer's purchases and personal profile data that is used for the purposes of consumer purchasing remains desired.

The system described herein further contemplates the use of a cardless payment system utilizing a customer's profile information. For example, the Precision Gifting™ and Precision Purchasing™ systems described herein use methods of purchasing via a customer's user name and biometric scan verification at a stand-alone kiosk, vendor locations, and touch screens in airplanes and the like in order to access the customer database to make purchases and provide gifts to other customers in the areas of restaurant, travel, hospitality, entertainment, shopping, and a combination thereof. Though used for different purposes, several "cardless" payment systems may be found in the prior art. For example, a cardless transaction system is described in US Patent Publication 2007/0083400 whereby a user is preauthorized to pay for a desired service by credit and the authorization is forwarded to a point-of-sale system at the point of purchase. Other cardless transaction systems, such as those described in U.S. Pat. No. 7,006,986 and U.S. Pat. No. 7,080,048, use verification parameters of the customer's account information to validate a merchant transaction for payment. Verification of electronic transactions may also be provided using biometrics, as described in U.S. Pat. No. 6,920,435, U.S. Pat. No. 6,950,810, and U.S. Pat. No. 6,286,756, or may be tied to the customer's telephone number, as in U.S. Pat. No. 6,227,447 and U.S. Pat. No. 6,341,724. Cashless gaming systems, such as those described in U.S. Pat. No. 6,585,598 and U.S. Pat. No. 6,739,975, also permit wireless cash transfers over wireless communications devices using identifying information of the individual and a PIN number, thus enabling use of a particular gaming machine. Adaptation of such systems for use with the customer profile system described herein is desired.

A system and method is desired that meets the above and other related needs in the art.

SUMMARY

The present invention addresses the above-mentioned needs in the art by providing a web-based, pos-based, and mobile device-based Precision Gifting™ and Precision Purchasing™ system and online central database customer profile management system that, in restaurant, retail, travel, hospitality, and entertainment embodiments, interfaces with vendor and banking computer systems to minimize undesirable wait time, non-returning customers, and other revenue reducers found commonly in a conventional event experience. In a travel embodiment, the customer's affinities are used to propose travel packages with hotels, restaurants, and entertainment spots that match the customer's travel affinities. Similarly, in an entertainment embodiment, the customer's entertainment affinities are used to propose entertainment packages that match the customer's entertainment affinities. In a shopping embodiment, a customer may arrange a shopping event where the customer may go to a participating store and have purchase options waiting for review, where such options satisfy the customer's shopping requirements set forth in the shopping event, based on the customer's profile preferences. In addition, the customer may invite others within their personal/business network of contacts or groups of contacts to join an event. Moreover, customer's have the ability, within their networks, to utilize the Precision Gifting™ system in order to add dollars to the accounts of participating members of an event. In the same way, non-participating customers may also gift money to participating customer's accounts via the Precision Gifting™ and Precision Purchasing™ method of payment which may be used for an event or may be added to any account in general for any future purchase, such as an allowance, birthday gift, or spending money. These funds may be transferred electronically via the banking institution of choice into the desired giftee's business/personal customer account. Thus, credits (as opposed to points) will be added to the giftee's account according to the whole dollar amount gifted.

In an exemplary embodiment, customers access a web site and create a user profile that is linked to the customer's email address or some other customer identifier. Once registered, the customer is granted access to the menus or other service options of restaurant, hotel, airline, resort, retail shopping location, entertainment spot, or other service providers. In the case of a restaurant, the customer may create menu preferences that may be accessed at any participating restaurant vendor within the "network." For example, the common menu of a franchised restaurant chain is provided and the customer creates a customized profile of desirable menu options that may be accessed at any chain of the franchise or at corporate or independently owned stores. The registered customers may also make a reservation at any such participating restaurant for a party of any size in advance (for example, up to 24 hours) of the reservation time. Additionally, the meal order for each guest in the party may be completed in advance and maintained on a server, in a reservation queue. When the party arrives at a specific reservation time or within a designated reservation window, the customer may access the reservation order and related promotions that are stored on the server, which communicates with the web-based applications via mobile device, onsite touch screens, stand-alone kiosk touch screens, or other methods of accessing the web based profile database located in the customer's possession or in/near vendor properties and connected to the server via the Internet, for example. The customer's identity at the point of purchase is verified either by GPS recognition of the customer's phone, user name, e-mail address, key fob, access card, biometric hand or finger scan, retinal scan, password, or other terminal kiosk, touch screen, or mobile application of the like. This verification is independent of any ID card that may be presented by the customer. After the verification process, the customer may retrieve the party's meal order, make any desired changes, and then verify the meal order. Once the meal order is verified, the customer may finalize the order and proceed to the hostess kiosk where the meal order is accessed by the restaurant seating management and kitchen management staff. If desired, the meal may be pre-paid with the Precision Purchasing™ service or by a credit card, debit card, some other form of bank certified payment method, or for later settlement on-site within the restaurant event by cash, credit card, debit card, Precision Purchasing™, or some other form of bank certified payment method that may be verified on-site with a biometric scan or the like.

Once the meal order is placed, the party's order may be entered into a seating management system and kitchen management system or placed in a wait queue in the traditional manner prior to being seated. The party is then immediately seated or asked to wait until an appropriate table is available. Either when the party is seated or at an appropriate time prior to seating (based on a comparison of the seating wait queue to the kitchen wait queue), the meal order is forwarded to the kitchen for meal preparation. The kitchen may or may not also have a computerized kitchen management system into which the order is placed. The timing would be arranged such that the customers received their appetizers, drinks, and entrées shortly after being seated.

The system and method of the invention thus save the time for waiting for the customer's orders to be taken and ties the timing of the order fulfillment to the seating of the customer. The customer's wait time is thus reduced and the restaurant's tables are also turned over more efficiently. Also, valuable marketing information, such as what the customer ordered, can be stored and later used for Precision Marketing™ to the customer, to adjust menu options, to adjust inventory requirements, and other efficiency and revenue improving methods of business management and marketing. For example, specific discount offers can be sent to all customers who have ordered popular entrées of their choosing or are that which they are likely to order, based on his/her meal preferences data. Also, special offers and coupons can be sent by a vendor to the customer via his/her customer profile account or email and/or accessed by the customer at terminals in and around the restaurant or by using his/her mobile device, laptop, notebook, or Macintosh to accesses his/her business/personal account, given Internet access is available. If the vendor wants to send a dessert promotion, each member may receive a different offer for his/her favorite, most frequently purchased, or any other criteria set by the vendor in the member's account. Thus, the vendor need only send a "½ off promotion on your favorite dessert offer." The customer may then possibly receive a photo of his/her favorite dessert in the offer that is sent out across the vendor's specified user accounts within the member network. The customer may choose in his/her profile to receive offers within a window of time from vendors within the network via his/her mobile device (e.g., via texting, GPS population, other alerts) given the GPS location of the mobile device.

In another exemplary embodiment where the service provider is a restaurant, walk-up or drive-up customers may also be accommodated by way of the customer's mobile device, laptop, notebook, or Macintosh or the on-site kiosk, or other customer terminal applications, given Internet access is available. If the walk-up or drive-up customer does not have a profile, one can be created that is linked to customer identification information such as a GPS recognition of the customer's phone, driver's license, credit card or debit card scan, biometric hand or finger scan, access card, retinal scan, password, key fob, or mobile application or the like, that is inputted by way of a customer's mobile device or at the freestanding kiosk touch screens, countertop touch screens, and free-standing drive-up/walk-up kiosk touch screens applications located in the customer's possession or on/near vendor property, leased space, or customer terminal. Once a customer profile is created, or if the customer already has a profile, the customer can enter the number of people in the party and access the restaurant's menu and enter meal orders for the party. The pre-registered orders may be held under the primary account holder's name or group name, and all of the member's orders will be preset in the delivery queue, ready for confirmation by the designated primary account holder or party member once he/she arrives on-site. Thus, not all parties have to be present to move forward the pre-registered order. All orders are placed on the screen for one approval/edit at the time of arrival for maximum efficiency. Once the meal order is completed, the same process is followed at the hostess kiosk as in the case of the reservation and meal pre-order placement option via the web application as described above.

In a GPS zone embodiment, a preregistered or reserved event order is recognized by the customer's mobile device, for example, as the customer enters a "GPS zone" in proximity of the location where the service will be provided. At a point in time between online preregistration of an order or event for approval, payment, and delivery, a mobile device associated with the customer's profile/preregistered event/order populates a GPS Zone recognition process that populates the stored preregistration data from a queue and displays the customer's event/order on the kiosk or mobile device of closest proximity. For example, a pre-selected order may be transferred automatically to the queue once the mobile device enters the plane of the GPS zone, either in a drive-up or walk-up scenario. Then, the customer edits and approves the order with his/her verification information, such as password, biometric scan, and the like, and the order is set for delivery. In this embodiment, the customers are organized by the time of arrival and proximity to the point of delivery, not by the time of pre-registration. This improves the efficiency of order delivery.

As a further example, if a customer uses catering and box lunches as a source of daily revenue, the system may offer a traditional restaurant design without a drive-up window while still providing the vendor the opportunity to know a customer's proximity for efficient delivery via the GPS Zone. The system enables a customer to pick up orders, even complex orders, without getting out of the car or, if pre-paid using Precision Purchasing™ or Precision Gifting™, without having to make a payment on-site.

The techniques of the invention may also be used to improve efficiencies in other travel, hospitality, retail, and entertainment venues. For example, travelers may store their personal profile data such as preferred seat choice, food/beverage preferences, preferred hotel amenities, preferred car rental options, preferred check-in process options, in a customer database profile. The seat choice may include aisle or window, tail or wing, and class sectioning. The database may be mined to identify customers that may be interested in last minute travel deals based on their most frequently or most recently used travel destinations. The last minute opportunities would be provided based on specific preferences set by the vendor and customer in his/her business/personal profile. Specifically, customers, in addition to having his/her profile preferences met, can book flights and receive more desirable seats and prices, without waiting until the last minute to book his/her flight reservation. In addition, the customer can view a real-time or slightly delayed airplane seating diagram, in order to see what seats are available, so that the customer can choose in what area he/she would like to sit on the plane. For example, an airline vendor may choose to make available a set amount of seats available for a discounted rate per section, much like an entertainment event, or set a discount on seats for a limited time. A customer utilizing the system of the current invention may choose a certain row/section of seats, while at the same time adhering to his/her personal aisle/window preference, for a discounted rate offered. A ticker/alarm within the system can be set by the customer when a discount has increased/decreased to a certain price that he/she sets for the flight, which lets a thrifty customer know when to buy a seat in a certain section for a preset price, if the price is met. For the customers that want the certainty of knowing that he/she was able to find the exact seat for a pretty good rate, not waiting for the best rate, the customer can see the seating available, once the plane has reached the vendor-preset percentage to capacity.

In addition, the present invention improves the designated check-in process by including a "stress-free" baggage option. With this option, customers may include in his/her booking the opportunity for his/her bags to be picked-up in advance or mailed via express mail before the travel date and arranged to be delivered to the traveler's room, for example, to be waiting for the traveler when the traveler arrives. By choosing this service either in the customer profile or for a one time event when booking, a flat fee may be charged to the customer's account according to the length of travel stay and baggage weight. For a short-term stay, for example, the customer may add the service at a cost of $50, in order to receive the benefits of the "stress-free" baggage service. On the other hand, a long-term stay may cost a flat fee of $100 unless the baggage weighs less than the long-term stay price, as stipulated by the express carrier, thus reducing the customer's cost to the $50 service rate. Alternatively, the baggage services may be priced variably, as stipulated by the express mail carrier, according to, for example, how soon the baggage will arrive.

Similarly, the customer's entertainment preferences may be maintained in the customer's account with the meal preferences at or near the event and travel preferences to and from the event, as well as seating options. For example, the customer's movie buying preferences may be maintained so that, upon the release of a type of movie preferred by the customer, special purchase offers will be sent to the customer based on the customer's profile preferences. As another example, a customer may wish to attend "CATS" every year at a city with which he/she frequently travels or in his/her hometown. The customer can be notified by the vendor via an e-vite based on his/her profile of upcoming events with which he/she has set to be a priority or of interest in his/her profile and given special offers to attend. Thus, members may be bundled for an event without knowing everyone's profile interests at a particular store. In stadium events, where there is food delivery service, the system is best utilized in this embodiment when the customer pre-orders food and beverages to be delivered at a certain time in the event. A touch screen application may be provided at the seat of the customer, thereby giving the customer the option of accessing his/her profile from his/her seat where the customer or group of customers can place, confirm, edit, and pay for an order which is then delivered to his/her seat at a time during the event, on an occasion when the customer has not pre-ordered or would like to modify the order.

On the other hand, in a shopping embodiment, a customer may arrange a shopping event where the customer may go to a participating store and have purchase options waiting for review, based on a pre-registered event that he/she has arranged for him/herself and other parties whom have accounts within the profile database. For example, if the customer is planning to shop for clothing, an event is created detailing the type of clothing desired (e.g., a wedding dress, bathing suit, or business suit), the customer's sizes and affinities, color affinities and other preferences, and what date/time the customer is to be expected at the store(s). The event is forwarded to the store of interest and sample clothing satisfying the event requirements is prearranged for the customer's(s') review upon arrival, thus providing a more efficient shopping experience. Once items are purchased, where purchases are made within the "network" of vendors, these purchases are electronically sent to update his/her customer profile and stored as additional profile preference data. The customer may then choose to put these items into folders marked, for example, "Girls Day," "Suit Shopping," or into his/her personal or business portion of his/her profile. Therefore, the customer's profile is always up-to-date, in a realtime fashion, with his/her current consumer purchasing preferences in his/her business/personal profile account. In addition, the customer(s) may designate what department within a vendor's location that he/she would like to visit at what particular time, making the flow of shopping even more convenient and effective with regard to time spent spending rather than looking. Moreover, the customer may using a Precision Gifting™ service feature described herein to create an allowance for a particular event. For example, children could be given a spending allowance in an account for shopping in particular stores for clothes for school.

In a combination of embodiments, a customer can best utilize his/her profile to plan a trip entirely as he/she prefers, given there are vendors within the "network" at his/her destination of choice. For example, a customer can have his/her bags picked-up via an express mail partner at the customer's home or office address, travel as he/she prefers in his/her preferred seat and with preferred meal/beverage on an airline of the customer's choice, find his/her car rental car of the customer's preference waiting at the airport, express check-in at his/her hotel of choice by the GPS recognition of the customer's phone, driver's license or credit card or debit card scan, biometric hand or finger scan, access card, retinal scan, password, key fob, or mobile application of the like, find his/her bags waiting for him/her in the customer's room by having chosen the hassle-free luggage option in his/her profile, then can dine at his/her preferred restaurant, and can access his/her pre-ordered registration/reservation or access the customer's profile onsite or via his/her mobile, laptop, notebook, or Macintosh device, in order to reduce his/her wait time. The customer may also use his/her mobile application of the invention via his/her mobile device to locate the customer's reserved retail events at multiple vendor locations of the customer's choosing by utilizing a GPS directional assistance service, after accessing his/her account via the customer's mobile device, and then attend an entertainment event that the customer has reserved according to his/her preferences within the local area of the customer's room. He/she can do this all within the "network" of vendors and partners by using detailing the settings within his/her customer profile for each vendor involved in his/her pre-planned trip or have options to reserve most of these services and choose on-the-fly some of his/her arrangements by accessing his/her profile with the customer's mobile, laptop, notebook, Macintosh device, onsite application, or a combination thereof.

By utilizing a marketing system with the profile database of the method and system described herein, each customer's choice may be categorized in a database system into customized business/personal profiles. This data is all individualized even within each customer's profile. Since the information is categorized into single choices, the customer profile data may be grouped into packages across one or many vendors within the "network." Moreover, a customer may receive offers, in the special offers portion of his/her profile, for combined products and services from any number of combinations of vendors within the "network." For example, a customer could receive a trip offer that is complete with all of the customer's business/personal profile criteria met including special offers from restaurant, retail, travel, hospitality, and entertainment vendors. More specifically, he/she could be offered a trip to Hawaii with discounted hotel stay, restaurant offers, upgraded car rental options, entertainment offers, and shopping offers within one package offer. Moreover, he/she may have two or more different combination offers that meet 100% of his/her business/personal profile criteria. Then, it is up to the customer to choose, modify, and add to combination offers. With each new piece of data entered via customer preference input or precision purchases made by the customer and stored into his/her profile, the system develops a more precise understanding of the customer's preferences. Therefore, the offers will become more accurate over time. Moreover, since the profile information of the customer becomes more precisely customized over time, the Precision Marketing™, Precision Gifting™ and Precision Purchasing™ services and online central database customer profile management system become more accurate over time. Hence, the system becomes more accurate with every additional purchase and profile preference, making the Precision Marketing™ data and services more valuable to vendors within the "network" as well as the business consulting services to those outside of the "network."

On a single vendor level, the system and method described herein is primarily used to induce return customers to spend more money at one or more of his/her elected vendor locations, invite others to do the same, and market to each customer's specific needs based on his/her specific preferences. For example, in the restaurant embodiment, vendors who own/control several restaurants can shift marketing attention toward lunches for one restaurant and desserts for another, without spending money on two promotions. As members of the "network," moreover, the vendor can make the best use of the Precision Marketing™ system in this way without incurring exorbitant printing, mailing, demographic list generating, and other extraneous costs. Since the customer profile data is portioned into individual choices, a vendor can keep track of multiple choices, also. Therefore, for example, the customer may receive a free cheesecake offer after purchasing four from one or several restaurant vendor locations within the "network." Traditionally, this type of promotion would be a tracking nightmare. As another example, an automatic complimentary drink offer may be triggered by a customer referral. While traditional in-house restaurant promotions become cost-prohibitive and obsolete, the method of the invention provides inventory controls and other cost saving triggers as ancillary benefits from collecting the customer data. Meat and vegetables, for example, can be tracked and the vendor notified by simply setting inventory requirements in the vendor client account. This may not seem like a marketing service; however, when the vendor knows how much food to anticipate will go to waste, the vendor can use the system for a last-minute promotional offer that can reduce their food waste and generate "lost" and/or additional revenue. In addition, individualized offers may permit a vendor to send a complimentary dessert for customer appreciation day, for example. In this embodiment, each customer would receive his/her most frequently purchased, most recently purchased, or least expensive dessert purchased complimentary from the vendor as, for example, a way to being a customer loyalty marketing campaign.

In a similar fashion, in a shopping embodiment, a retail vendor can promote a new store or clothing line and determine how long to keep unpopular merchandise on the floor before replacing it with more popular or the next lines, by setting vendor-specific requirements in the system. More generally, the current system and method will help customers to arrange a shopping event at all times of the year and encourage the customers to take advantage of multi-store or multi-departmental vendor promotions. As is true with all shopping experiences, the more time that the system allows customer to spend in a store trying on clothes that fit and less time looking for merchandise that fits, the more money he/she generally will spend. Again, much like the restaurant embodiment examples, retail vendor inventory shuffling does not look like true marketing at a glance. However, the system is equally, if not more, effective in the retail industry where it generally takes a few days to reach a customer via mail. Most e-mail promotions find their way to customer e-mail trash bins, if they first are able to get through spam detection. However, the current method is able to reach return customers as soon as an electronic promotion can be developed and demographic/customer specific criteria are developed for a promotion or cross-promotional opportunity. By knowing what purchases are hot, the retail vendor can shift the merchandise as well as their marketing campaign attention much more efficiently and effectively to customers with profile accounts in the system. Also, the customer may input a number of individuals that he/she would like to attend an event and a dollar amount allowance so that the system may produce options for the invitees.

In the travel embodiment, especially with the recent rise in gas prices, it is most beneficial for airlines to know how many seats to reserve in order to know what planes and flight times they should make available to customers. The current system and method is quite helpful in this manner, in order for airlines to do this most effectively. As seats fill on the plane at a certain level to capacity of a particular plane, airline vendors can begin to place customers, according to his/her seat preference, in a visual queue on the flight booking portion of the system. Therefore, at the level to capacity the vender chooses, for example when 40% of the flight is full on a 757, customers who book later in the reservation process will have a real-time or slightly delayed visual display of the plane's seats that are already reserved. Customers may then choose from the remaining 60% of the seats available in this example, going beyond his/her window/isle seat preference, on his/her selected flight. As the seating capacity of the plane of the vendor's preset preferences, the vendor may reserve the right to increase and/or reduce discounted flight rates of the remaining capacity according to the speed with which the flight is filled with customer bookings. Moreover, the system will carry the vendor's preset preferences into his/her promotional presets as well. Therefore, if a flight is at 80% to capacity, for example, two days from its departure, the vendor will have presets determining how much of a rate to discount the flight. Conversely, the vendor may elect to back off of a promotion or increase the number of flights, if a promotion has filled a flight rather quickly. Thus, this method of marketing induces more flights at capacity with a better gauge on supply and demand of seats on each flight. Hence, an airline can increase revenue in a similar fashion as described in the restaurant embodiment described above. In addition, this method will urge customers to book flights earlier, in order to get a seat closer to the front of the plane, if he/she prefers; customers who want to take full advantage of promotional offers within the system of the current system and method, without the uncertainty of not having all of his/her preferences met, to be seated next; and then, the customers that prefer to be seated in the back of the plane or those that make last-minute bookings regardless of offer to be seated last. This flight booking and marketing method translates into more revenue generated per flight per vendor. Instead of most of the seats on a flight going to discounted fares, the system and method of marketing described herein reduces profit lost without deep discounts too soon or for too long. Thus, airlines make more profit with a precise knowledge of their inventory.

Also, in the embodiments of the system and method of marketing in the entertainment industry, there are several inventory reducing and revenue generating marketing improvements within the embodiments of this system. For example, the "best seat in the house" option allows a customer to input a dollar amount that he/she would like to search for the best seat available around his/her price request at an entertainment event. Therefore, a customer may input $100 into the search portion of the service and find seats within his/her price range, according to the customer's preset price window for the search, and the desired price per seat. The system will then produce a visual display of all of the seating options available, according to the customer's per seat price for request the elected event. Moreover, within moments the customer will have one or more options made available to him/her in order to make a precise purchase that satisfies all of his/her preset event seating/pricing preferences. In this case, the customer will be able to save $10 per seat and may, therefore, purchase more seats than intended. Since the customer can more efficiently make purchases, the vendor can spend less time/money per customer and have more opportunities to sell food/beverages/souvenirs to more customers at the event with this option.

In addition to the seat searching options, there are several entertainment event alert options. For example, when a concert meets the customer's personal preference criteria, a customer may have a text message alert sent to his/her profile. The alert may be one of many presets such as: music group, comedian, geographic region, event time of the week (e.g. Saturday night), destination location, special event (e.g. Olympics), time of day, or any other customer selected profile preference. If the customer so chooses, the certain types or all alerts that the customer has preset will be forwarded to the e-mail address of his/her choosing. For example, if a customer leads a very busy life during the week and does not have time to plan for weekend events but would like to attend an entertainment event, he/she can set his/her business/personal/customer profile to arrange an alert for comic concerts in his/her geographic region that take place between 6:00 pm CST on Fridays and 10:00 pm CST on Saturdays for the months November and December. By setting the customer presets, he/she will be alerted to any genre of comic that adheres to his/her other entertainment preferences within the customer's geographic region and other preset criteria. Moreover, as in other embodiments described above, a vendor can market precisely to the customer. Hence, a vendor can personalize a message regarding, in this example, a comic's background, rating, accomplishments, and other individual information or offer special discounts in the same fashion as that of the embodiment of the method for the travel industry. As tickets sell quickly, promotion prices can be lifted. For customers that prefer a certain seat or section at an event, he/she will be notified when the option to purchase these tickets become available. These presets, as is true with all customer business/personal profile preferences, improve the communication between vendor and customer, reduce many costs related to business inefficiencies, increase sales, reduce number of discounted purchases needed to fill an event, encourage repeat/referral customers, and induce many other benefits for both the customers and vendors within the system. Also, the system may be used to purchase merchandise for/from an event, prepay for food at the event, and the like, as discussed above.

The system and method described herein is most readily beneficial in the areas where multiple services across a pairing or multiple industries within the scope of the system are represented. For example, at a casino or theme park where restaurant, retail, travel, hospitality, and entertainment are sometimes involved, the customer will be able to receive precision offers that will save him/her a great deal of hassle, time, and money searching for the best deals possible by using the system. Essentially, the method of presets and customer preferences apply in this area as well. For example, the customer can be alerted to travel package that includes his/her preferred entertainment, shopping, and restaurant events in an event package. Moreover, an alert will populate in the customer's "deals & destinations" folder of his/her business/personal profile which details flights, hotel stay, events, meals, and shopping that meet all of his/her criteria. When the customer sets all of his/her presets and preferences for this type of entertainment event, step one is completed. The next step is for the customer to simply set his/her time and price window per visit. For example, if the customer would like to go to Las Vegas for less than $500, some weekend in July, and see his/her favorite entertainment show. He/she may set his/her price window to $1000 which includes: 3 restaurants, a round-trip flight, 2 nights stay at a hotel of his/her choice, two event tickets, and $100 Precision Gifting™ credit. Also, the customer may input a number of individuals that he/she would like to join in the trip and a dollar amount allowance so that the system may produce options for the invitees. The trip adheres to all of his/her profile preferences and presets, for example, and he/she will receive a few package offers that meet all of his/her criteria from which to choose. Therefore, all the customer is required to think about is which entertainment package option to choose, whether to add the "stress-free baggage option" for $50 extra, and which weekend in July will be best for swim trunks. He/she then can pack in his/her suitcase and have it ready for the express carrier to pick-up and deliver to his/her room, timed perfectly to the customer's arrival. The customer can access his/her profile for any service provided at the hotel, in this example. Therefore, meals, activities, and products may be purchased with the customer's Precision Gifting™ credits, as is the same with any service and product of all vendors within the "network." Within the Continental United States of America, for example, Precision Gifting™ credits may cost $1.00 in order for the customer to purchase $1.00 worth of merchandise. Customers can add money to his/her business/personal account or in the accounts of other customers of the system at any time. A fee may be attached to larger credit purchases. In addition, customers will need the dollar amount TO BE above the product/service dollar amount. For example, if a flight costs $179.80, the customer must have available in his/her business/personal profile account 180 credits. Moreover, in a resort or casino setting the customer may be compelled to leave cash to use the system for security assurance, leaving cash, credit cards, and debit cards at home. Hence, the customer may access the system for all purchases of products/services at all vendor locations within the network. In this case, the customer will need only his/her driver's license with the magnetic swipe strip on the back, account name/number, finger scan, account password, or other verification methods of the like in order to enjoy an entertainment trip or vacation without needing his/her cash, credit cards, or debit cards.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIGS. 7A-7B together illustrate a flow diagram showing the process flow of an embodiment of the invention for application in a retail shopping environment.

FIGS. 8A-8B together illustrate a flow diagram showing the process flow of an embodiment of the invention for application in an entertainment environment.

FIGS. 9A-9C together illustrate a flow diagram showing the process flow of an embodiment of the invention for application in a travel environment.

FIGS. 10A-10C together illustrate a flow diagram showing the process flow of an embodiment of the invention for application in a hospitality environment.

FIG. 11 illustrates a sample interface to the system of the invention.

FIGS. 12A-12J together illustrate a sample application of the system of the invention for use in preselecting a dinner order prior to arriving at the restaurant and paying for same at the end of the meal.

FIGS. 17A-17C illustrated embodiments of an airplane seat cover modified to include the mobile marketing interface of FIG. 13.

DETAILED DESCRIPTION OF ILLUSTRATIVE EMBODIMENTS

Figure 1:
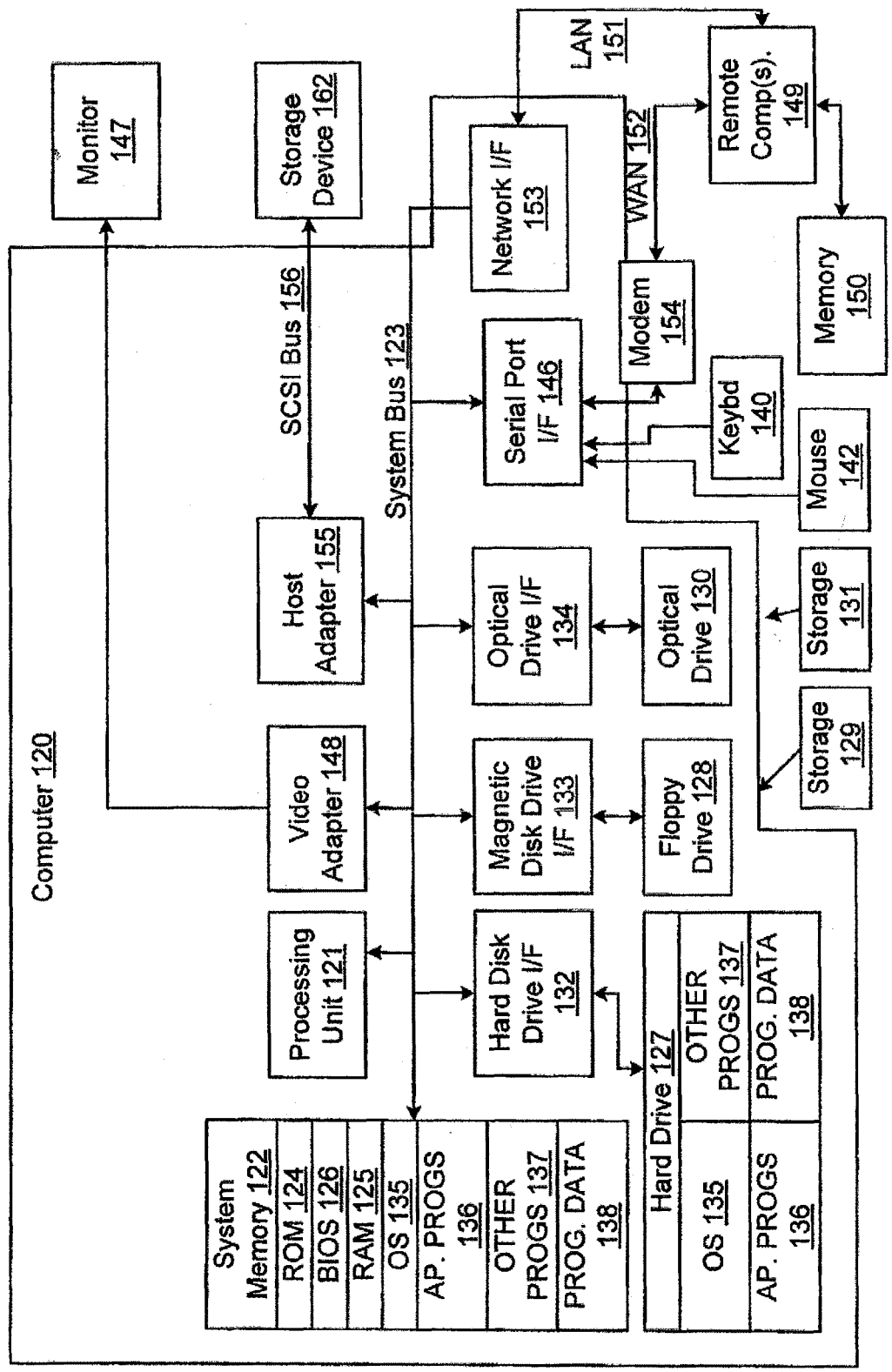
FIG. 1 is a block diagram representing a general purpose computer system in which aspects of the present invention and/or portions thereof may be incorporated.

A detailed description of illustrative embodiments of the present invention will now be described with reference to FIGS. 1-19. Although this description provides a detailed example of possible implementations of the present invention, it should be noted that these details are intended to be exemplary and in no way delimit the scope of the invention.

System Overview

The system and method described herein improves consumer marketing as it relates to specific customer business/personal profiles, which are organized in a database and comprised of a combination of customer purchases and profile preferences in the restaurant, retail, travel, hospitality, and entertainment industries. The system and method described herein include an Internet preordering, purchasing, and gifting system accessible online or onsite by way of a customer's mobile device, free-standing kiosk touch screens, countertop touch screens, and free-standing drive-up/walk-up kiosk touch screens applications located in the customer's possession or in/near vendor property(ies) where customers may create profiles for the requested services and provide such information to the service provider in advance of the customer's arrival for the requested services. When the customer arrives, the customer identifies himself/herself or his/her mobile device GPS identifies him/her and the preorder is accessed, verified and/or modified. Otherwise, the customer may access his/her profile in order to create a new event or order onsite by using one of the free-standing kiosk touch screens, countertop touch screens, or freestanding drive-up/walk-up kiosk touch screens. The preorder is then forwarded to the service provider, upon verification, and the delivery of the service is optimally timed to the readiness of the customer. The customer's profile and preorder information is maintained in a database and used for customer Precision Gifting™ and Precision Purchasing™ or in-house Precision Marketing™ campaigns and cross-promotional opportunities. The in-house marketing team will access this data, specific to each customer's preference and demographic information in order to offer precision consulting services to any company in any area of commerce with the Precision Marketing™ system. The customer preference and demographic information will remain confidential and will be used for the sole purpose of advising companies with regards to how to effectively reach their target customers with a precise knowledge of their customer, based on the real-time customer preference and purchase data which is organized into a finite marketing tool.

Another function of this data is with regards to the method with which the vendors within the areas of restaurant, retail, travel, hospitality, and entertainment may make precision offers to customers within the "network." Instead of data mining or scoring, the vendor may make electronically-based offers in the form, for example, of gifting opportunities, customer loyalty offers, and other advertising offers to each customer based on his/her specific profile preferences. For example, a restaurant vendor may send a dessert offer to each customer within their designated advertising area that can precisely target each customer's most popular choice or any other criteria choice of dessert or any other purchase. The customer will then receive an electronic offer that may be accessed at any point in the ordering process by accessing his/her business/personal profile. Therefore, instead of the vendor choosing for the customer which item that the customer would like to purchase, the offer is based on the customer's purchasing or preference history. Hence, John Q., for example, may receive a strawberry cheesecake offer whereas Sue T. may receive a chocolate cheesecake offer from the same electronic offer.

In the area of entertainment, vendors may send offers for specific food promotions that give incentives for the customers to purchase tickets to an event as well as purchase items from the concession stands. Better still, retail vendors, within the "network," may send an offer to all customers who hold accounts in the profile database. For example, if the vendor would like to promote a spring line of clothing, the vendor can do so by way of an electronic offer into the customers' profile. The vendor can use the system to market to each returning customer's personal preferences without needing to know his/her size, shape, color preference, or any other specific clothing preference in order for the customer to receive a tailor-fitted offer for a promotional discount for a spring shirt in his/her favorite color, in his/her size, that fits his/her body type.

In the area of hospitality and travel, the system may observe a customer who has made travel arrangements in the past and meets his/her personal preferences in his/her profile that match a new airline and/or hotel at a destination that he/she frequents. These precision customer loyalty campaigns are brief examples of the ways that vendors, within the "network," may choose to use the Precision Marketing™ tool to access customers better as part of their membership with the administrator of the system of the invention.

The implementation details of such a system and method will be described in more detail below.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 is a block diagram representing a general purpose computer system in which aspects of the present invention and/or portions thereof may be incorporated. As shown, the exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video/versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 typically includes a variety of computer readable media. Computer readable media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the flow charts described in detail below.

Web Site Implementation

As will be explained in detail below, the system of the invention includes a database that maintains profiles of respective users/customers within a network and provides numerous fixed and mobile interfaces that allow the users/customers to access the profiles for various applications described herein. A web interface will now be described with respect to FIG. 2.

Figure 2B:
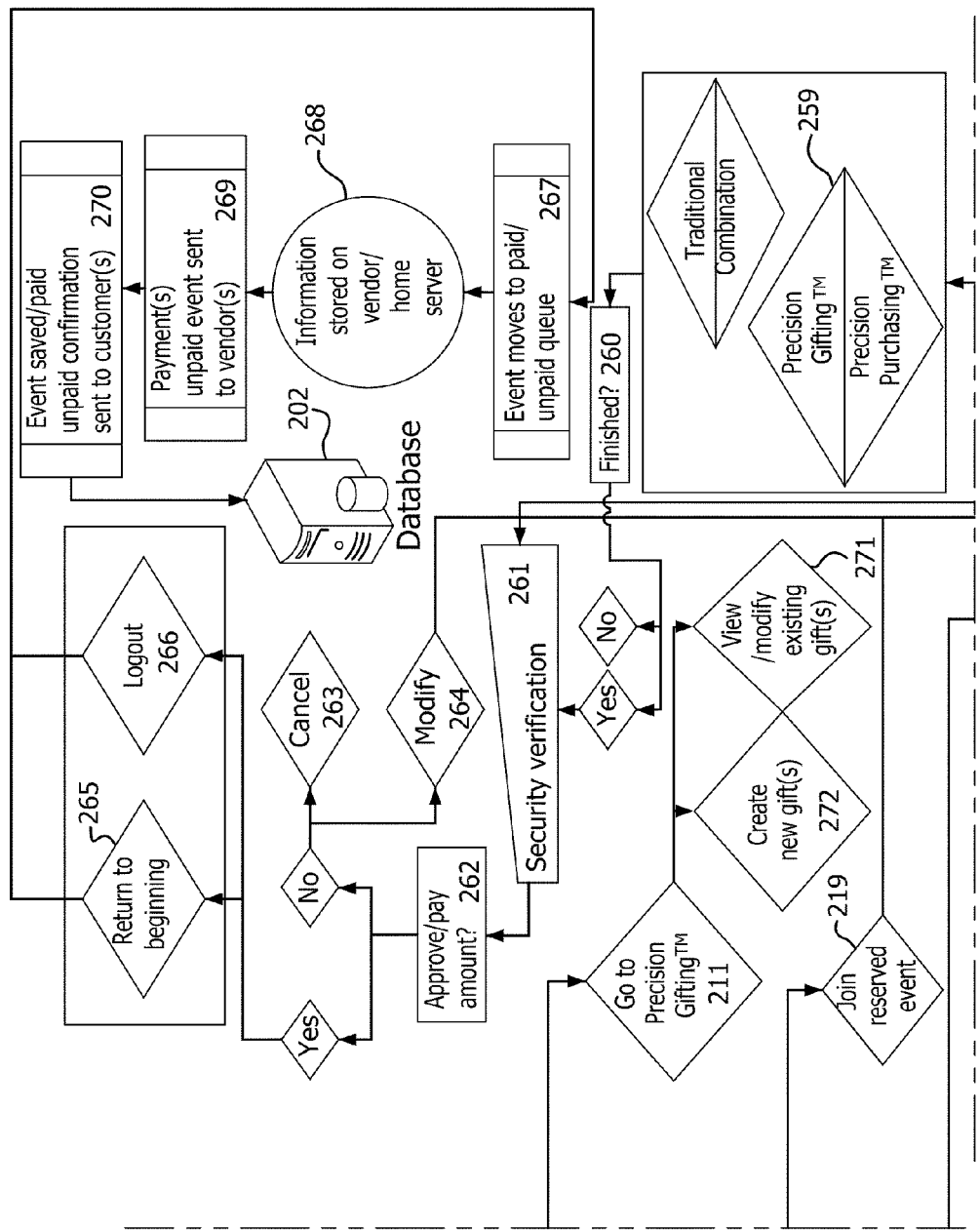
FIG. 2 is a flow diagram showing the process flow through a web site implementing the efficiency system of the invention for providing Precision Gifting™ and Precision Purchasing™ in accordance with the invention.
Figure 2C:
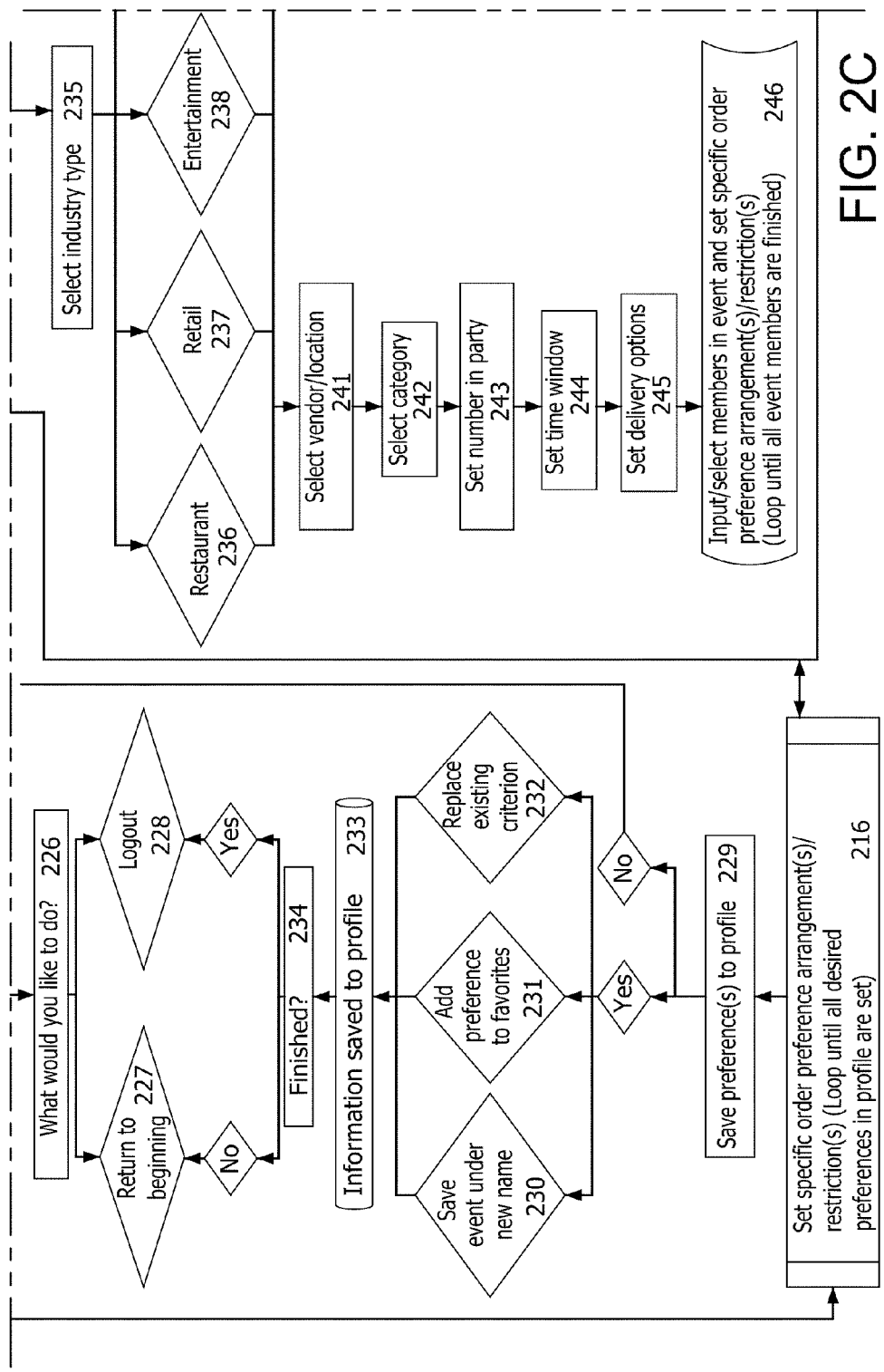
Figure 2D:
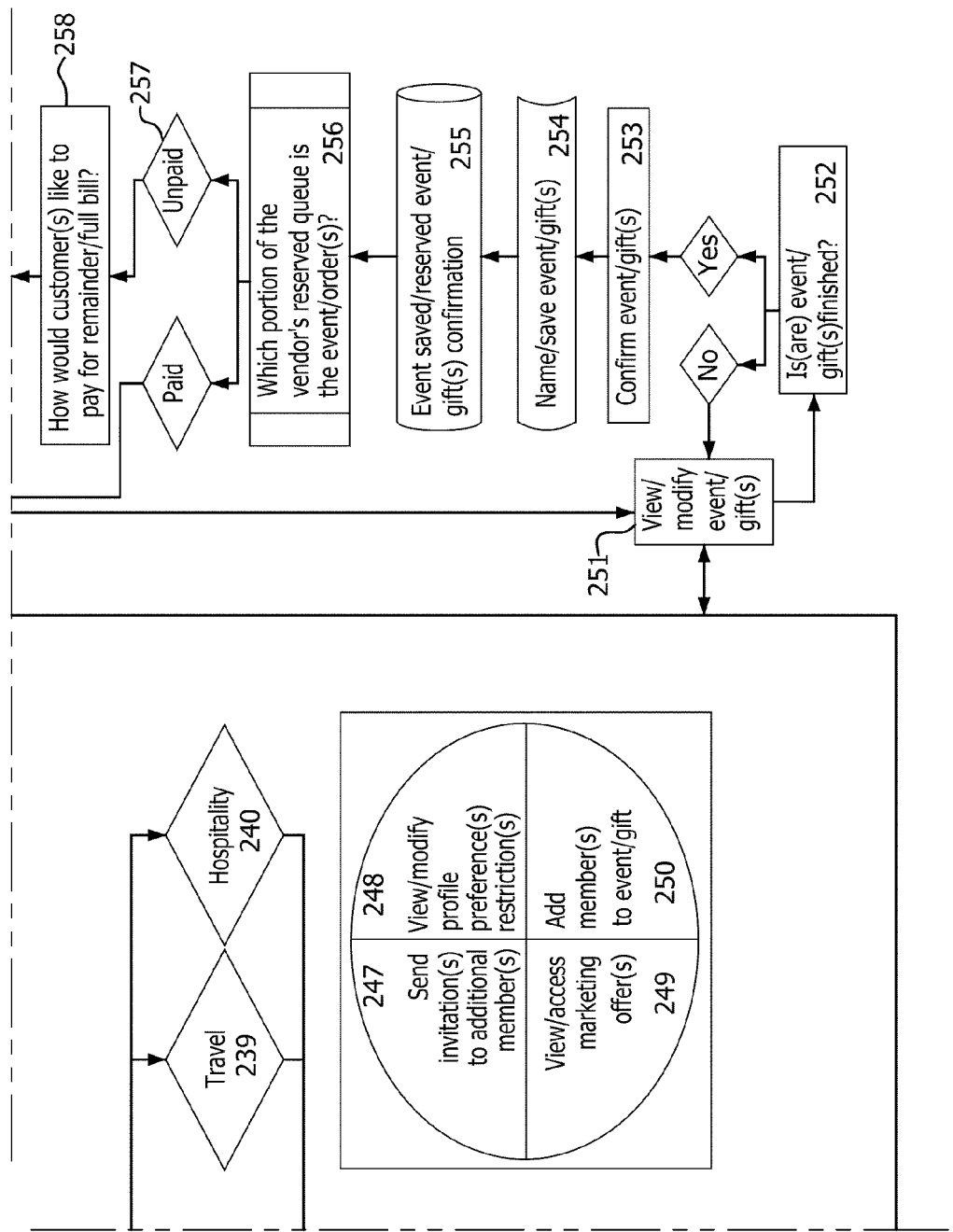

FIG. 2 is a flow diagram showing the process flow through a web site implementing the efficiency system of the invention for providing Precision Gifting™ and Precision Purchasing™ in accordance with the invention. The web site is hosted by a server (not shown) that includes memory (not shown) for storing the source code for implementing the logic flow as well as a database and a database management system (not shown) for storing and managing the data input by the customer as well as the customer's profiles. The server preferably includes a configuration of the type described above with respect to FIG. 1.

As illustrated in FIG. 2, upon accessing the web site (www.hostname.com), the customer is asked at 201 whether he/she has a linked profile account that permits access to information stored in the database 202. If it is the customer's first visit to the web site and/or the customer does not have an account, then at 203 an account is created that is linked, for example, to the customer's personal identifying information, such as e-mail address, and other customer identification information 204. The customer identification information may further include identification unique to the customer such as a biometric scan, an access card, a retinal scan, a key fob, a password, and the like. Once the customer has an account, the customer may chose to read about services offered through the web site (205) or chose to login to the customer's account at 206 to access the customer's profile (if one has already been created). The customer is presented with the option of selecting a personal or a business profile at 207 and is then presented with options at 208. Such options include viewing/modifying the customer's profile preferences at 209, selecting Precision Purchasing™ at 210, or selecting Precision Gifting™ at 211. Each of these options will be described in turn.

If the customer opts to view/modify his/her profile at 209, then the customer may create or view new preferences at 212 or 213, respectively. The customer may then opt to select or modify his/her profile preference from his/her preference history 214 at 215 before passing the updated profile information to 216 to set the customer's specific order preference arrangements and/or restrictions. The updated profile data is stored in database 202 using conventional techniques.

On the other hand, if the customer opts to go to Precision Purchasing™ at 210, the customer may access his/her purchasing history at 217, create a new event at 218, or join a reserved event at 219. If the customer opts to access his/her purchase history at 217, the customer may then opt to view his/her purchase history or event history at 220 or 221, respectively. The customer then has the option of importing the viewed purchase history 222 and event history 223 at 224. The customer may also elect to modify the purchase or event history at 225. If the customer does not wish to modify his/her purchase or event history, the customer is given the option at 226 to start over at 227 or logout at 228. On the other hand, if the customer opts to modify the purchase or event history at 225, the updated information is ordered based on the customer's preferences or restrictions are added at 216.

Once the order preference and/or restrictions are set at 216, the updated preferences are saved to the customer's profile at 229 and the information is saved to the customer's profile at 230 either under a new name (230), added as a preference to existing favorites (231), or used to replace existing criteria (232). The updated profile data is stored in database 202 at 233 using conventional techniques. If processing is finished, the customer may either return to the beginning (227) or logout (228).

On the other hand, at 218 the customer may opt to create a new event. This requires the customer to select an industry type at 235, which in an exemplary embodiment may include one or more of the restaurant (236), retail (237), entertainment (238), travel (239), or hospitality (240) industries, for example. Once the industry is selected, the customer may select from the available vendors and/or locations available within the network at 241. The customer may then select from available categories 242 and set other options such as number in party (243), time window for service delivery (244), and/or delivery options (245). At 246, the customer may input members and/or select members from those available in the network who are to participate in the event (e.g., dinner or trip to particular destination), and any preferences arrangements and/or restrictions are set. Once the event is completed, the application software permits the customer to perform several functions in connection with the event. For example, the customer may send an invitation for the event to additional members (247), may view/modify the customer's profile preference and any restrictions (248), may view and/or access marketing offers from other vendors in the network based on the selections in the event (249), and may add members to the event or gift (250). The database 202 is updated accordingly.

Once an event is created at 235-250, or if the customer opts to join a reserved event at 219, the customer is allowed to view or modify the event at 251. If the event is determined at 252 to be finished, the event is confirmed at 253 and saved at 254. The saved/reserved event 255 is then passed to the vendor's reservation queue at 256. If the event/order is not yet paid (257), the customer is asked how he/she would like to pay his/her bill at 258. Options for payment include traditional credit card payment or, as illustrated, the payment may be taken in part or in full from Precision Purchasing™ and/or Precision Gifting™ accounts 259 established in accordance with the invention. Once the form of payment is designated (260), a security verification procedure is performed at 261 before approval of the payment is granted at 262. If payment is not approved, the transaction may be canceled (263) or modified (264) and the approval process restarted at 251. Once payment is approved, the process may start over (265) or the customer may log out (266). In either case, the event is moved to the paid/unpaid queue at 267 and the information is stored on the vendor's server at 268. Payment information or information related to an unpaid event is sent to the vendor at 269, and the event/payment confirmation is provided to the customer at 270. The event information is also stored in database 202.

On the other hand, if at 208 the customer opts to go to Precision Gifting™ at 211, the customer may view/modify and existing gift at 217 or create a new gift at 272 for another member in the network. As in the case of Precision Purchasing™, the customer is asked to select one or more industry types for the gift at 235, and the processing of 235-270 is followed for the selected gift for the other network member. The gift may be suggested based on the other network member's profile or may simply include amounts in dollars or credits for the giftee to use at vendors within the network.

Kiosk Implementation

Figure 3B:
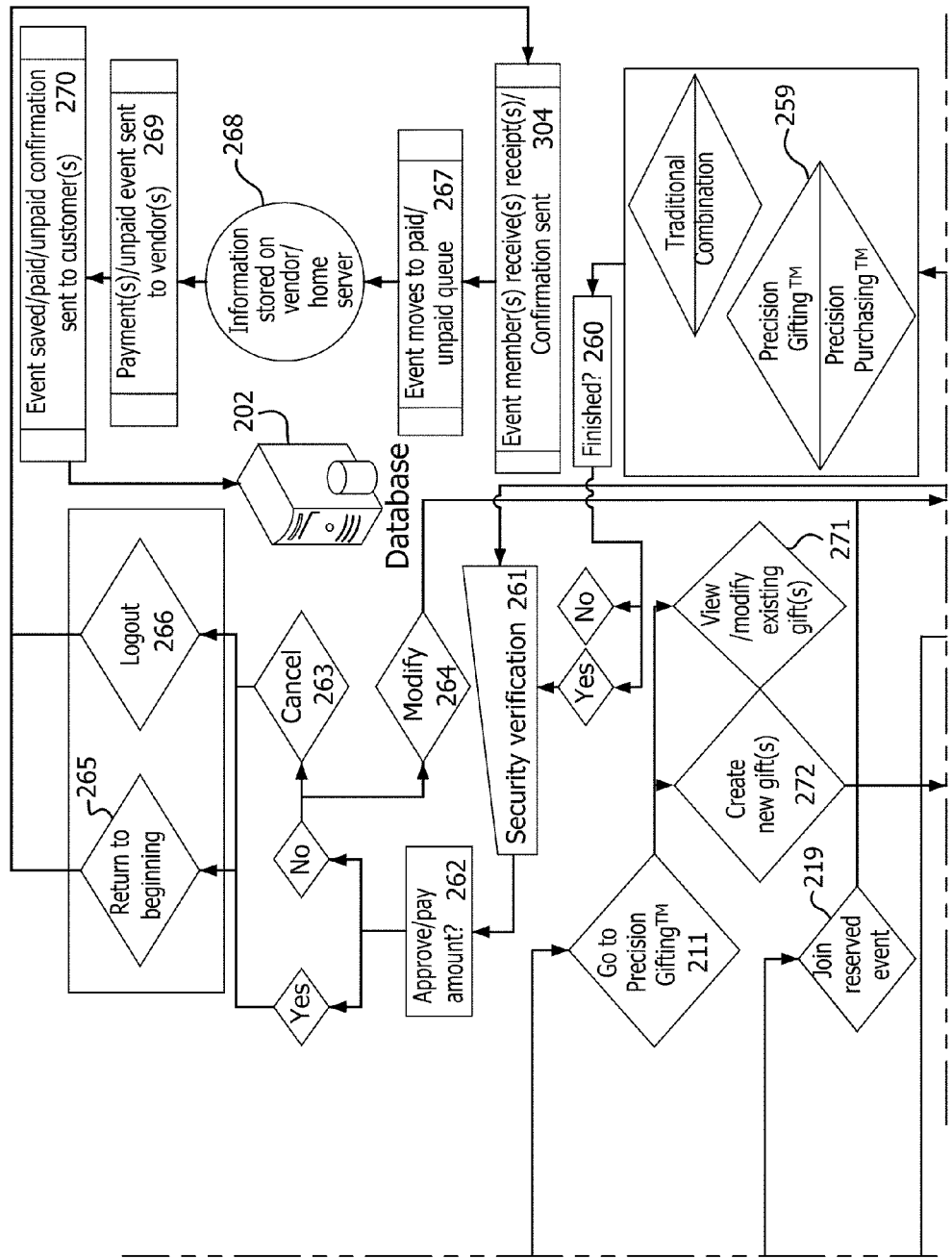
FIG. 3 is a flow diagram showing the process flow through a kiosk or customer terminal available on-site at a vendor to create and/or access the customer's profile and preorder data.
Figure 3C:
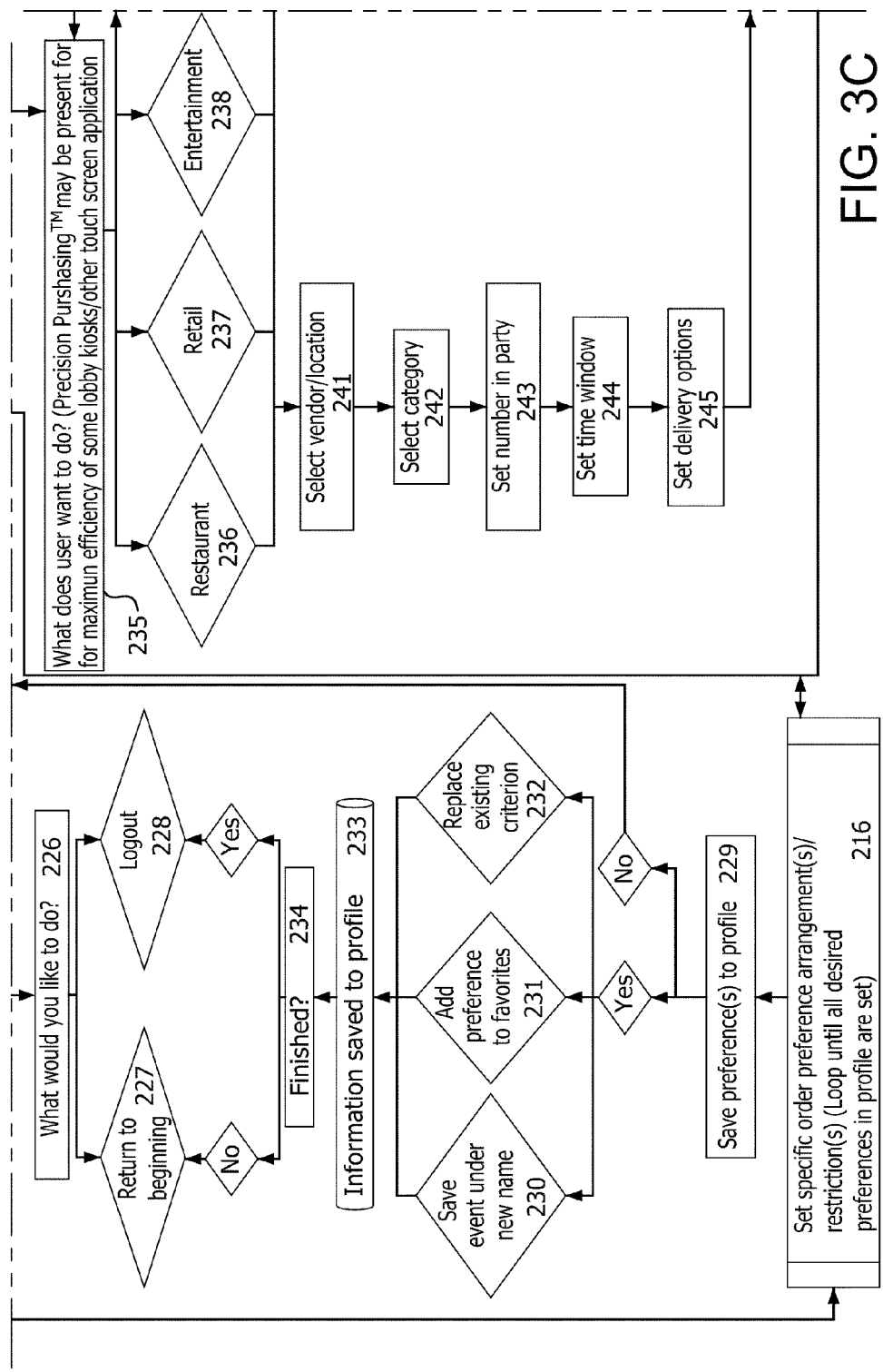
Figure 3D:
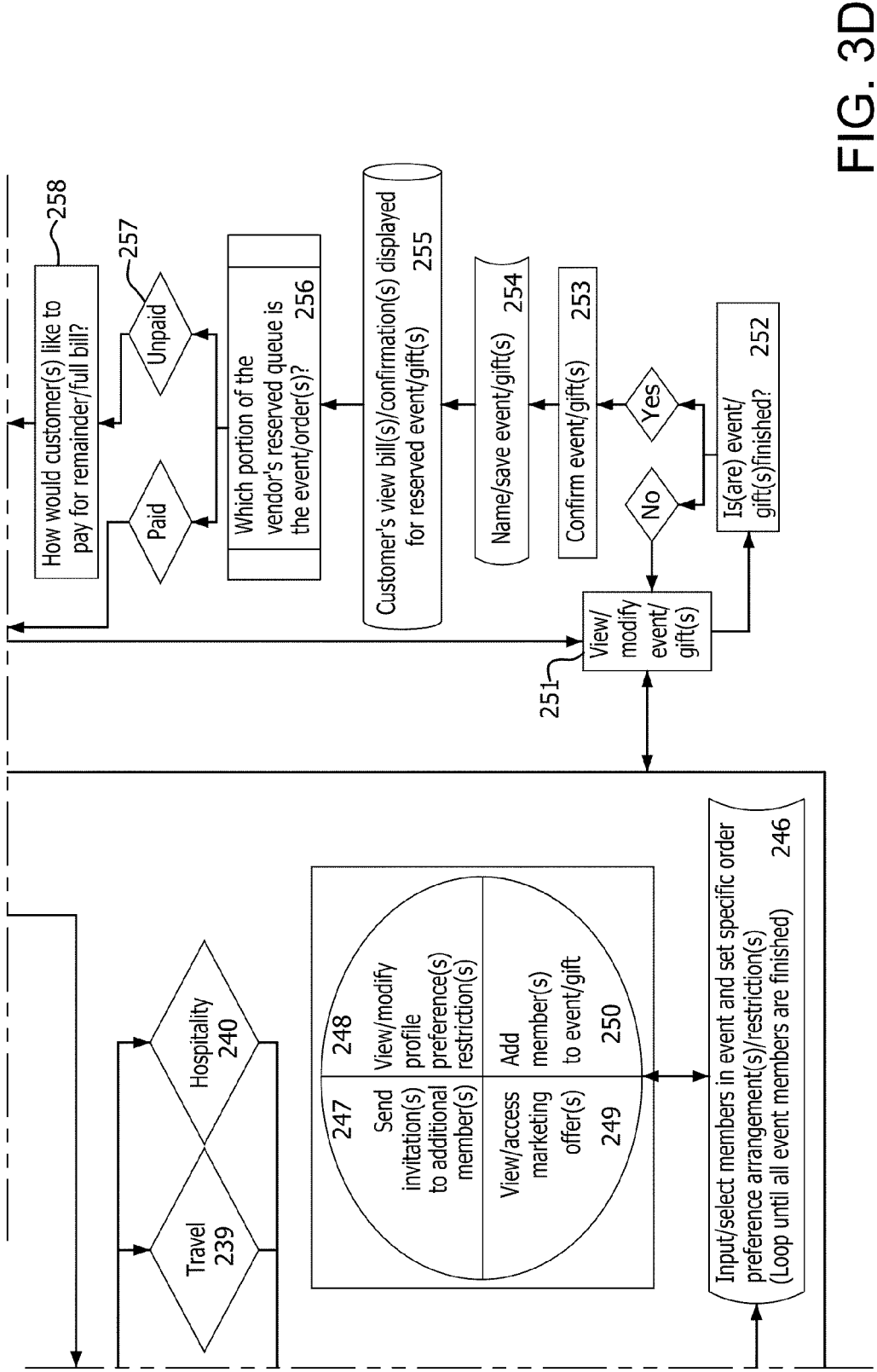
Figure 4A:
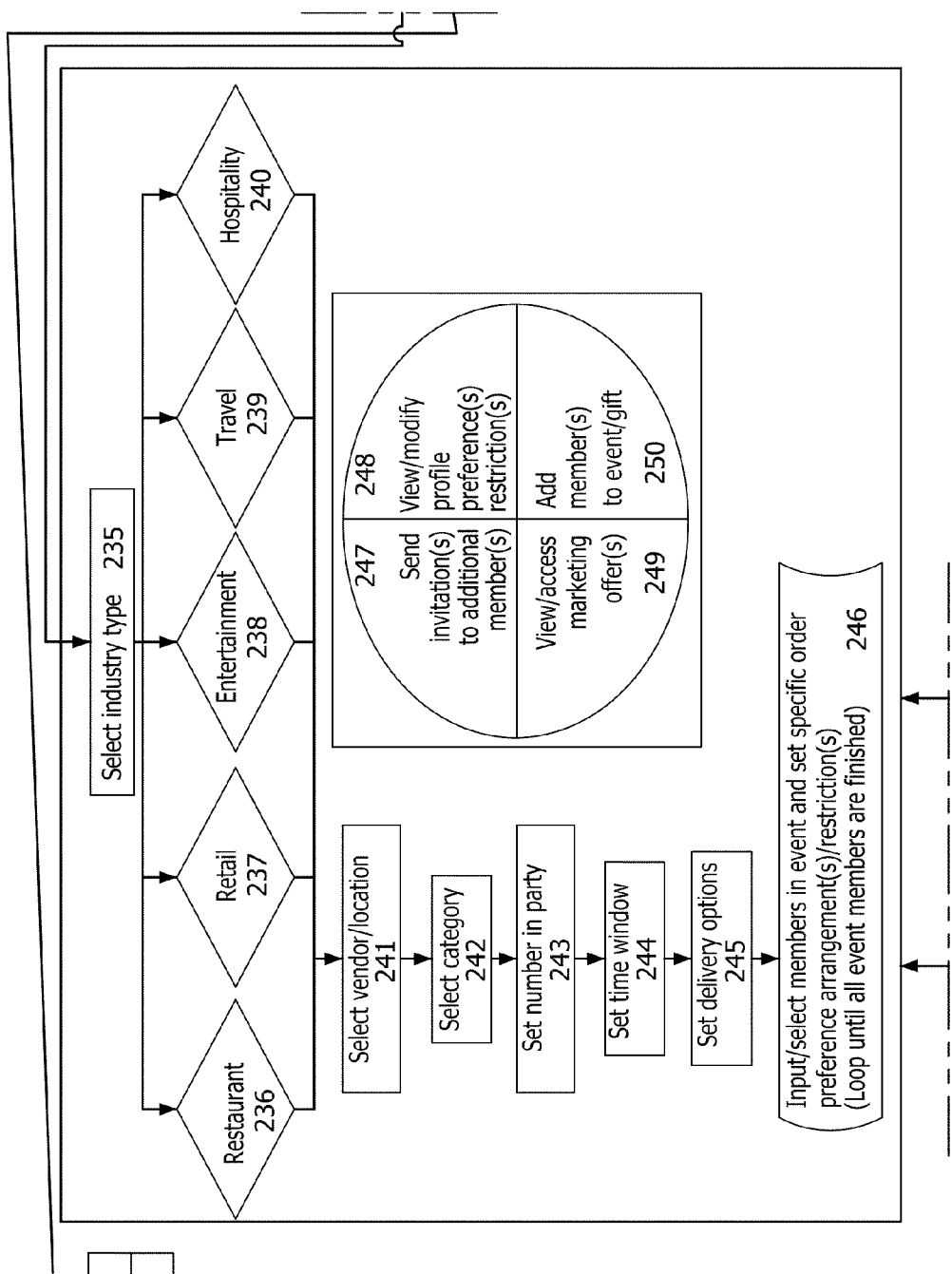
FIG. 4 is a flow diagram of a data management and payment flow system in accordance with the invention.
Figure 4B:
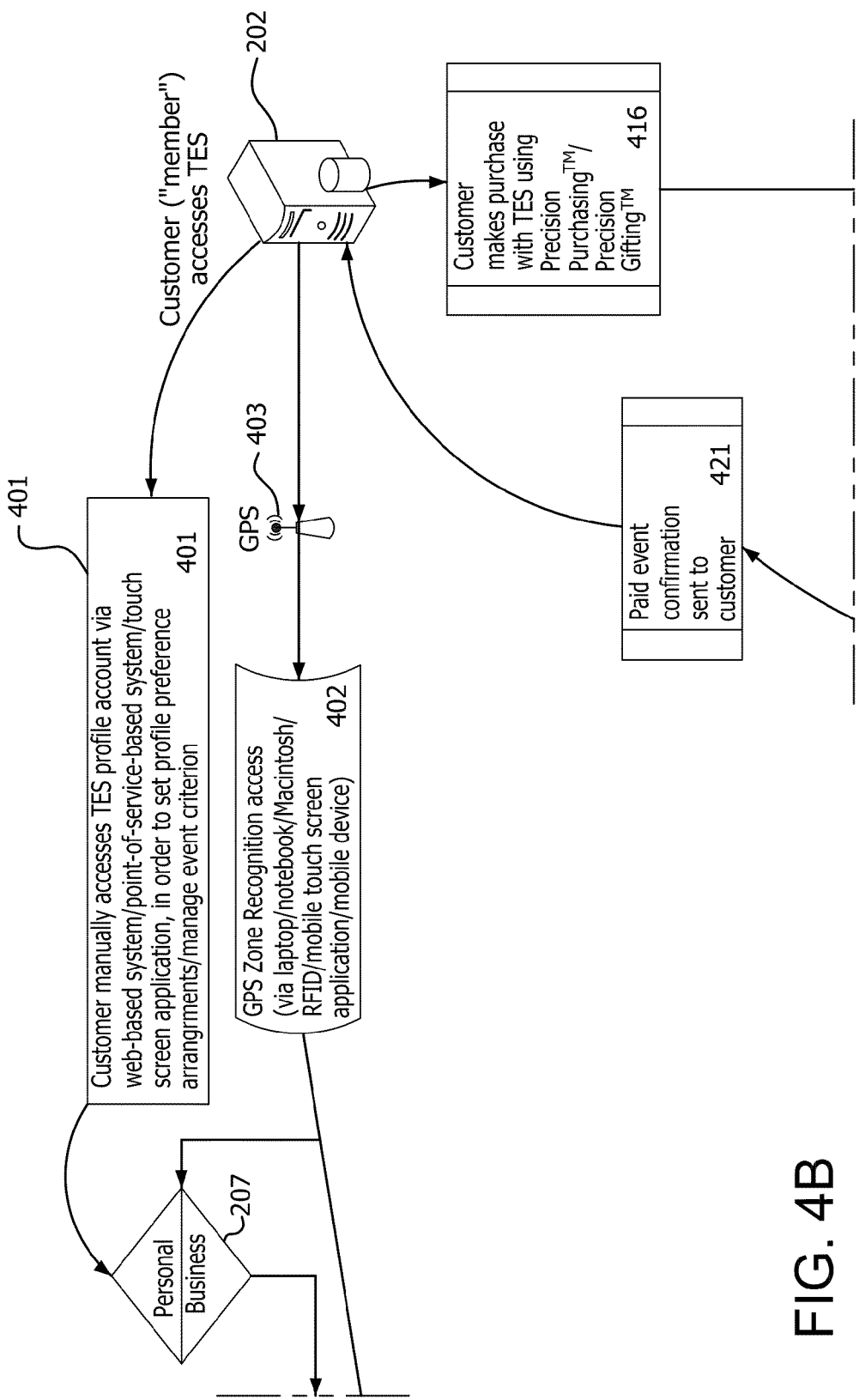
Figure 4C:
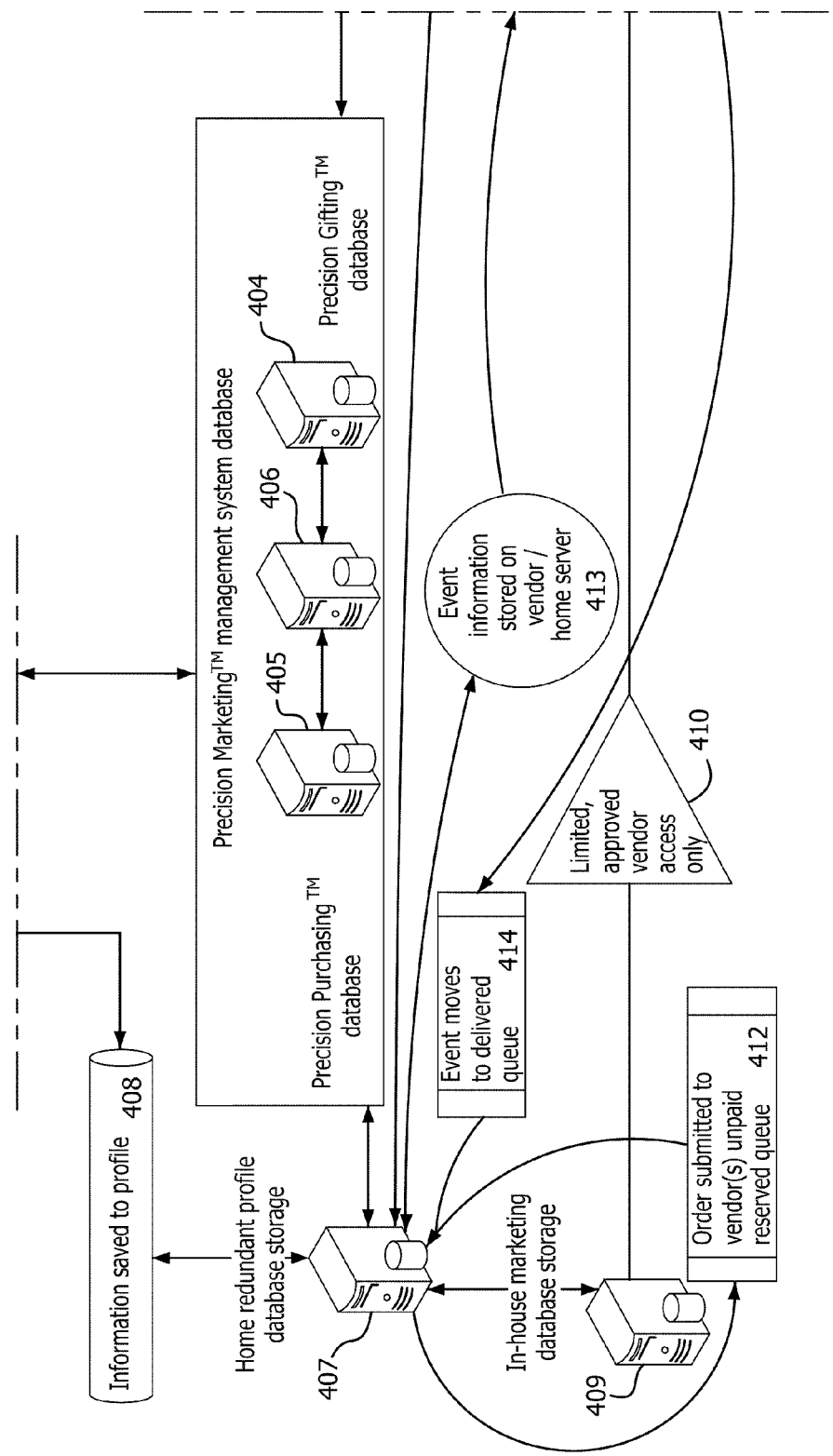
Figure 4D:
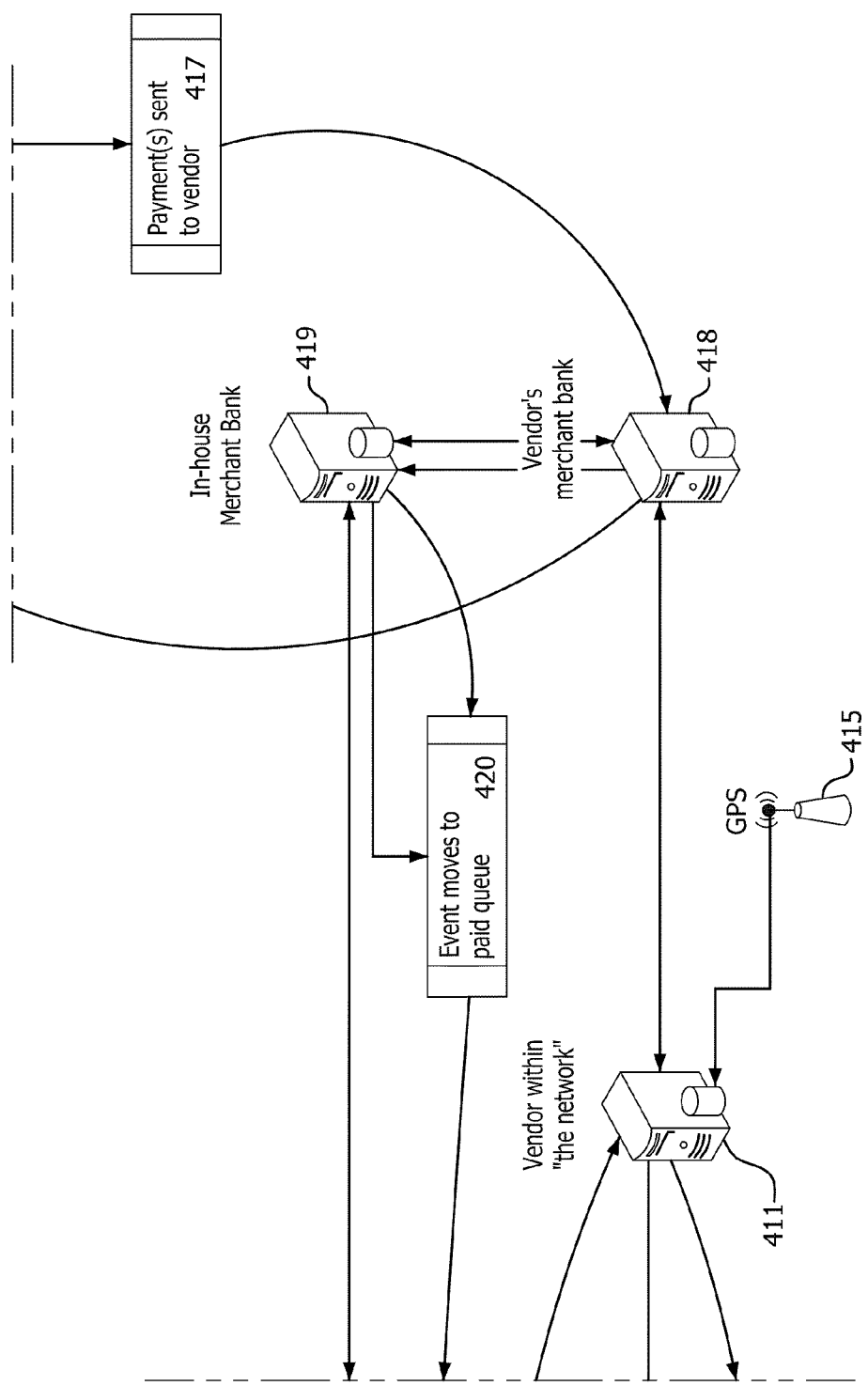

FIG. 3 is a flow diagram showing the process flow through a kiosk or customer terminal available on-site at a vendor to create and/or access the customer's profile and preorder data. The process of FIG. 3 is the same as for the website implementation of FIG. 2 except that the kiosk may include a GPS Zone feature of the type described below with respect to FIGS. 18 and 19 whereby a customer with a reserved event is recognized once the customer is in range of the kiosk. For example, the customer may be recognized by an RFID tag or, as illustrated in FIG. 3, by a GPS transponder 302 of the type conventionally used in cell phones, for example. Once detected in this fashion, or based on accessing his/her account via security verification at 303, the customer's event data and other information is made available to the customer. The processing is otherwise the same as in FIG. 2 except that the receipt confirmation may be printed locally at the kiosk at 304.

Figure 18:
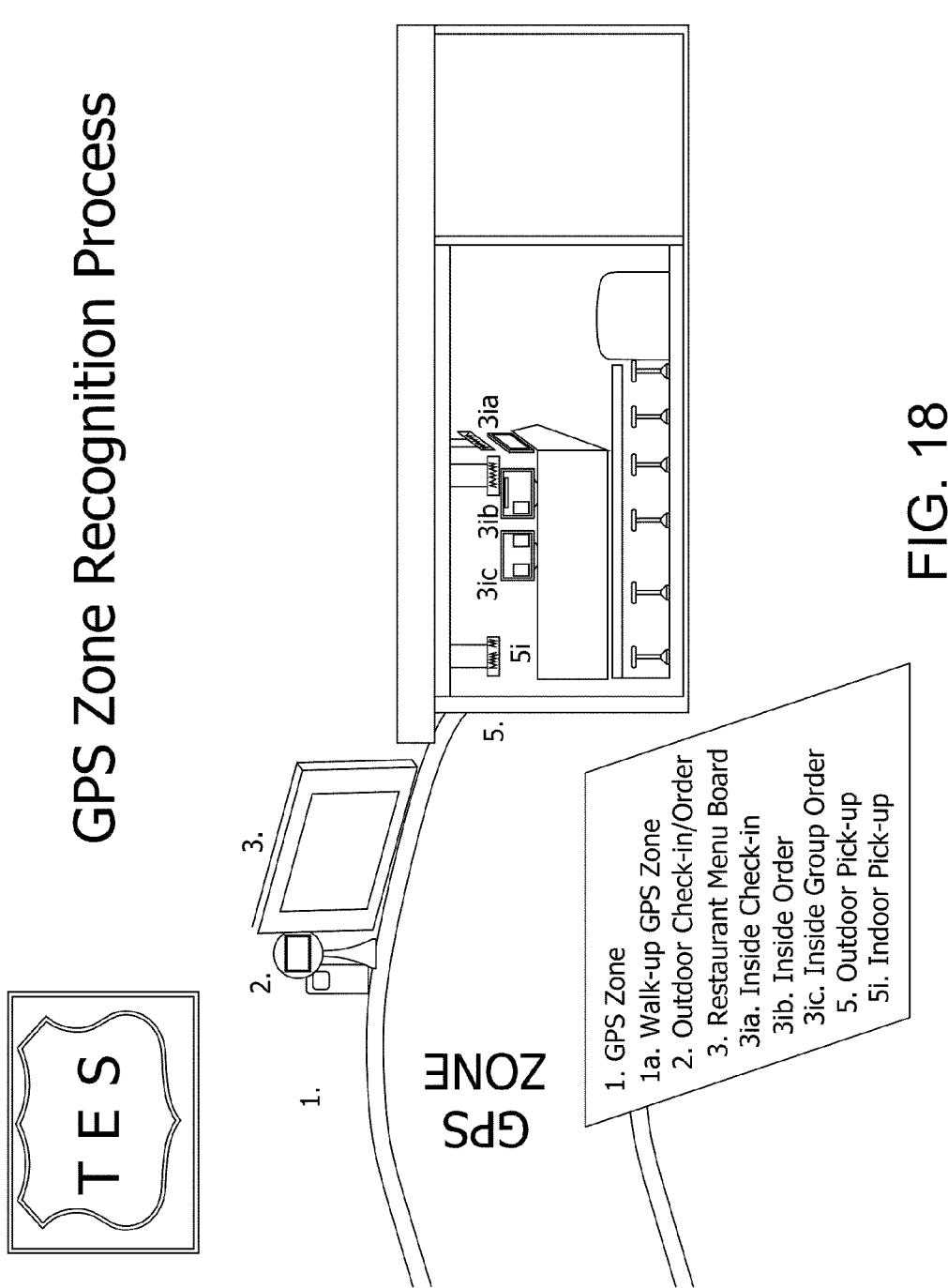
FIG. 18 illustrates an exemplary embodiment of a GPS Zone at a restaurant in accordance with an embodiment of the invention.

As illustrated in FIG. 18, the GPS Zone may be a walk-up or drive-up area in the vicinity of the vendor's premises. In the case of a drive-up embodiment, an outdoor kiosk 1801 may be used by a drive-up customer to call up his/her pre-registered order from the system of the invention and/or the customer may order items from menu 1802 at the kiosk 1801. Similarly, in the case of a walk-up embodiment, an inside check-in terminal 1803 may be used to bring up an individual or group order pre-registered in the system of the invention. GPS and/or RFID techniques and the like may be used to automatically identify the customer and to automatically pull up any pre-registered events/orders for prompt processing.

Figure 19:
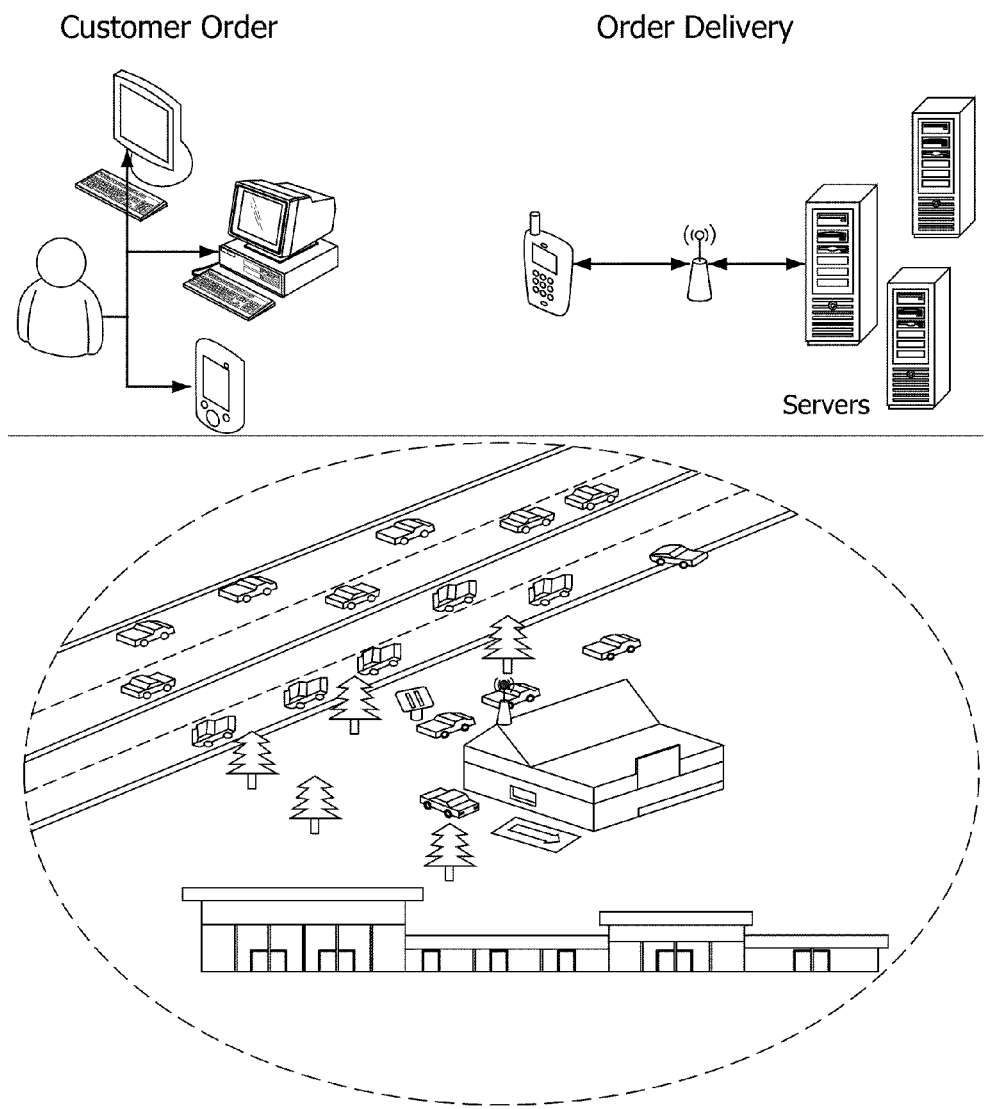
FIG. 19 illustrates an exemplary embodiment of a large GPS Zone at a restaurant in accordance with an embodiment of the invention.

The GPS Zone embodiment of FIG. 19 is similar to that of FIG. 18 except that the size of the GPS Zone is expanded to identify the customer with a pre-registered event/order as the customer approaches the restaurant, mall, and the like from a distance. Once the customer is detected, the event/order may be pulled up for completion. As noted above, the orders are processed in the order that the customer's arrive so as to improve efficiencies.

In either GPS Zone embodiment, once the customer arrives at the vendor location, the customer is automatically recognized using GPS and/or RFID recognition techniques known in the art. The vendor or the customer may place the pre-registered event/order into the vendor's queue. In the case of a restaurant vendor, the customer may approve the pre-registered order for his/her party and receive a confirmation receipt and/or a pager so that the customer may be notified when the order is ready or a seat is available. In a self-service embodiment, on the other hand, the GPS and/or RFID recognition may automatically populate the customer's pre-registered order and provide it to a wait queue, awaiting approval by the customer. The customer then uses a kiosk or his/her mobile device to approve, modify or add member orders to the pre-registered event or order. Once the order is approved and confirmed, a confirmation receipt is printed from the kiosk and/or provided to the customer's mobile device. The customer may then proceed to a delivery station (e.g. at a drive-up window or at a delivery counter).

Data Management/Payment System

FIG. 4 is a flow diagram of a data management and payment flow system in accordance with the invention. As illustrated, a customer, or member, accesses the database 202 using the web-based or kiosk-based interface described above with respect to FIGS. 2 and 3. For example, at 401, the customer may manually access his/her profile account via a web-based or point-of-service based system or touch screen application (for example, see FIGS. 14 and 17 described below) in order to set profile preferences, to manage event criteria, and the like. On the other hand, a GPS Zone implementation at 402 may pull up the customer's personal profile based on his/her specific location and present marketing offer options to the customer's laptop, notebook computer, PDA, mobile phone, or other mobile device once the mobile device's GPS (or RFID or other wireless identification) 403 is detected. The customer may then set profile preferences, manage event criteria, and the like as described above with respect to FIGS. 2 and 3. For example, the customer may pull up a personal or business profile at 207 and then perform 235-250 to create an event, to place a gift order, or the like as described above.

The information generated in steps 235-250 may be stored in a Precision Gifting™ database 404 when a gift is selected using profiles or in a Precision Purchasing™ database 405 when a customer purchase is made using profiles. Also, system information may be stored in a Precision Marketing™ management system database 406 so that appropriate marketing message may be generated and sent to customers based on their activity within the system. In an exemplary embodiment, the customer may maintain his/her profile in a home redundant profile database storage 407 so that he/she may easily access and modify his/her profile information. Also, additional information 408 may be saved to the customer's profile to automatically update the home redundant profiles in database storage 407.

At the customer's election, the customer's profiles may be used to guide the marketing to the customer from the vendor's within the network. For this purpose, an in-house marketing database storage system 409 may be used to store marketing data indicating the customer's preferences to the products of the vendors in the network. As noted at 410, vendors may only have limited access to the customer's marketing data and only as approved by the customer. The information to which the vendor is permitted access may be provided to the vendor's node 411 within the network. As illustrated in FIG. 4, orders by the customer from the vendor are provided to the vendor's unpaid reserve queue at 412, and the customer's database storage 407 is updated as appropriate. Similarly, event information from the customer's database storage 407 may be provided to the vendor's node 411 at 413, and, once the event has been delivered by the vendor, the event is moved to the customer's delivered queue at 414. Also, in a GPS Zone implementation, GPS data from GPS device 415 may be provided to the vendor's node 411 to automatically notify the vendor that the customer is in range for delivery of the order or selected event and/or that the customer is in range for targeted marketing.

The payment system flow is illustrated at 416-421. As illustrated, when the customer makes a purchase with the system using Precision Purchasing™ and/or Precision Gifting™ at 416, payment 417 is sent to the vendor's merchant bank 418. Updated payment information may be provided to the vendor's node 411 as well as to the in-house merchant bank 419, for settlement of payment. Confirmation that the event has been paid for is sent to the customer's database 202 at 420. Also, the paid event is moved to the paid queue of the home redundant profile database storage 407 at 421.

Precision Marketing™ System

Figure 5A:
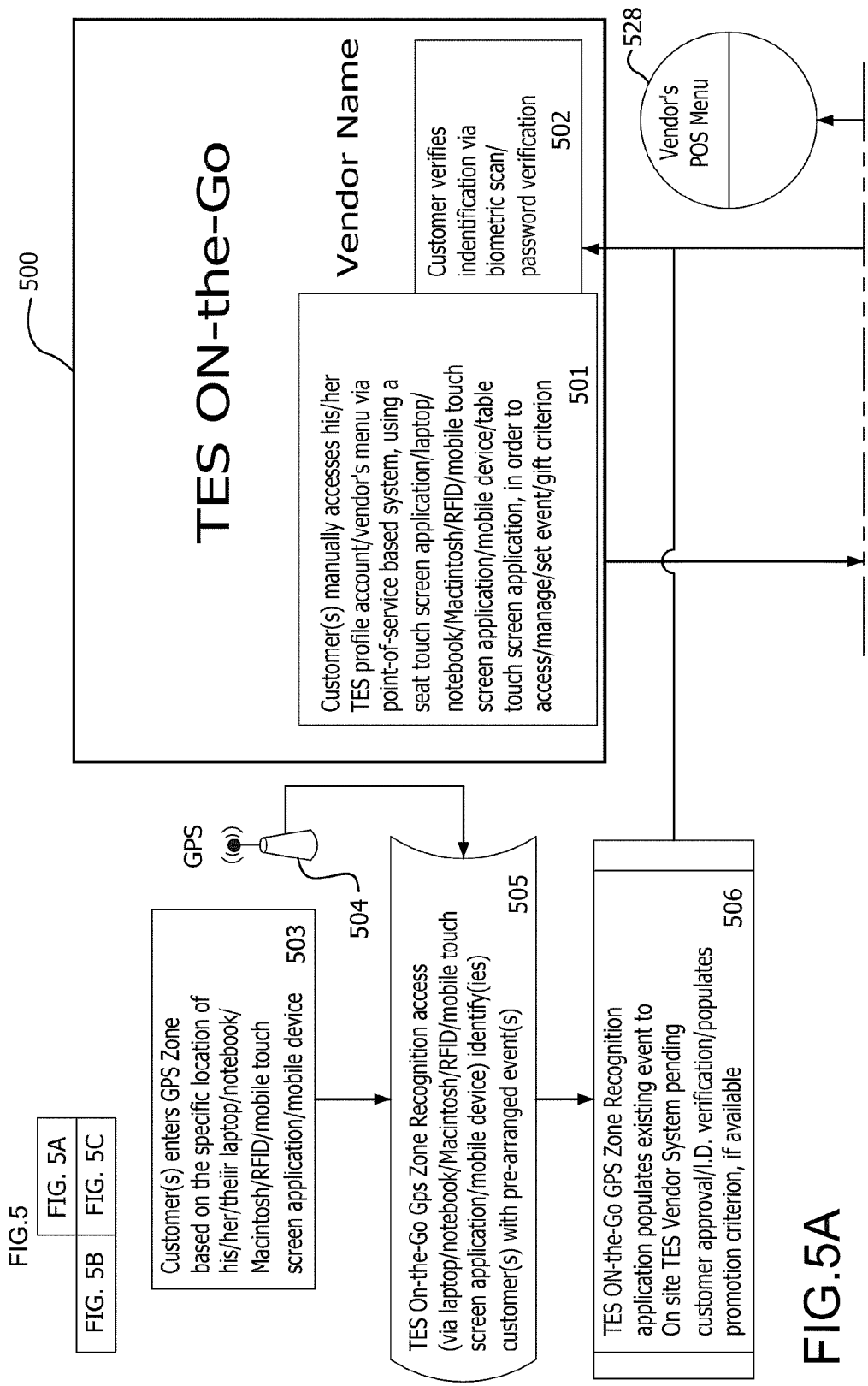
FIG. 5 is a flow diagram showing the process flow of a Precision Marketing™ embodiment that uses the customer's profile to target market the customer across industries in accordance with the invention.
Figure 5B:
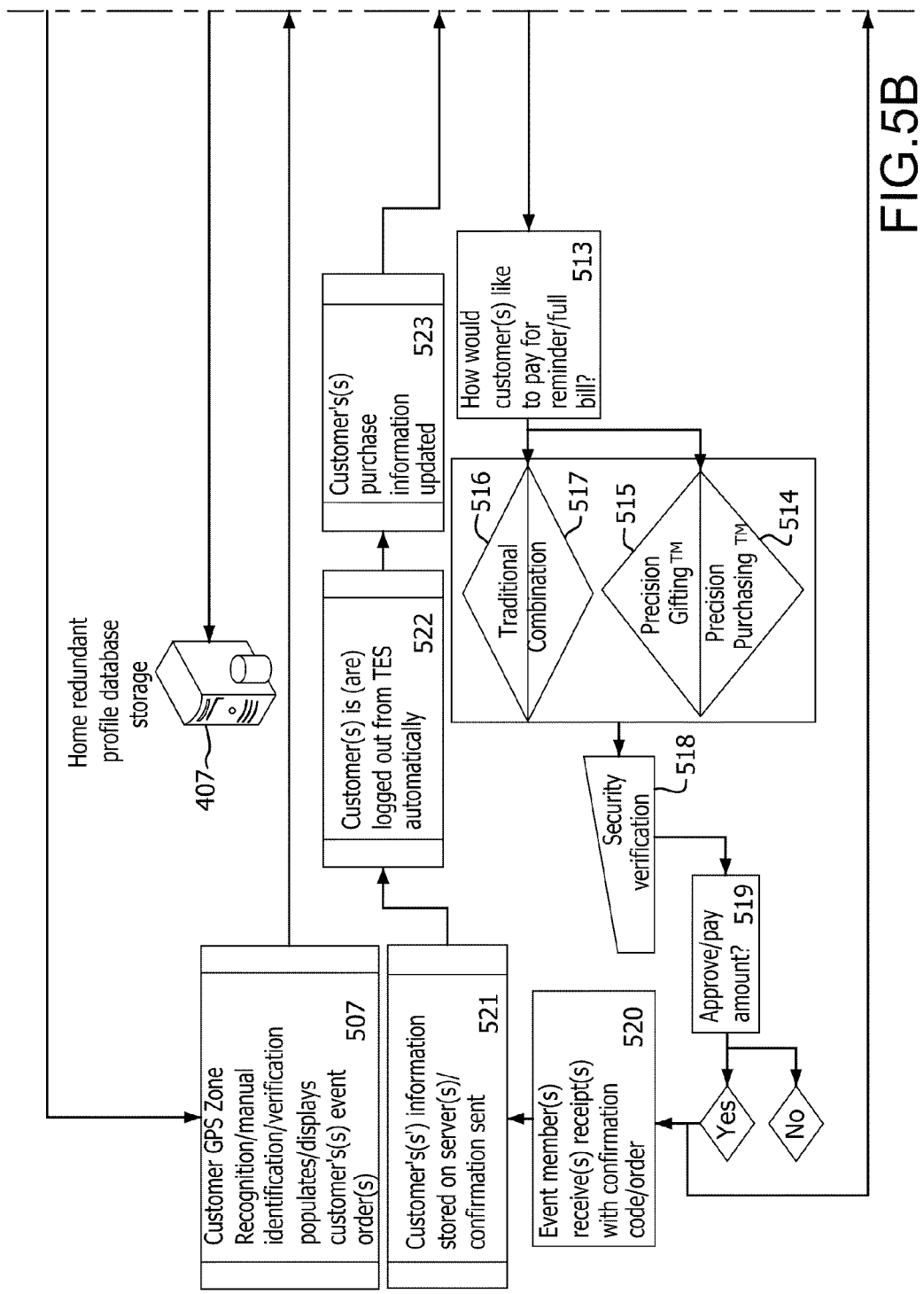
Figure 5C:
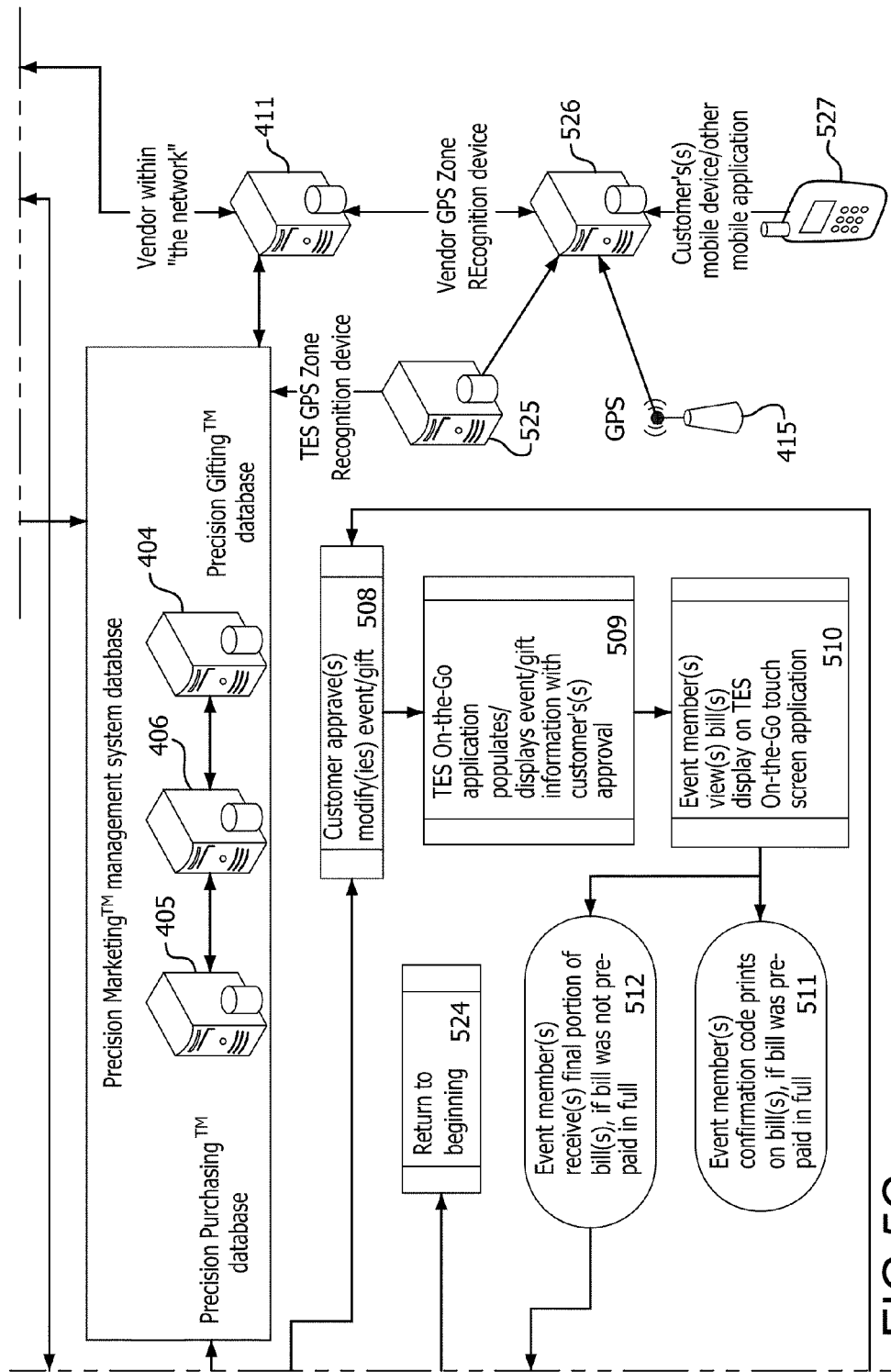
Figure 6A:
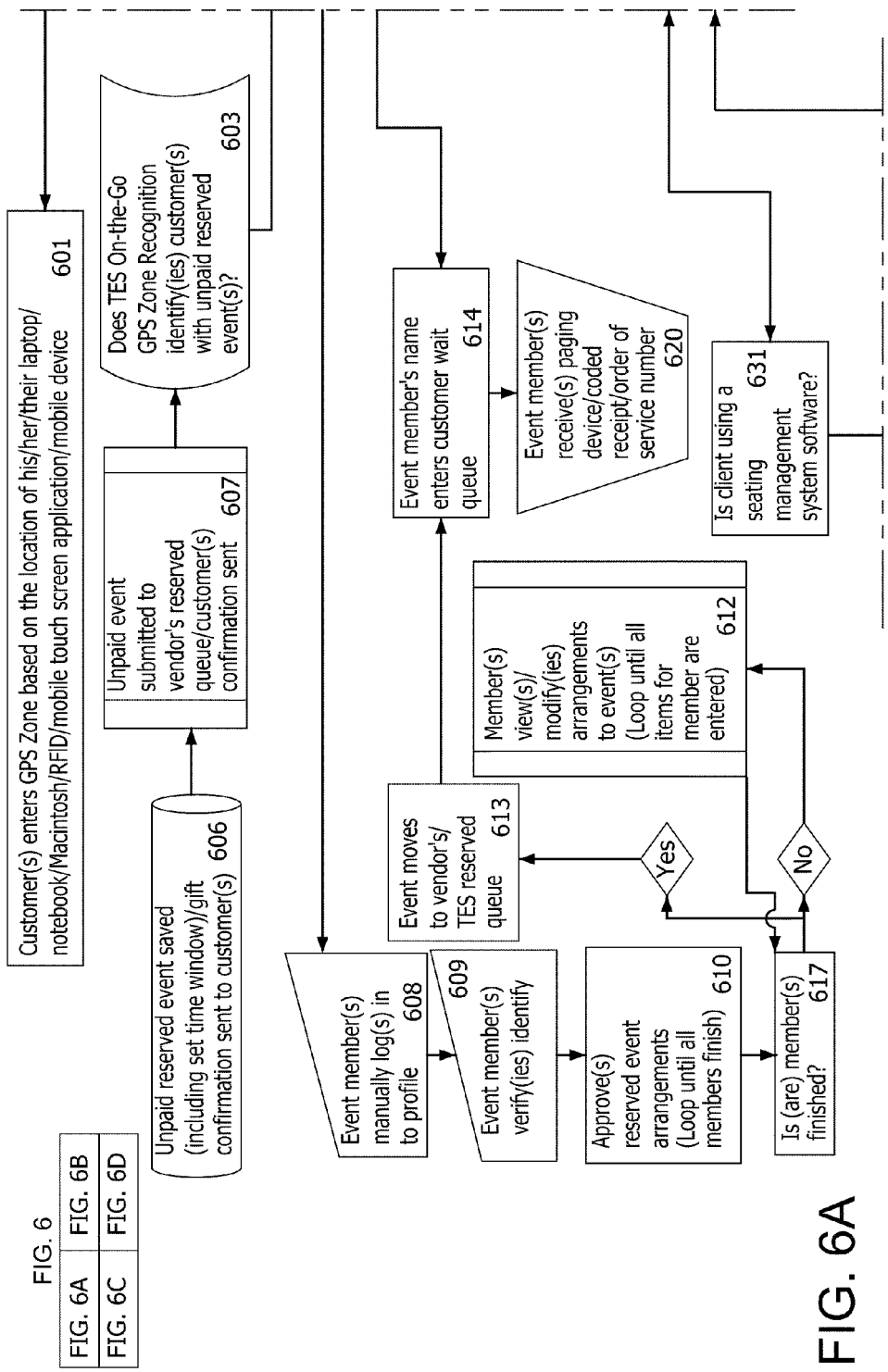
FIG. 6 is a flow diagram showing the process flow of an embodiment of the invention for application in a restaurant environment.
Figure 6B:
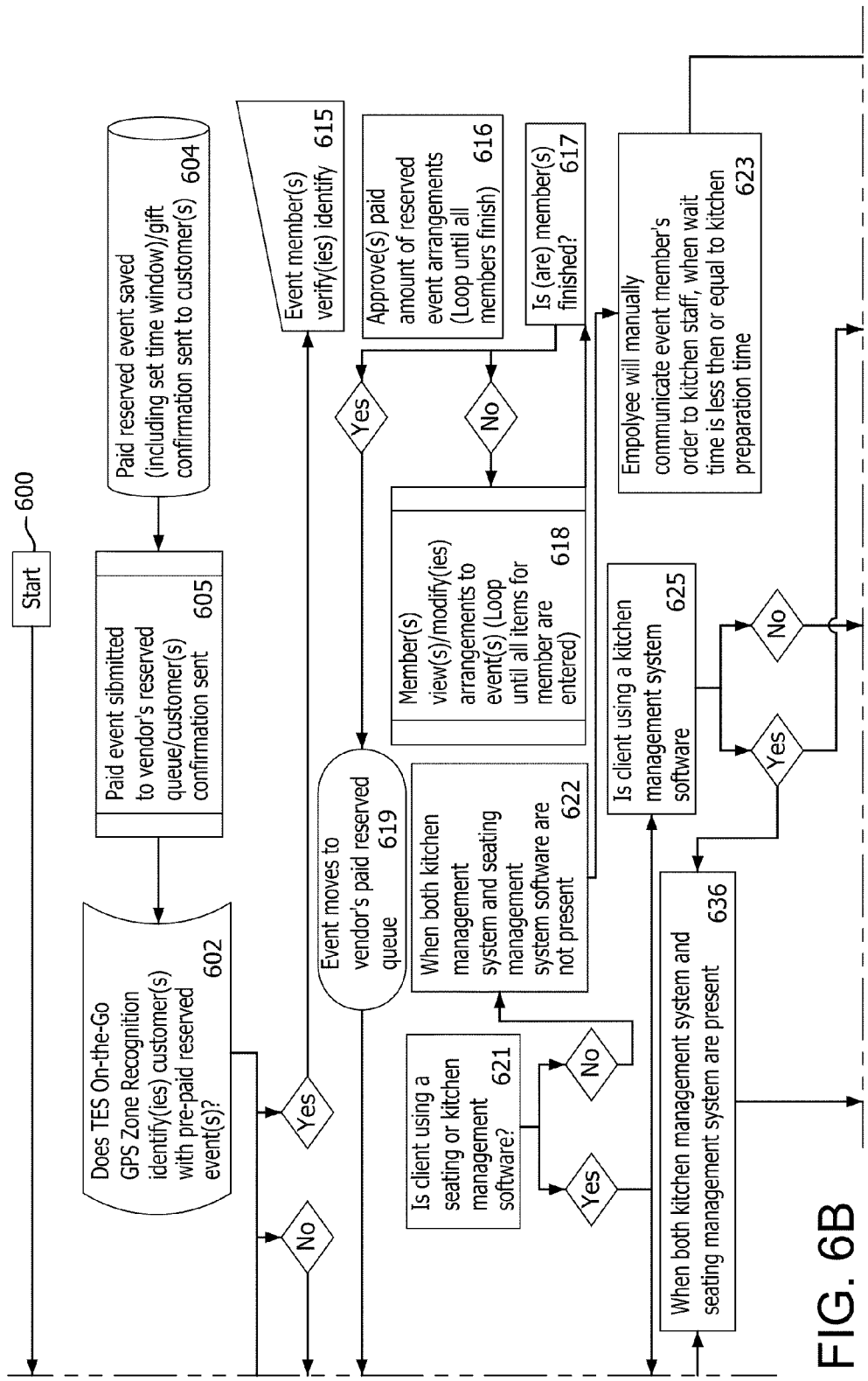
Figure 6C:
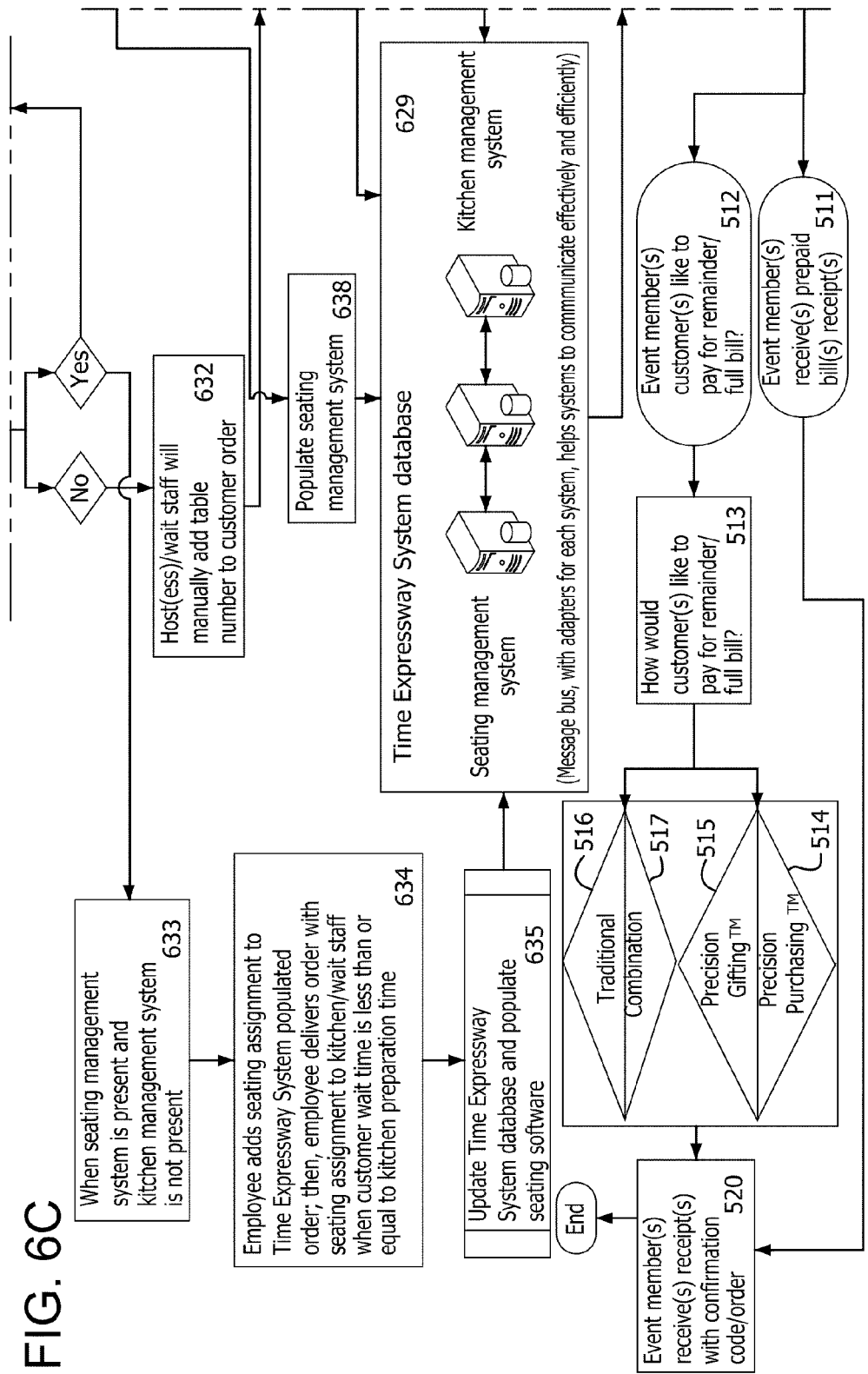
Figure 6D:
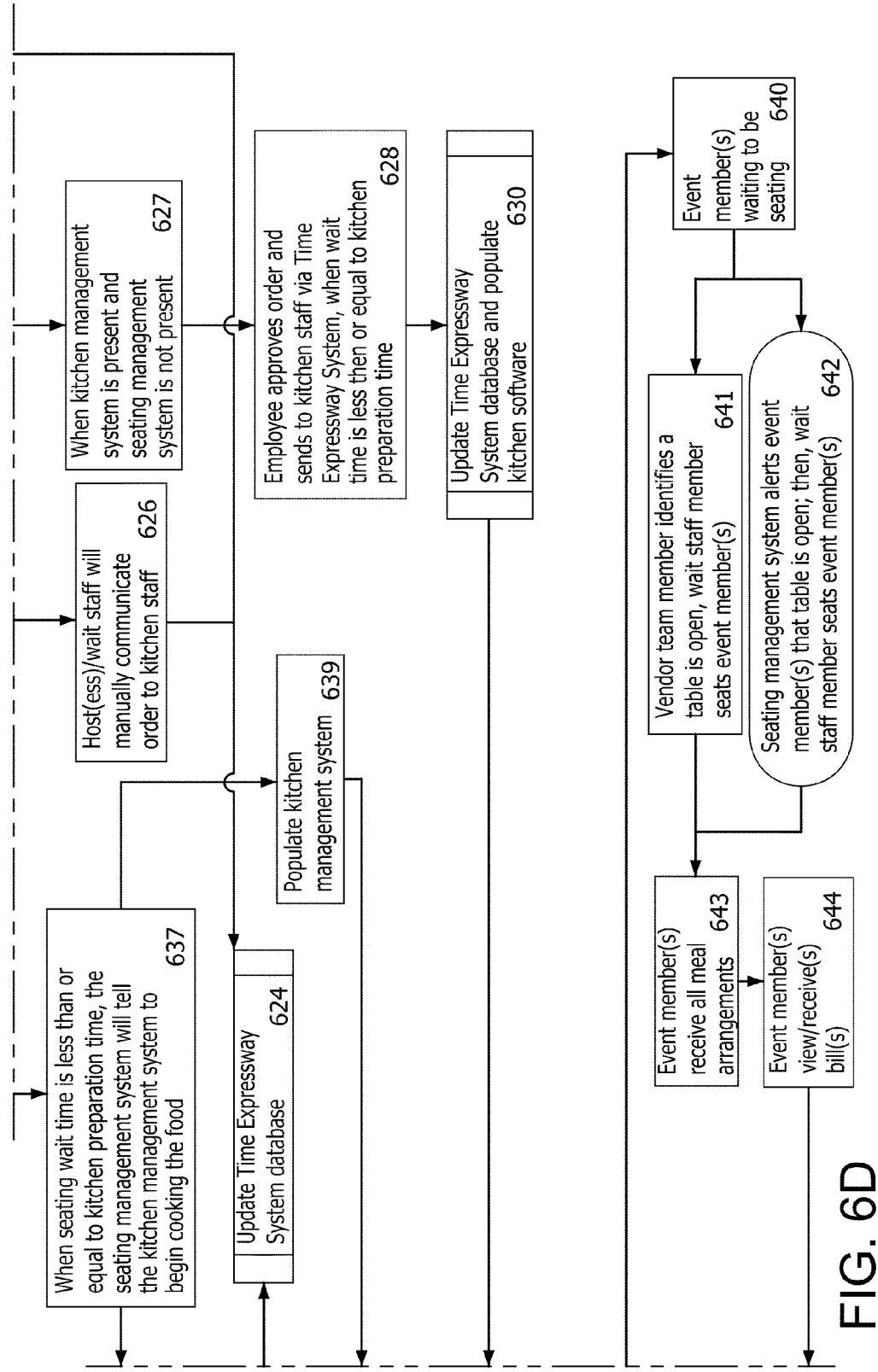

FIG. 5 is a flow diagram showing the process flow of a Precision Marketing™ embodiment that uses the customer's profile to target market the customer across industries in accordance with the invention. As illustrated, the Time Expressway System (TES) 500 allows the customer to access his/her profiles while on-the-go. For example, the customer may manually access his/her profile account and/or a vendor's options menu via a point-of-service based system such as a kiosk (FIG. 3), a seat touch screen application (FIGS. 14-17), or via a notebook computer, laptop computer, PDA, cell phone, etc. mobile application at 501. Typically, the customer verifies his/her identity using a biometric scan, a password, or some other known form of verification at 502. The customer then makes his/her selections as illustrated above with respect to FIG. 3.

On the other hand, in the GPS Zone implementation, when a customer enters a GPS Zone of a vendor at 503 and the customer's GPS device, RFID device or the like is detected by the vendor's GPS detection device 504, the system of the invention determines whether the customer has a pre-arranged event and, if so, presents the event to the customer's mobile touch screen application or other mobile device to make selections regarding the event and/or marketing information unique to that customer is pushed to the customer's mobile device at 505. At 506, a GPS Zone recognition application populates the existing event to the onsite vendor system pending the customer's approval and/or ID verification. Promotions may also be pushed to the customer's mobile device, as available. Upon verification of the customer, the customer's event or order is displayed to the customer on his/her mobile device or on a vendor kiosk at 507 for the customer's modification and/or approval at 508. Upon approval by the customer, the On-the-Go application populates or displays the event/gift information with the customer's approval to the customer's mobile device or the vendor's kiosk at 509, and the bill for the event/gift is similarly displayed on the customer's mobile device or the vendor's kiosk at 510. If the bill was pre-paid in full, a confirmation code to that effect is printed on the bill at 511; otherwise, the customer receives a final portion of the bill at 512 if the bill was not pre-paid in full. The customer is then asked at 513 how he/she would like to pay the remainder of the bill. The payment may be made using the Precision Purchasing™ system 514 or the Precision Gifting™ system 515 or, conversely, payment may be made in a conventional way (e.g., credit card, debit card, etc.) at 516 or at 517 as a combination of a conventional payment scheme and the Precision Purchasing™ system 514 or the Precision Gifting™ system 515. Once the payment is selected, security is verified at 518 and the payment amount is either approved or disapproved at 519. If approved, the customer receives a receipt with a confirmation code for the order at 520. On the other hand, if the payment amount is not approved, the customer is again given the opportunity to approve or modify the event or gift at 508 and steps 509-519 are repeated. Once a customer has received confirmation of payment with his/her order, the customer's information is stored on the appropriate server (e.g., 404-407) at 521 and the customer is logged out of the system automatically at 522.

The customer's purchase information is then updated at 523 and control returns to the beginning of the flow at 524.

The Precision Marketing™ system of FIG. 5 also includes a GPS Zone recognition device 525 that detects when a customer has entered a particular GPS Zone as well as a Vendor GPS Zone recognition device 526 that detects the GPS device 415 (FIG. 4) and/or the customer's mobile device or other mobile application 527. The Vendor GPS Zone recognition device 526 recognizes a vendor 411 within the network and provides the appropriate vendor's point of service (POS) menu to the customer's interface at 528.

Exemplary System Applications

The system described above with respect to FIGS. 1-5 will now be described in the context of five different exemplary fields of application of the TES: Restaurants (FIG. 6), Retail (FIG. 7), Entertainment (FIG. 8), Travel (FIG. 9), and Hospitality (FIG. 10). As will be apparent to those skilled in the art, the system described herein may be used to manage vendors and customer purchases in one, several or across all of the available fields of application.

Restaurant

FIG. 6 is a flow diagram showing the process flow of an embodiment of the invention for application in a restaurant environment. A similar system is described by the present inventor in U.S. patent application Ser. No. 11/741,704, filed Apr. 27, 2007, and the contents of that patent application are incorporated herein by reference in their entirety. As illustrated in FIG. 6, the restaurant logic flow starts at 600. Once the system detects that a customer has entered at GPS Zone at 601 based on the location of his/her laptop, notebook, RFID, mobile touch screen application, cell phone, or the like, the system determines whether the customer has a pre-paid reserved event at 602 or an unpaid reserved event at 603 within the system. As illustrated, if the reserved event is pre-paid, the event is saved at 604 and a confirmation is sent to the customer. The paid event is also submitted to the vendor's reserved queue at 605 so that the paid event is available at 602 once the customer is recognized to be in the GPS Zone at 602. Similarly, if the reserved event is not pre-paid, the event is saved at 606 and a confirmation is sent to the customer. The unpaid event is also submitted to the vendor's reserved queue at 607 so that the unpaid event is available at 603 once the customer is recognized to be in the GPS Zone at 603.

If a customer is not automatically recognized upon entry into the GPS Zone at 602 or 603, the customer may manually log into his/her profile at 608 and verify his/her identity at 609. At 610, the reserved event arrangements are approved until all members of the event have been approved at 611 or the arrangements are modified at 612. Once the arrangements are approved, the event is moved to the vendor's reserved queue at 613. The event member's name then enters the customer wait queue at 614. On the other hand, if a customer is automatically recognized upon entry into the GPS Zone at 602 or 603, the event members (e.g., members of the restaurant party) verify his/her identity at 615. At 616, the reserved event arrangements are approved until all members of the event have been approved at 617 or the arrangements are modified at 618. Once the arrangements are approved, the event is moved to the vendor's paid reserved queue at 619. The event member's name then enters the customer wait queue at 614.

Once the event member's name has been entered in the customer wait queue at 614, one or more members of the party (event) may receive a paging device, a coded receipt, an order of service number, or some other mechanism used to preserve the party's place in the seating queue at 620. If it is determined at 621 that the restaurant client is not using seating or kitchen management software (622), then the customers of the party manually communicate their order to the kitchen staff in the conventional way once the wait time for seating is less than or equal to the kitchen preparation time, or simply once the customers have been seated (623). The Time Expressway System (TES) database is then updated at 624.

However, if it is determined at 625 that the restaurant client device is using kitchen management software, then the hostess and/or wait staff manually communicate he order to the kitchen staff at 626 in the conventional fashion, and the TES database 629 is updated accordingly at 624. On the other hand, if the restaurant client device is indeed running kitchen management software (627), then a restaurant employee may approve the customer's order and sent the order to the kitchen staff via TES when the wait time is less than or equal to the kitchen preparation time at 628. The TES database 629 is then updated and populated with the kitchen software at 630. On the other hand, if the restaurant client device is not using seating management software at 631, then the hostess and/or wait staff will manually add the table number to the customer order at 632 and updated the TES database 629 at 624. If the restaurant client device is indeed running seating management software (633), then the seating assignment is added to the TES populated order and the order and seating assignment are delivered to the kitchen and/or wait staff when the customer wait time is less than or equal to the kitchen preparation time at 634. The TES database 629 is updated at 635 and populated by the seating software. Additionally, if the restaurant client device includes both kitchen management software and seating management software (636), then when the seating wait time is less than or equal to the kitchen preparation time, the seating management system may instruct the kitchen management system to begin cooking the pre-ordered food at 637. The seating management system is then populated at 638 and the kitchen management system is populated at 639 and provided to the TES database 629.

Once the TES database 629 has been updated, the event members waiting to be seated (640) that are in the seating queue are provided to a vendor team member (restaurant staff) who seats the event members when a table is available at 641. If a seating management system is being used, it alerts the event members that a table is open and a vendor team member seats the event member at 642. Once seated, the event members receive all meal arrangements from their event at 643 and receive the bill at 644. The bill is then processed in the same fashion as in FIG. 5 by implementing steps 512-520, with or without security verification 518 and payment approval 519.

Retail

Figure 7B:
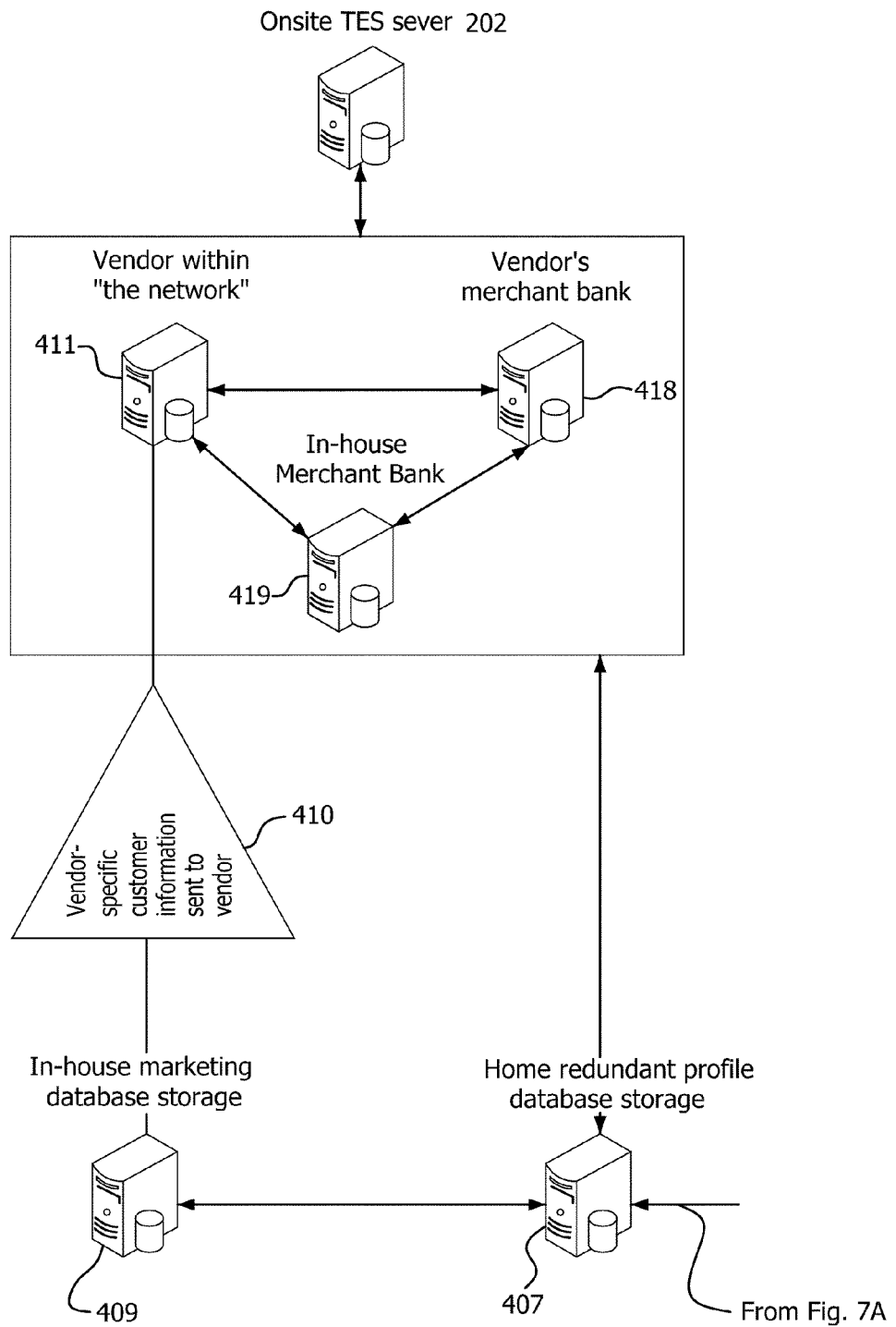

FIGS. 7A-7B together illustrate a flow diagram showing the process flow of an embodiment of the invention for application in a retail shopping environment. In the retail embodiment, the system starts at 700 and checks for a customer entering the GPS Zone of the retail vendor using steps 601-607 as used in the restaurant embodiment described above.

If a customer is automatically recognized upon entry into the GPS Zone at 602 or 603, the TES then determines at 701 whether the retail client device is using TES inventory management software. If it is, then the TES inventory management software populates a display with pre-arranged items from the customer's profile. The display may be provided to a kiosk or to the customer's touch screen application, laptop, cell phone, etc. at 702. Next, at 703 the vendor team member (retailer) sets aside the merchandise corresponding to the pre-arranged items of the customer's profile so that these items await the customer's approval/verification upon arrival.

The customer is then asked at 704 how he/she would like to pay for any remaining unpaid portion of his/her bill. As in the embodiment of FIG. 5, the payment is handled at 514-517 and the databases 404-406 are updated as appropriate. Also, the customer is given the opportunity to approve the amount at 705 and, as appropriate, to modify the event order at 706, to cancel and return to the beginning at 707, or to proceed to payment security verification via traditional methods at 708 if the payment is approved. At 709, the vendor accepts/approves payment form the customer and verifies payment from the customer. The vendor team member (e.g. sales clerk) completes the purchase at 710 and bag/boxes the merchandise for the customer. The databases 404-406 are then updated as appropriate.

However, if the retail client computer does not use TES inventory management software, then at 711 the vendor team member checks its email alert system and prepared inventory according to the customer's event criteria. Such data is preferably sorted by time window when the GPS Zone Recognition device recognizes at 602/603 that the customer is in range of the retailer. The process then proceeds at 703 as in the case where the retail client device uses TES inventory management software.

If a customer is not automatically recognized upon entry into the GPS Zone at 602 or 603, the customer may manually access his/her TES profile account and/or a vendor's menu via a point-of-service-based system (e.g., kiosk 202, FIG. 7B) using, for example, a touch screen application, in order to access the events/gifts to manage or set events/gifts using the customer's or gift recipient's profile criteria at 712. The event members log into the events using an identification card swipe, a biometric scan, a key fob, an email address, or some other log in identification method via the point-of-service-based system's touch screen application at 713. The customer is verified at 714 using a password, a biometric scan, or some other customer verification method. Once the customer is verified, the customer is asked at 715 if he/she wishes to add Precision Gifting™ dollars to the customer's order. If so, the Precision Gifting™ dollars are applied from the customer's (giftor's) profile account to the giftee member(s) account at 716 for an event, order, or gift being given to the giftee. Then, at 717, the event members verify/approve the event/gift criteria for the reserved events via the members' touch screen applications on vendor-linked point-of-service-based systems via appropriate identification verification techniques on such POS-based systems. Each member is then given an opportunity to view and modify his/her event order at 706 before proceeding to the payment process starting at step 704. The data and payment servers 407, 409, 411, 418, and 419 are then updated (FIG. 7B) as described above with respect to FIG. 4.

Entertainment

FIGS. 8A-8B together illustrate a flow diagram showing the process flow of an embodiment of the invention for application in an entertainment environment. In the entertainment embodiment, the system is used to create entertainment events by, for example, purchasing concert tickets, movie tickets, and the like. The system starts at 800 and checks for a customer entering the GPS Zone of the retail vendor using steps 601-607 as used in the restaurant and retail embodiments described above.

If a customer is automatically recognized upon entry into the GPS Zone at 602 or 603, the TES inventory management software populates a display with pre-arranged events from the customer's reserved queue in the vendor's system. The display may be provided to a kiosk or to the customer's touch screen application, laptop, cell phone, etc. at 702. The event member(s) may then verify/approve the event/gift criteria for the reserved event via the members' touch screen applications or via a vendor-linked point-of-service-based system at 717. Control then passes to the payment options starting at 704.

However, if the entertainment client device does not use TES inventory management software, then at 712 the customer may manually access his/her TES profile account and/or a vendor's menu via a point-of-service-based system (e.g., kiosk) in order to manage the customer's profile and/or set an event, select a gift, and the like. Once the events are set, the event members log in via an identification card swipe, biometric scan, key fob, email address, or the like at 713. Then, if the customer wishes to send a gift to another member, Precision Gifting™ is selected at 801. The member then accesses, applies, and/or adds available Precision Gifting™ dollars from the member's (giftor's) profile account to the giftee member(s) account(s) for an event/order/gift as appropriate at 802. The event member then verifies and/or approves the gift criteria at 717.

On the other hand, if the customer wishes to use his/her profile to perform Precision Purchasing™ at 803, then it is determined at 804 which portion of the vendor's reserved queue contains the reserved event/order. If the event is unpaid, a determination regarding payment is made at 704, and the payment is processed as described above with respect to FIG. 5. However, if the event is pre-paid, then payment security verification is performed at 805 and the customer's verification is sent at 806. If it is determined at 807 that the member is finished with the order, a ticket or receipt is printed and the ticket or order is delivered to the member on-site based on the member's GPS position or seat location. For example, an event ticket with a bar code could be emailed to the customer for printing. At 809, the paid event is submitted to the vendor's delivered queue and the customer's profile information is updated in the TES database. The event criteria is saved at 810 and the member is logged out before returning to the beginning of the processing at 811. However, if at 807 it is determined that the member is not finished, then the member is given the option of modifying arrangements to events at 812 or to modify food/drink orders and the like for the event at 813.

FIG. 8B illustrates an embodiment where the GPS Zone is implemented based on the location of the customer relative to an embodiment of the kiosk mounted in a vehicle steering wheel or dash assembly (FIGS. 14-16) or an airplane seat cover (FIG. 17). Of course, the embodiment of FIG. 8B may also be used in other environments such as stadiums concert venues where customers have an assigned seat.

As illustrated in FIG. 8B, the system detects at 814 that the customer has entered a seat GPS Zone based on the location of his/her seat touch screen on the fixed seat display or on the location of the customer's mobile device. At 815, the system determines whether the identified customer has a pre-arranged food/drink order for the current event (concert, flight, etc.). If not, the customer may decide at 816 to manually access his/her TES profile account and the vendor's menu using the seat point-of-service based system (e.g., FIG. 17) or the customer's mobile device in order to access/manage the event/gift information in the TES. Once an event is detected at 815 or the customer decides at 816 to access his/her TES account, the member logs into TES using a card swipe, a biometric scan, key fob, etc. at the customer's seat using the seat point-of-service based system or the customer's mobile device at 817. The desired food/drink arrangements are then set at 818 via the seat point-of-service system or the customer's mobile device at the vendor's location. This process is illustrated at steps 819-826. As illustrated, the customer selects food/drink type at 819, which may be, e.g., specialty food 820a, concession food 820b, soft drinks/water 820c, specialty drinks 820d, alcoholic beverage 820e, and the like. The seat location is passed to the system at 821 and the order is completed at 822 by adding the number in the party (823), the time window for deliver (824), and the delivery options (825). At 826, offers may be added to the event order and/or all food/drink items may be approved for all members of the customer's party. This information for the event is then modified/accessed at 248-250 as described above with respect to FIG. 2. Also, any marketing offer generated from the customer's profile may be viewed/accessed at 827. The system then determines at 828 how the customer would like to pay. Payment security verification is added at 829 and the paid event is submitted to the vendor's paid queue and a customer confirmation is sent at 830. If the member is finished with his/her order (event), tickets/receipts are printed and delivered to the customer at his/her seat location or GPS position at 832. The paid event is submitted to the vendor's delivered queue and the customer's profile information in TES is updated at 833. The event criteria is saved at 834 and the customer is automatically logged out. The process then returns to the beginning at 835 so that it is ready for the next event. Conversely, if it is determined at 831 that the customer is not finished, the customer may modify his/her arrangements for the event at 836 and/or modify the food/drink order at 837 by repeating steps 819-831.

Travel

FIGS. 9A-9C together illustrate a flow diagram showing the process flow of an embodiment of the invention for application in a travel environment.

Hospitality

FIGS. 10A-10C together illustrate a flow diagram showing the process flow of an embodiment of the invention for application in a hospitality environment. As illustrated in FIG. 10A, much of the logic flow in this embodiment is the same as in the generic embodiment of FIG. 2. However, in the embodiment of FIG. 10, once the hospitality event has been set (e.g., hassle-free luggage service including express mail courier service delivery of luggage to a member's preferred destination), payment security verification is added at 1001 and the customer is asked at 1002 whether he/she is finished. If the answer is yes, and if the customer has not paid for the event (1003), the customer is asked at 1004 how he/she would like to pay for the event. As in the Precision Marketing™ System of FIG. 5, the customer may pay using Precision Purchasing™ 514, Precision Gifting™, 515, traditional payment (e.g., credit card) 516, or combination payment 517. Once the event has been purchased (1005), the pay amount is approved at 1006 and the paid event is submitted to the vendor's paid queue at 1007. The customer's ticket/receipt is printed at 1008 and delivered to the customer. The paid event is submitted to the vendor's delivered queue and the customer's confirmation is sent at 1009. The event criteria is saved in the member's profile at 1010 and the customer is automatically logged out. The system returns to the beginning at 1011 and is ready for the next customer login. On the other hand, if at 1006 the pay amount is not approved, the event may be canceled at 1012 or modified at 1013 using the vendor-linked point-of-service-based kiosk at 1014 and the customer's profile is updated as previously described.

FIG. 10B illustrates the logic flow in an exemplary hospitality embodiment. As illustrated, at 1015 a member is input or selected and the order preference for arrangements and/or restrictions is set for each selected member. By way of example, if the customer selects hassle-free luggage service (1016), the customer specifies at 1017 the vendor-approved preferences for arrangements and/or restrictions for the customer's luggage pick-up and delivery. An express mail carrier or other delivery service vendor receives the order at 1018 and delivers a price estimate to the TES. TES then calculates the price estimate, notifies customers of the estimated price, and awaits each customer's approval at 1019. The customers then apply discounts and/or accept the hassle-free luggage service based on the estimate at 1020. The TES then confirms the order and price estimate at 1021 and sends a request for real-time service availability. At 1022, the receiving vendor confirms the service availability for the customer and the customer's order is sent to the vendor's unpaid reserved queue in the TES. The vendor sends confirmation through the TES to the customer at 1023 and awaits payment approval. As desired, the customer may view and modify the order at 1024 and select one of the payment options presented to the member in his/her TES account. The customer's approval/confirmation of the event or order is provided at 1025, and the customer is then asked at 1004 how the customer intends to pay for the event or order. Similarly, if the customer creates an unpaid customer order at 1026, the customer is asked at 1004 how he/she intends to pay for the order. As in the Precision Marketing™ System of FIG. 5, the customer may pay using Precision Purchasing™ 514, Precision Gifting™ 515, traditional payment (e.g., credit card) 516, or combination payment 517.

The pay amount is approved at 1006 and the paid event is submitted to the vendor's paid queue at 1027. Otherwise, the customer is given the option to cancel (1012) or modify (1013) the event or order. If the customer cancels at 1012, the customer is automatically logged out at 1028 and control returns to the beginning at 1029. Once the paid event is submitted to the vendor's paid queue at 1027, the customer's confirmation is sent at 1030. The payment may be sent to the vendor via TES or any other appropriate payment system at 1031 and the customer order confirmation sent at 1032. Payment confirmation may be sent to the customer with tracking information at 1033. At this point, the vendor or some other hospitality service member may deliver the luggage to the approved location at 1034. At 1035, the luggage delivery is confirmed with the receiving party, and the customer receives his/her luggage at 1036.

As an example, while booking his/her reservation or after the reservation is confirmed, the customer may elect to use an optional Hassle-Free Baggage Service whereby the customer may elect to have his/her boxed baggage transported to his/her confirmed destination within a chosen time frame (e.g., 24 hours) in advance of travel so that the customer's baggage may be waiting at the customer's destination hotel (at the customer's reserved room, if available) prior to the customer's arrival. If this service is elected, the customer would leave his/her boxed baggage and attached reservation confirmation at the door of his/her place of business or residence at least 24 hours prior to departure. The boxed baggage, after confirmation approval, would then be transferred via an express carrier service of an express carrier partner to the city and hotel destination supplied on the confirmation itinerary. Upon the arrival of the boxed baggage to the customer's choice of hotel, the hospitality staff of the hotel will deliver the boxed baggage to the corresponding room noted on the customer's confirmation itinerary before noon the day of the customer's flight arrival. The price of this service is adjusted in accordance with the weight/size requirements, time constraints, and restrictions of the express carrier service. The customer's travel profile may also be used to provide precision marketing to the customer as sell as last minute deals and the like based on the customer's most frequently and most recently traveled destinations.

As a further example, the customer's meal preferences could be used in the restaurant embodiment above to pre-register the customer for meals at a local restaurant meeting, as part of an event package, all of the customer's profile requirements and preferences. In this case, a combined travel/restaurant event would be created as a customized event using the customer's profile data from different profile categories. The customer could thus enjoy traveling without the stress of planning, hauling baggage, and wasting time on logistics.

To illustrate further, the customer could fly into his/her desired destination and go strait to his/her favorite restaurant in the destination city knowing that his/her baggage will be waiting in his/her hotel room. On the logistics side of the event, by storing favorite destinations and/or dream locations, meal preferences, and lodging inclinations, the system of the invention will automatically assess available travel deals that are custom designed to the customer's exact purchasing preferences. Therefore, the customer receives only applicable options based on his/her purchasing affinity for his/her event package.

As a further example, a more technology savvy customer could access the same convenience through a hand-held GPS device that would guide the customer through his/her trip itinerary with the same convenient choices established from the customer's profile. For example, the same customer arriving in London Heathrow would have satellite connection through a handheld GPS device that would instruct the customer from the airport to the airport rental car hub to a designated dinner location where a pre-registered meal event is waiting there for the customer's approval. The GPS system would then guide the customer to a preferred hotel. At the hotel, the customer would find his/her baggage secured in his/her room after express check-in at a kiosk in the hotel lobby. Because the customer only stays at lodging sites meeting the customer's preferences (e.g., exercise room and hot breakfast available), the customer will never be surprised with faulty lodging advertising common in current online booking applications. Even more convenient, the customer who appreciates all of the efficiencies provided by the system of the invention may choose to stay at a hotel property where the customer will find the system of the invention installed in the hotel's restaurant and/or lobby. In places where time is extremely limited and planning is crucial, the invention will facilitate the sharing of meals with clients in between business meetings onsite at the hotel property preplanned as one event including baggage, flight, lodging, meeting, and meal events. The resulting trip would be maximally convenient, productive and hassle-free.

System Interfaces

FIG. 11 illustrates a sample interface to the system of the invention. This sample interface illustrates an interface to TES for an embodiment including restaurant, entertainment, shopping and travel options as described above. The sample interface includes standard social networking features along the left margin whereby users may identify others within their network that are on the system at a given time. Also, as indicated at the bottom of FIG. 11, windows may be provided to permit online chatting or texting with other persons to arrange for events within the context of the TES of the invention. For example, along the right margin, confirmation activity in connect with a proposed event may be provided in separate windows. In addition, database search features may also be integrated whereby the user may search for system information on vendors and other members as well as information from his/her own profile.

Figure 12A:
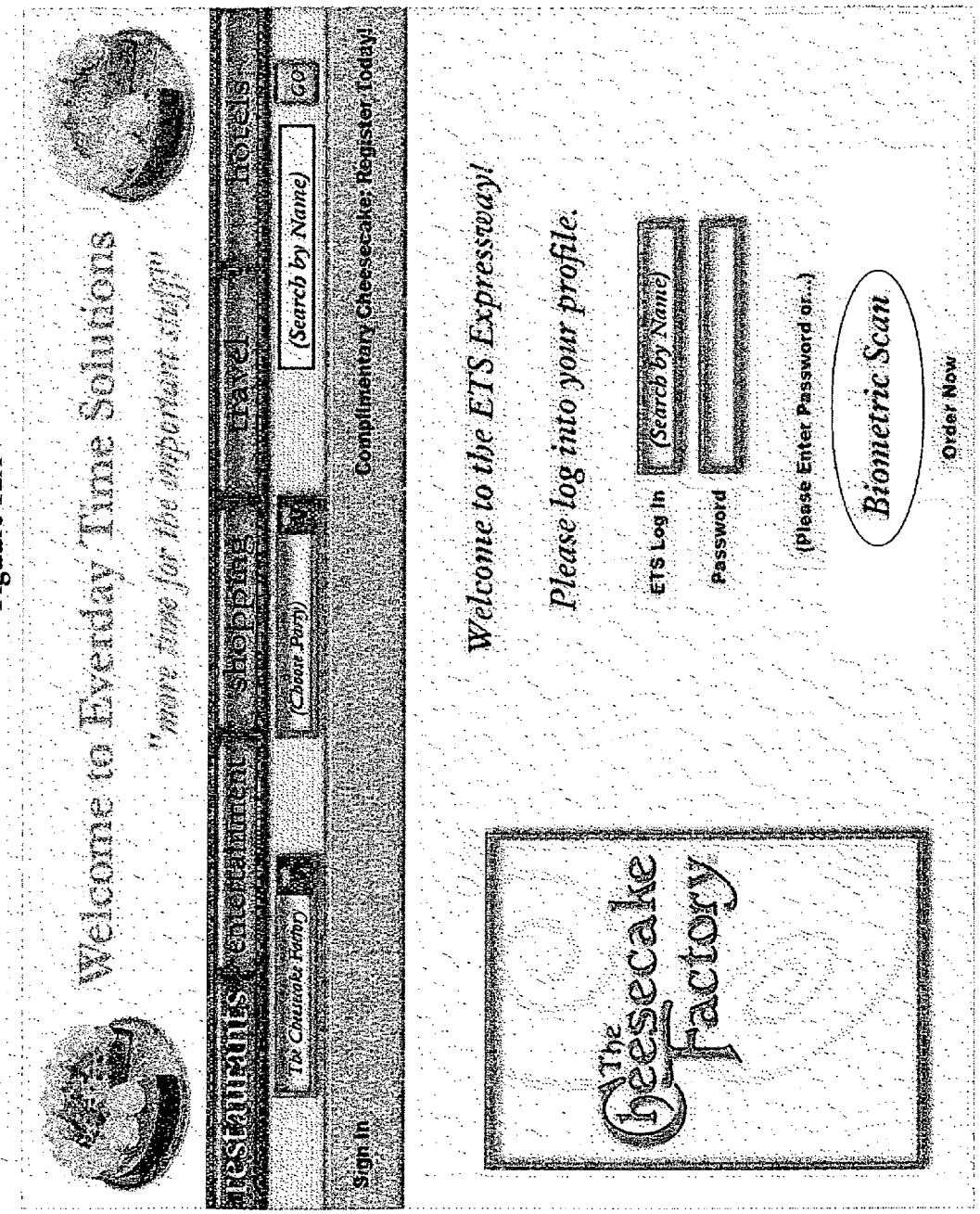

FIGS. 12A-12I together illustrate a sample application of the system of the invention for use in preselecting a dinner order prior to arriving at the restaurant and paying for same at the end of the meal. FIG. 12A illustrates the ETS Expressway login screen that enables the user to select his/her profile. A password, a biometric scan, or other known verification technique may be provided to authenticate the user to enable secure access. FIG. 12B illustrates a display for accessing the user's profile information, where events and members for the particular profile are provided. As indicated, a profile may be shared by two or more members such as, in the illustrated case, a husband and wife.

Figure 12E:
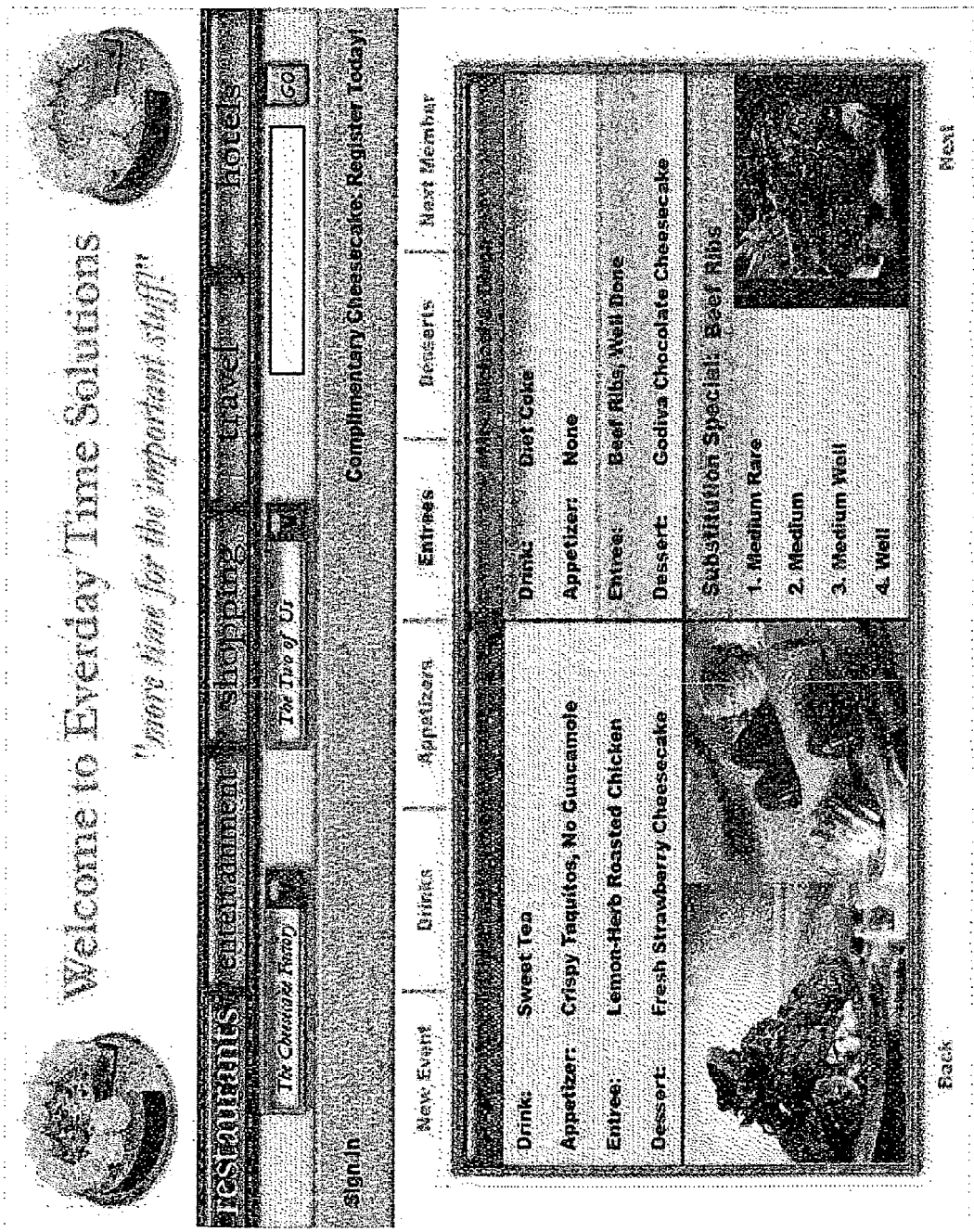
Figure 12F:
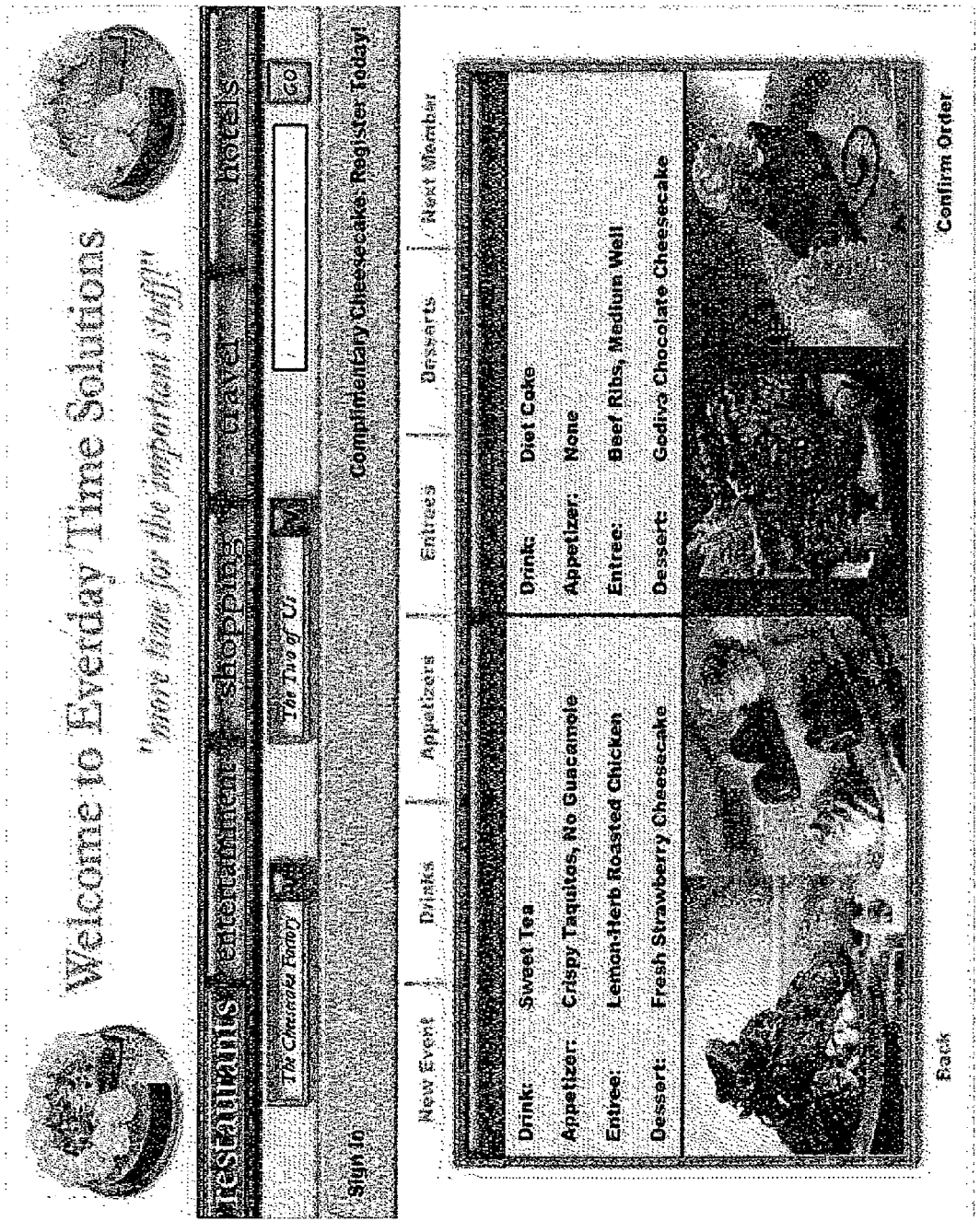

FIG. 12C illustrates highlighted event selections for the planning of an anniversary dinner by Mr. and Mrs. Dixon. As illustrated in FIG. 12D, the anniversary event includes meals selected from the menu of a member restaurant under the restaurant tab. FIG. 12D illustrates a substitution entrée (chicken madiera) that the user may elect to substitute with another entrée, such as beef ribs (FIG. 12E). FIG. 12F illustrates a sample confirmation screen once the order has been confirmed. FIG. 12G illustrates a sample invoice for payment, including special offers triggered by the selections. FIG. 12H illustrates a sample approval screen.

FIG. 12I illustrates the actions taken by the customers (e.g., Mr. and Mrs. Dixon) when they show up for dinner after completing the on-line order just described. As illustrated, the customers enter a queue at 1201 and have their event (prepaid reservation) confirmed by an onsite employee at 1202. The customers participate in the event at 1203 (e.g., have dinner) and may elect further items to purchase during dinner at 1204. When ready to pay their bill, the customers may use the touchscreen on their mobile device or an onsite kiosk with a touchscreen (1205). The payment options are presented by the Expressway database 202 at 1206, and the data is provided to a local point of service computer 1207 for payment (1208). Once payment is completed at the point of service computer 1207, payment confirmation is communicated to the Expressway database 202 at 1209. Once the transaction is completed, the customer's profile is updated at 1210 and the customer is logged out of the system at 1211.

Touch Technology Applications for Automobiles, Airlines, and Stadium Seating

Interfaces to the system described above may be provided in vehicles such as automobiles, airplanes, and stadium seating in order to facilitate use. For example, a touch screen interface such as that illustrated in FIG. 13 may be used which is comprised of a combination gelatinous, thermoplastic resin-molded and polymer blended surface with 2-3 plastic security snap fasteners that hug the steering wheel face of any automobile. The soft design helps it to stay in place while in motion; however, it is desirable that the interface be used while the vehicle is not in motion. This post-manufacture application design requires a harness that will hook into all existing component parts, including: Navigation, Bluetooth, cameras, stereo system, and all other existing component applications by way of the automobile's steering column. In addition, the interface may be adapted to display a full screen image of the graphical user interface via satellite up-link.

Figure 13:
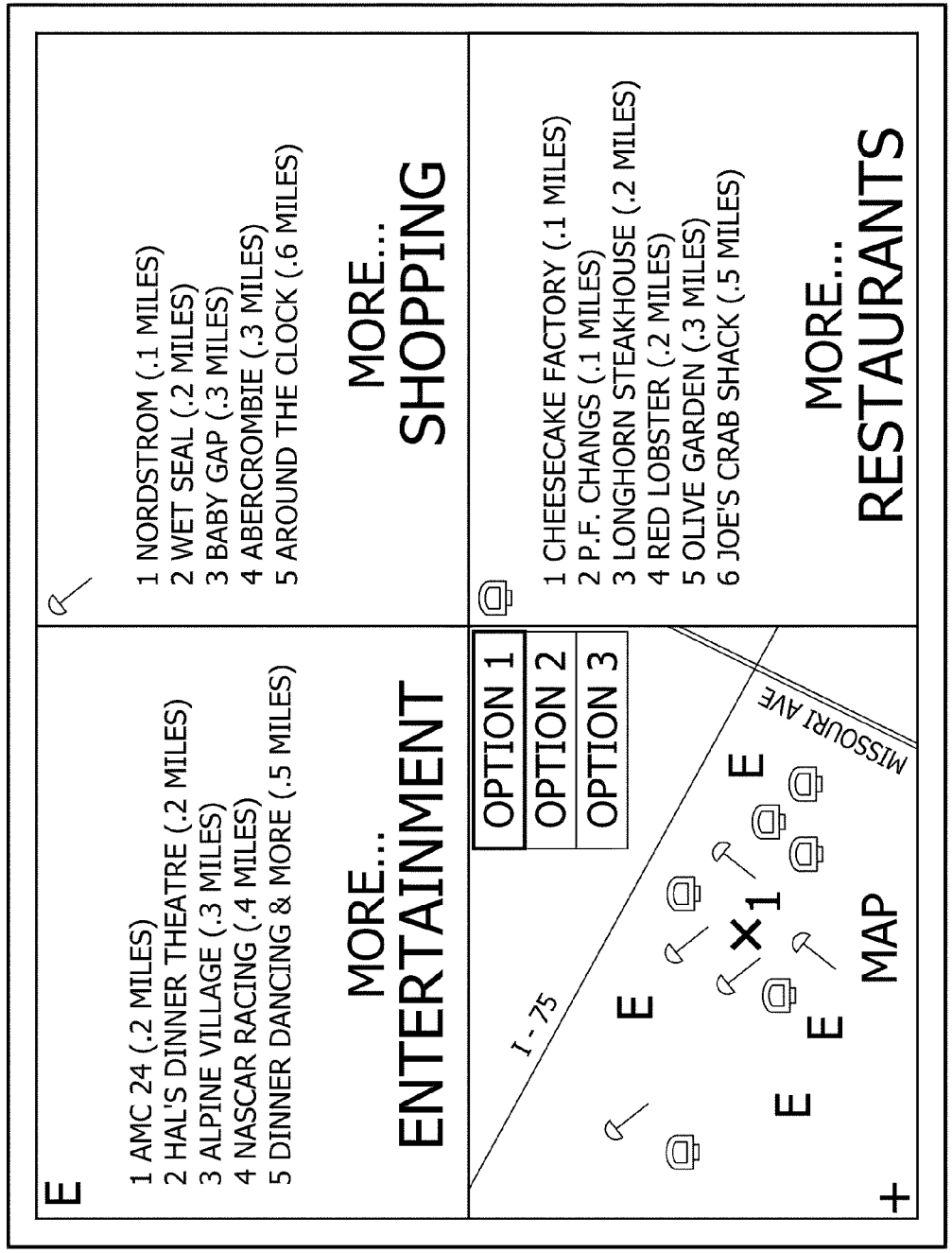
FIG. 13 illustrates a mobile marketing interface to the system of the invention that is based on the location of the user.

FIG. 13 illustrates a mobile marketing interface to the system of the invention that is based on the location of the user. The interface illustrated in FIG. 13 is only an example, for in an exemplary embodiment the customer may specify in his/her profile how he/she would like the interface to appear on his/her mobile handheld device. The customer may also select whether (and how) he/she would like to receive vendor offers. The GPS recognition capability of the handheld allows vendors to pre-set real-time offers that are pushed to customers in the immediate or designated vicinities for use within a certain time window. The display of FIG. 13 thus may provide a GPS display in addition to the shopping, entertainment, restaurant, travel, and hospitality options described herein.

Inside the device of FIG. 13, behind the touch screen surface, is a flat hard-drive that can store large quantities of information. Fully equipped with a speedy processor, this mini-computer allows the device to connect to the application described above and affiliate sites, alone, while at the same time helping the customer to more safely use the built-in electronic devices within his/her automobile. In the example of FIG. 13, the display provides a map and a listing of system vendors within the range of the map. In addition, the customer's profile may permit him/her to specify how he/she would like to receive vendor offers. For example, the GPS recognition system may be adapted to allow vendors to pre-set real-time offers that are pushed to customers within a certain range of the vendor's premises.

Figure 14A:
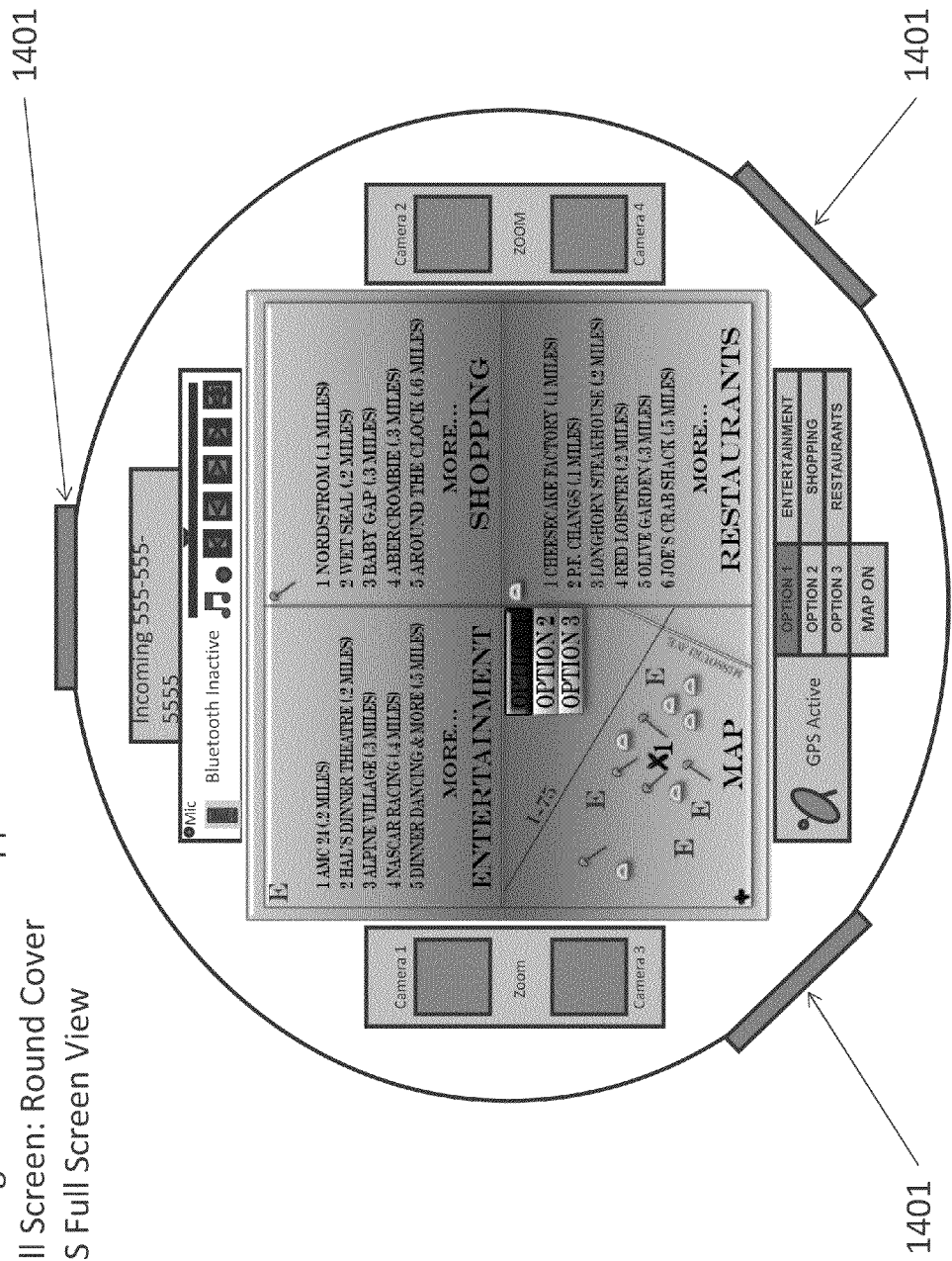
FIGS. 14A-14C illustrate embodiments of a steering wheel cover for an automobile modified to include the mobile marketing interface of FIG. 13.
Figure 14B:
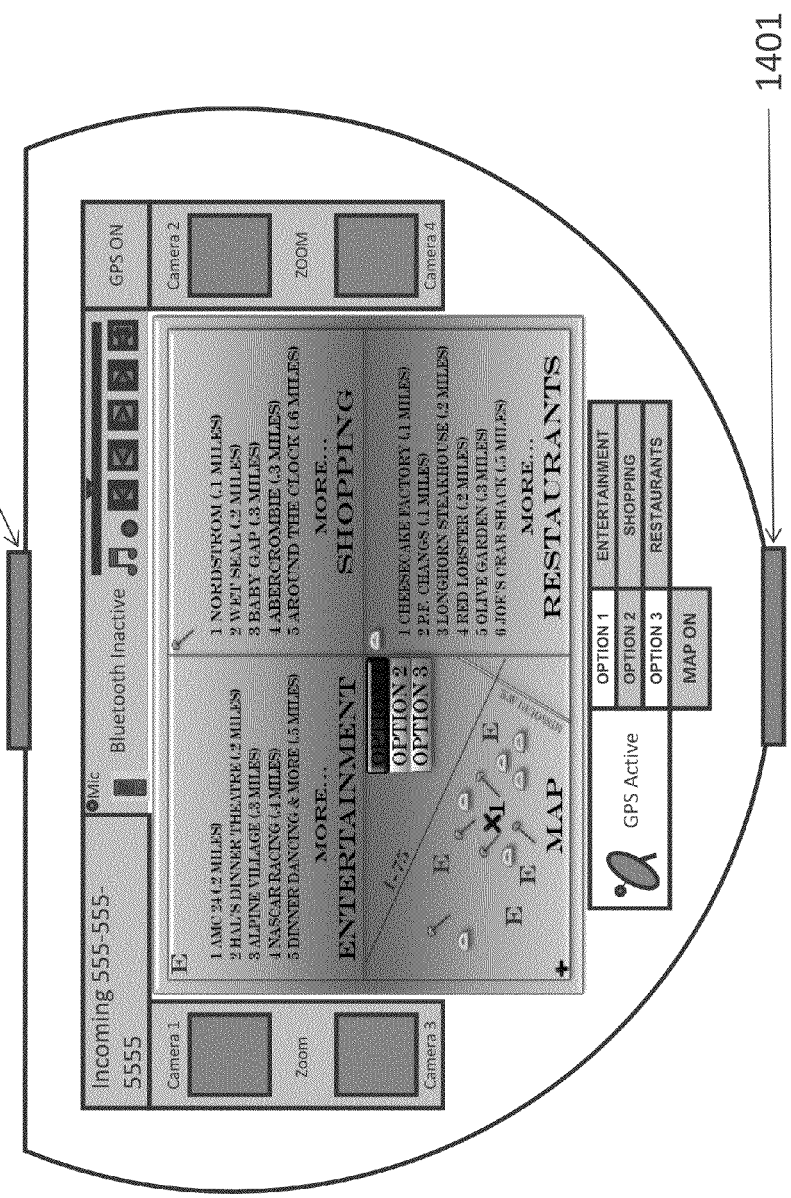
Figure 14C:
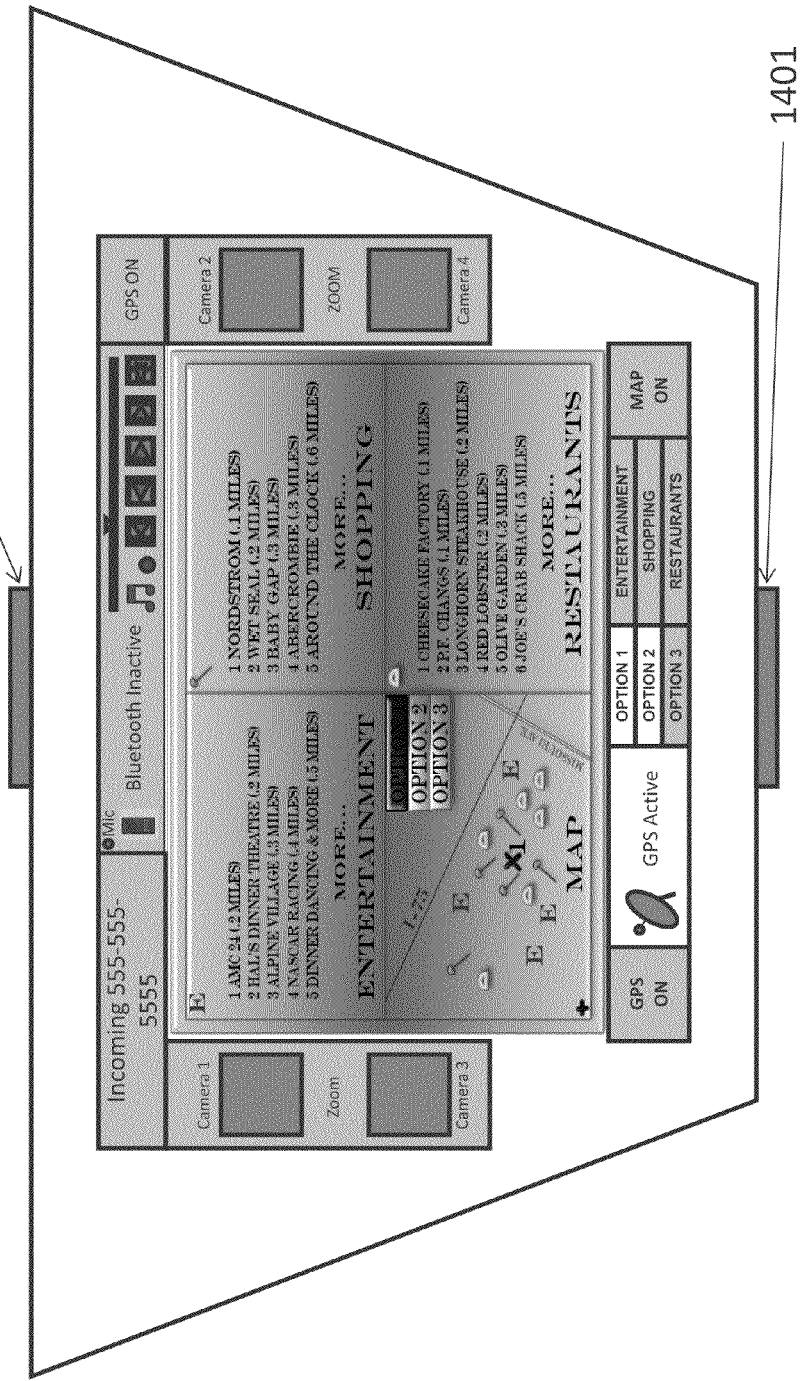

FIGS. 14A-14C illustrate embodiments of a steering wheel cover for an automobile modified to include the mobile marketing interface of FIG. 13. As illustrated, the mobile device capabilities may be incorporated into a steering wheel cover including snaps 1401 for attaching the interface to the customer's steering wheel to facilitate use while traveling. Of course, as desired for safety reasons, the interface could only be operable while the vehicle is stationary. FIG. 14A illustrates a full screen on a round steering wheel cover; FIG. 14B illustrates a semi-circular steering wheel cover; and FIG. 14C illustrates a flat steering wheel cover.

Figure 15A:
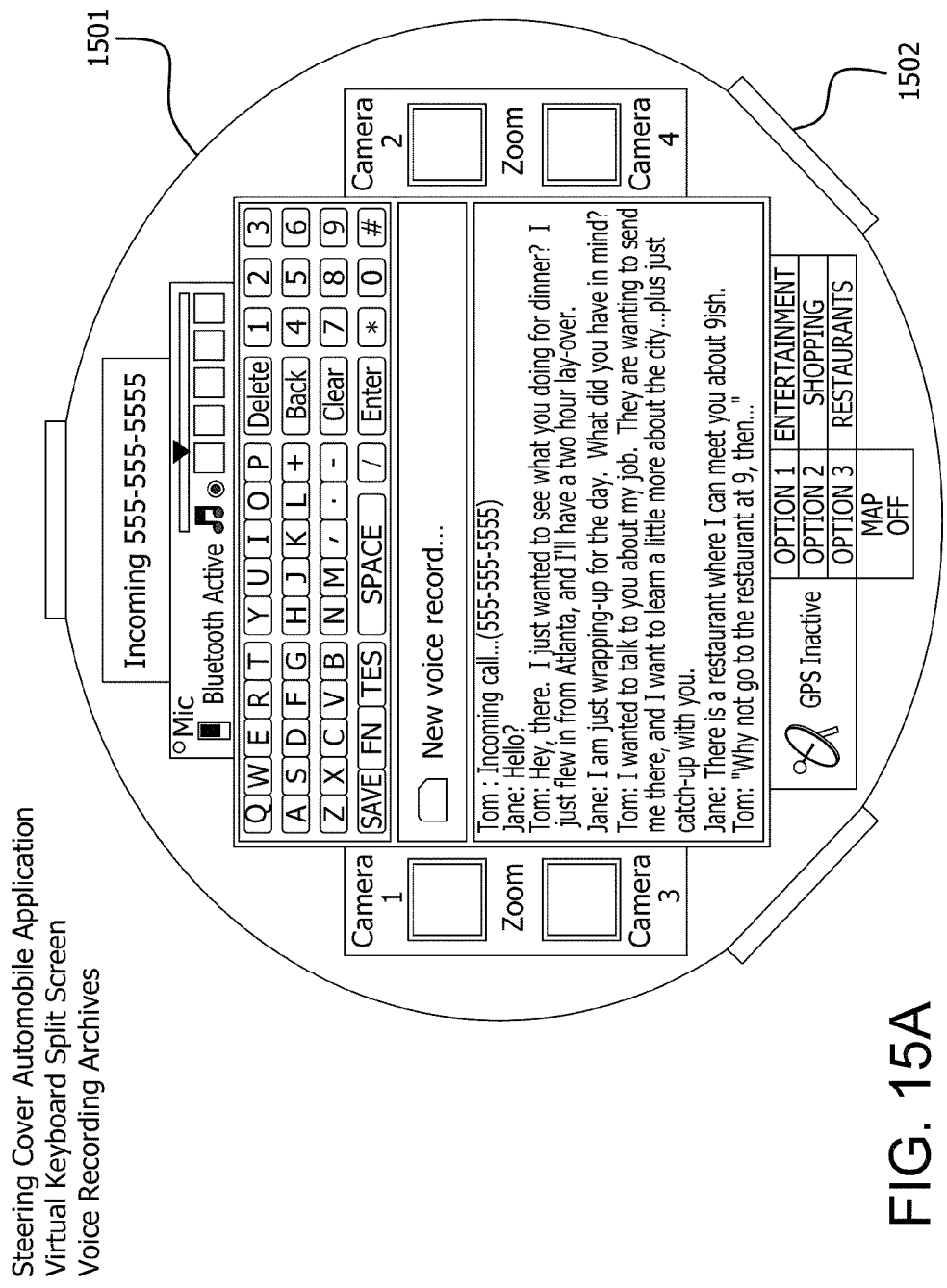
FIGS. 15A-15B together illustrate the steering wheel cover of the embodiments of FIG. 14 modified to include voice recording archives.
Figure 15B:
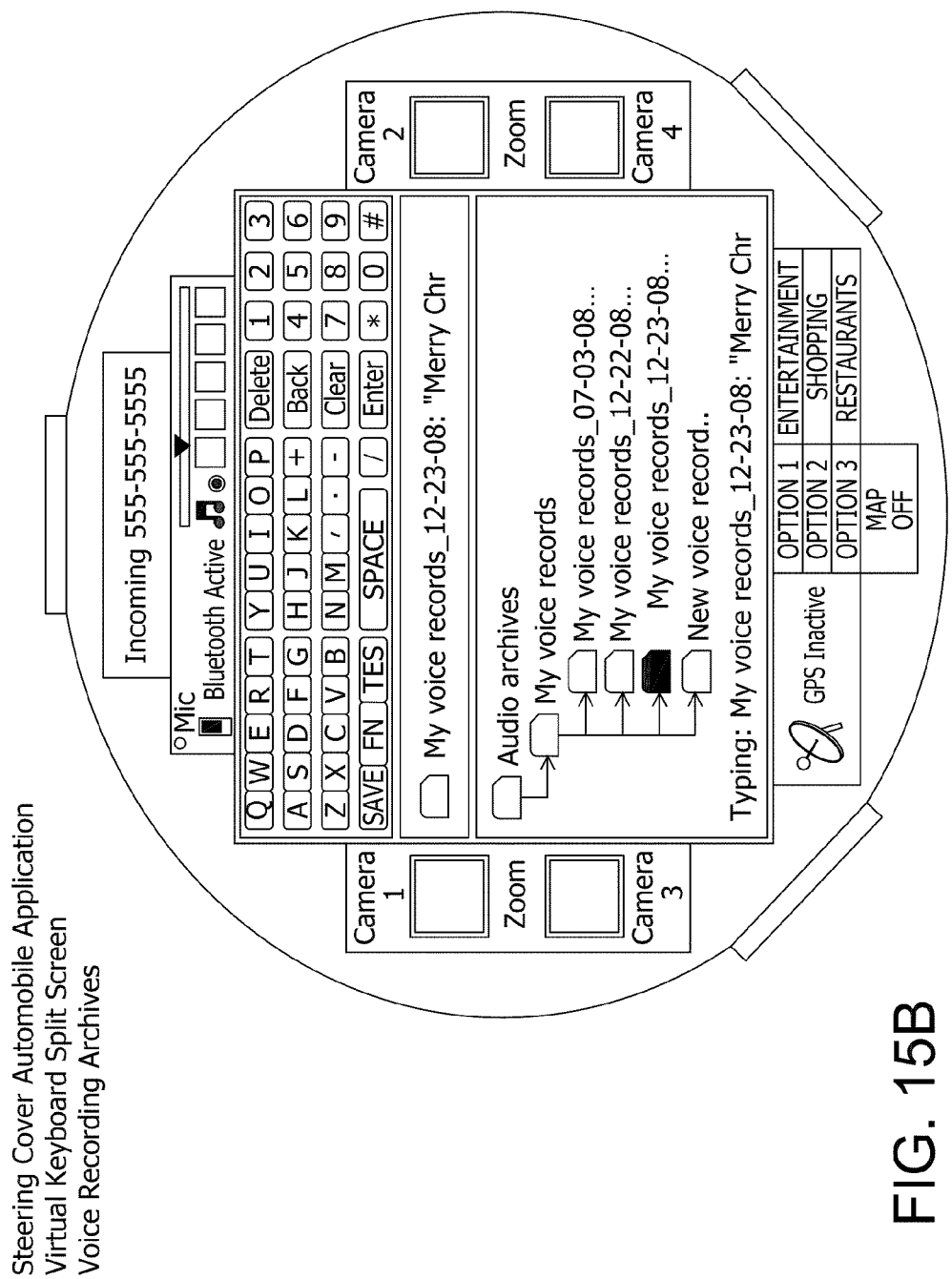

FIGS. 15A-15B together illustrate the steering wheel cover of the embodiments of FIG. 14 modified to include voice recording archives. As illustrated, a virtual keyboard 1501 may be presented on the display in addition to a voice recording screen 1502.

Figure 16A:
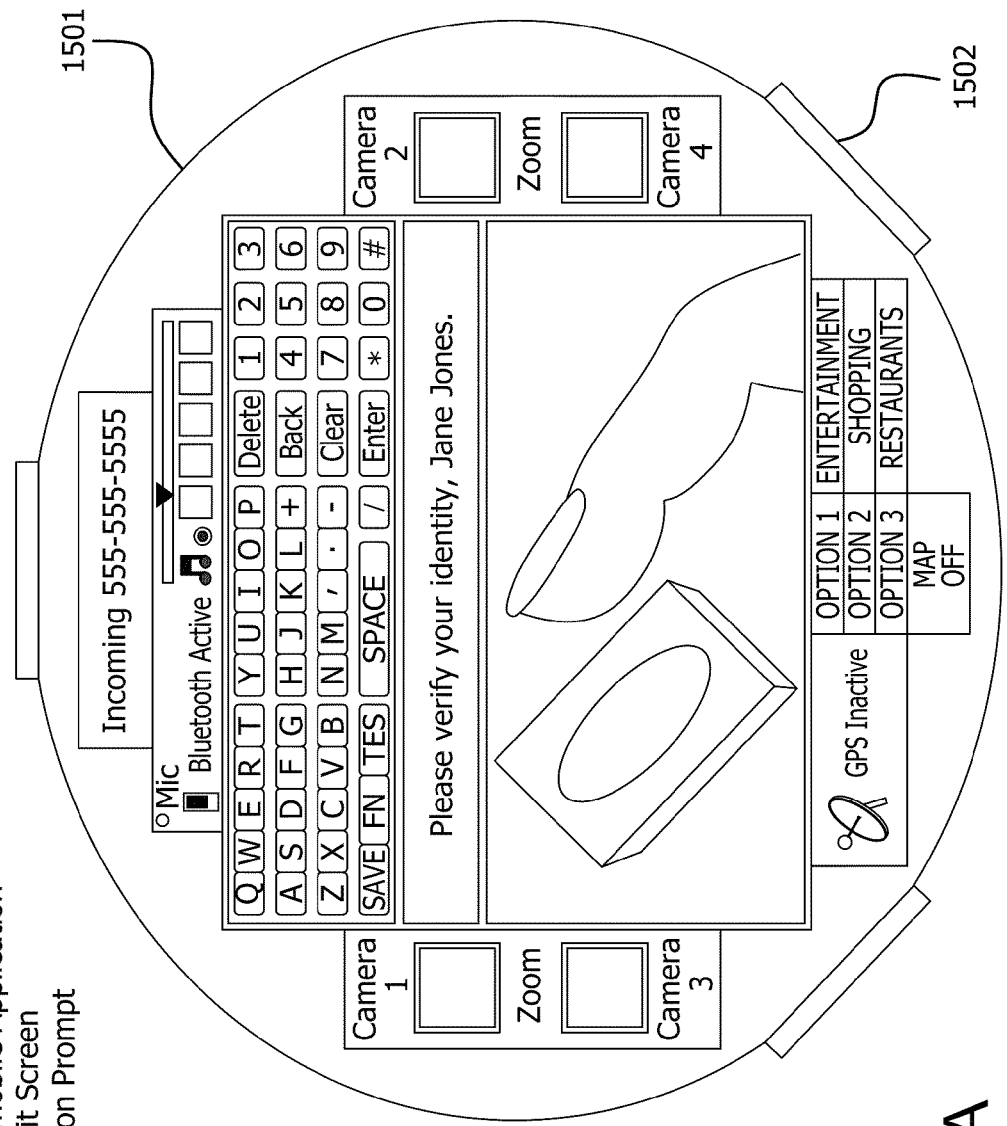
FIGS. 16A-16C together illustrate log-in verification for the user of the system embodied in FIGS. 13-15.
Figure 16B:
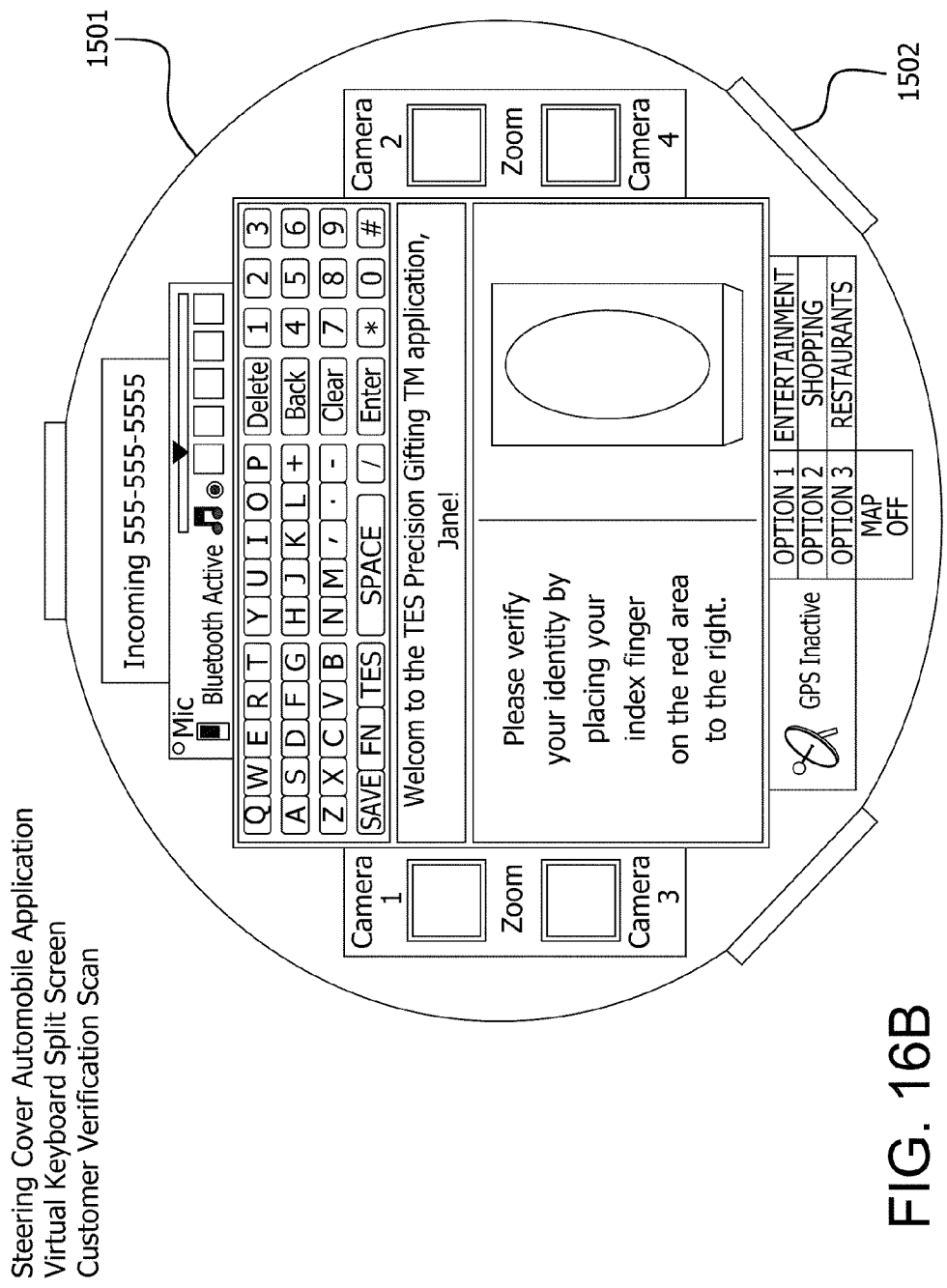
Figure 16C:
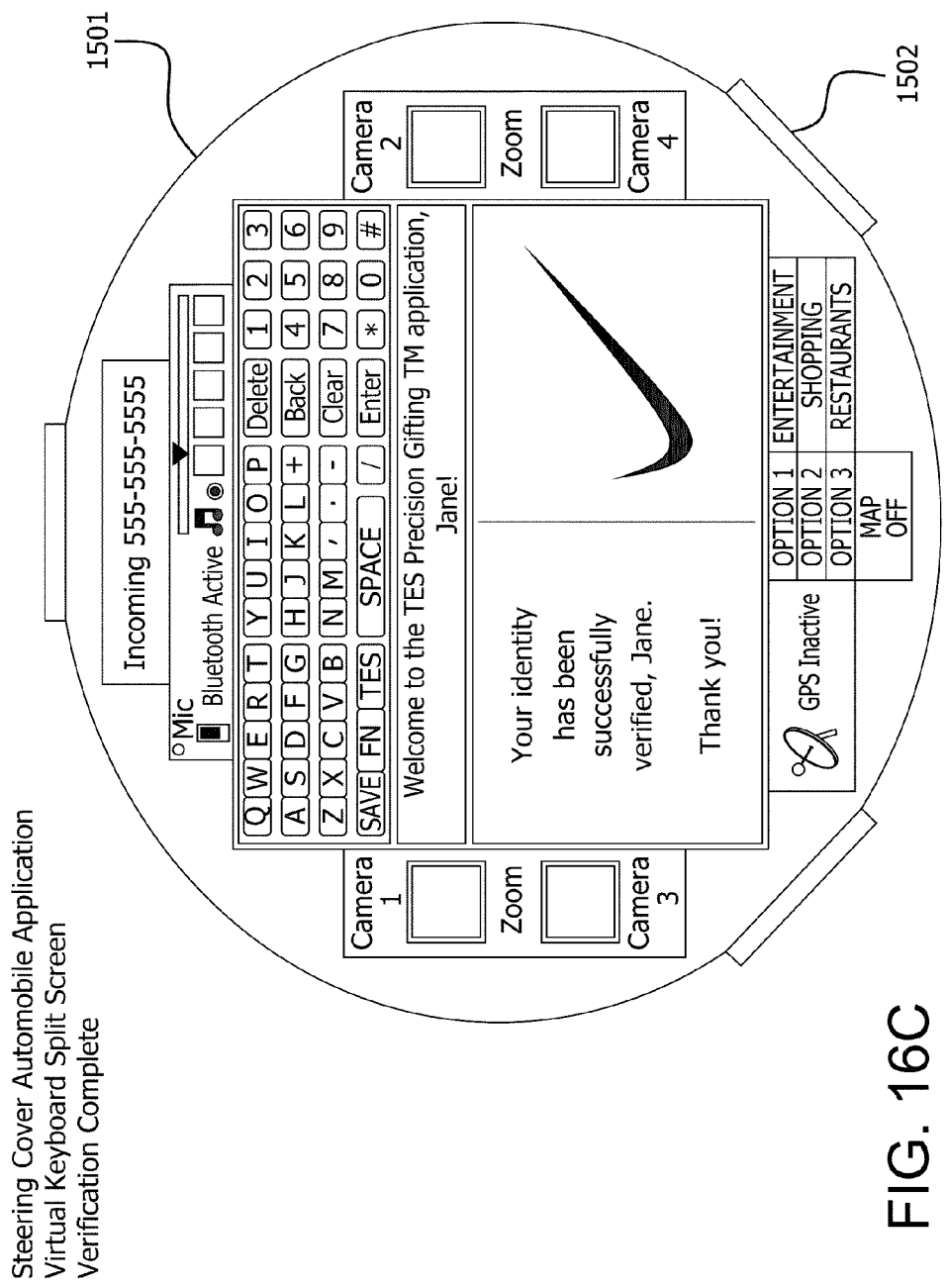

FIGS. 16A-16C together illustrate log-in verification for the user of the system embodied in FIGS. 13-15. This mechanism enables access to the database via the illustrated interface to be limited to authorized system users in a conventional fashion.

Many safety features may be encompassed within the Invention's flat touch screen design. For example, one-touch voice recording is made easy by pressing a red button to the left of the audio controls. The voice recording pauses when three or more seconds have gone by without audio. After ten additional seconds, the archive is stopped and stored automatically. Additionally, the one-touch recording feature is especially helpful to a customer that needs to record a phone conversation, as in FIG. 15A. As the call is in process, the customer will need to simply press the red record button on to begin the recording process. When the call ends, the recording will stop and the file will be saved as an archive, as illustrated in FIG. 15A. As illustrated, the system may provide a virtual keyboard 1501 usable by the customer when the vehicle is not moving and a voice recording screen 1502 that illustrates the stored voice. The saved archives will be stored in the customer's profile in the system under an audio records file as shown in FIG. 15B. These files may be accessed using the application or via the Web in the customer's profile by using a verification process that includes a customer verification screen 1601 (FIG. 16A) that encourages the customer to verify his/her identity using, for example, a biometric scan of an index finger as illustrated in FIG. 16B. The customer is granted access if the biometric scan is successful, as illustrated in FIG. 16C.

Moreover, a hands-free phone option, made possible by Bluetooth technology, allows the customer to speak into the microphone, which is embedded within the device, featured in the top, left-hand corner. All audio displays, such as the application described above, is located at the top of the interface, within the customer's vision of the road for additional safety. Furthermore, when an incoming call is received by the customer's phone, he/she can view the incoming phone number on the display screen at the top the device's display screen, as illustrated in FIGS. 14-16. This is yet another safety feature, helping the customer to maintain a full view of the road ahead. While stopped, the customer can utilize the voice recording and voice recognition feature noted above. This feature prints the script of the conversation in progress on the split screen 1502. As the customer speaks, using the voice recognition and Bluetooth applications, he/she can view the conversation's script.

Other audio features include volume control, station/song selection, hands-free mute options, and one-touch voice recording. All of these options, with the exception of one-touch voice recording, are duplicated within the vehicle's existing electronic component design. When the device's hands-free phone option is in use, the vehicle's LCD will show the message, "incoming call." Simultaneously, the vehicle's speaker system and the Invention's "Mic" will be used by the customer to take the call, when he/she touches the phone number display. In other words, the customer accepts an incoming call by simply touching the number displayed. The device will use the existing Bluetooth system, in this way, to block all other audio.

Another possible feature is a camera incident recording feature. If the vehicle's sensors detect an accident has occurred, the cameras can capture and store an unaltered image of what the camera witnessed. The image will then be stored in the customer's profile account, under a photo share archive of the customer's profile in the system. This time/date stamped photo can then be shared with the customer's auto insurance carrier via the photo share file, in the system described above.

For best results, the device can be ordered with the customer's vehicle, as a package option, and hard-wired to all of the component application systems. Although the design of the touch screen application will look identical to the after-market design, the surface of the device can be customized to suite the interior of the automobile.

In order to access the customer's profile using the device, the customer will simply type or speak in his/her user name, using the virtual keyboard 1401 on the log-in screen or voice activation feature. Then, the customer will verify his/her password with his/her finger scan in the box indicated on the touch screen shown on the log-in page, as well as pages on the server that are password protected, such as Precision Purchasing™ and Precision Gifting™. The customer may set the level of security in his/her profile for each option as another measure of safety.

Figure 17A:
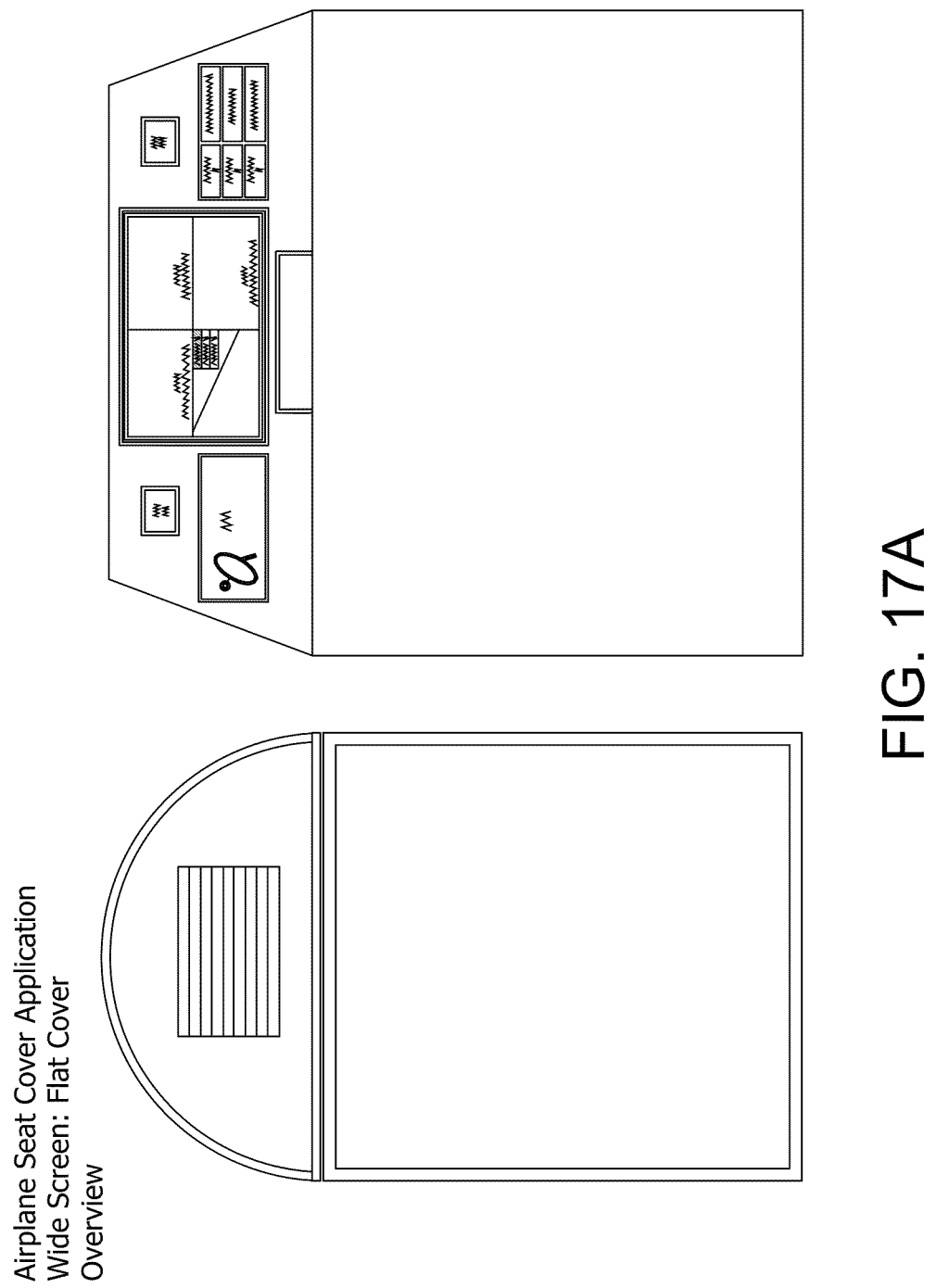

FIGS. 17A-17C illustrated embodiments of an airplane seat cover modified to include the mobile marketing interface of FIG. 13. As illustrated, the dimensions of the display are selected to fit into the back of the headrest with controls on either side of the display screen for ease of use. The display screen may also be a menu driven touch screen.

System Characteristics

The system of the invention includes a unique database that maintains personal, business and other profiles for individuals in many individual categories and across combinations of categories. An access system enables a user to access his/her database from anywhere at any time and to make purchases, including "Cardless" purchases based on the user's profiles and a payment system tied to the user's account. Numerous applications may be used to take advantage of the user's profile for user by the user and other members of the user's personal and professional network. These features of the invention will become more apparent from the following description.

Database Composition

The database maintains profiles of the customer across several different profile categories. In an exemplary embodiment, the database maintains profiles for data in the following categories:

1. Restaurant (Restaurants, Starbucks, Cold Stone Creamery, etc. . . . )

2. Hospitality (ex: Hotels, Casinos, Disney World, etc. . . . )

3. Travel (ex: Airlines, Destination Vacation Resorts, Travel Packages, etc. . . . )

4. Shopping (ex: Retail Shopping, Resale Shopping, Gift Shopping, etc. . . . )

5. Entertainment (ex: Theatre, Ballgame, Dave & Busters, etc. . . . )

Members (customers) may input data into his/her business and/or personal online profile into one or more of these five categories. Customers may also choose to combine data into packages that transcend individual categories in a combination of services and data preferences. Additionally, he/she may use the other services that are offered on the web interface application in order to incorporate and enhance the ease of access to other services. In exemplary embodiments, these auxiliary applications help to make the most effective use of the user-friendly web interface application by adding services like social networking, information sharing, and other like services.

The database accessed via the web interface permits a customer to combine his/her personal/business e-mail addresses, social networking, special interests, and other such services into one profile account and then to choose to share his/her personal/business data via the social networking and sharing services offered on the web interface with others within his/her personal/business network. This is just another way that the data may be used in a web interface application as described herein.

Also, at any touch screen, mobile, or web interface application, customers can access his/her account via personal identification that includes magnetic scan, user name, e-mail address, and/or other methods of identification and biometric scan, password, and/or other methods of personal identification verification. Customers can make most effective use of accessing his/her personal/business profile by electing to use Cardless options as described herein, whereby a customer can add data to his/her profile and pay for services without the use of cash, check, or credit/debit card.

Once the customer has accessed his/her personal/business profile, using any of the afore-mentioned methods of access, he/she can specify precision preferences. For example, in the Restaurant category the customer may specify: "Chicken only, no sauce, medium-well, vinaigrette, no ice, soy desserts only, etc. . . . ." Similarly, in the Travel category, a customer may choose the following preferences: "First class, Package Service, window seat, no sugar/no cream, no peanuts, etc. . . . ." Also, in the Shopping category, the customer can detail his/her buying preferences according to season, designer, color, mood, pregnancy, etc. One can do this by setting his/her preference in the Shopping category to suit his/her desires; for example, for clothing: "Athletic cut, pastel colors, size 2, slim, short, v-neck, low cut, low rise, Seven, Juicy, spring line timeline (February-April: Shopping Window), pregnancy timeline (March-December: Shopping Window). Similarly, for electronics the user may specify: all digital, HDMI, SD, USB, full data capability, etc. . . . already assembled, delivery (up to but not to exceed $10), delivery (up to but not to exceed 12 days from date of purchase), middle price point (compare 5 hi-low end products), neutral colors, oak only, etc. . . . ."

Of course, some of the categories will overlap, for example Hospitality and Travel. Where the system of the invention may be most effective is through support of cross-category preference details. This enables customers to select from a multitude of preferences, for example in order to detail an entire vacation, using the preference database for all services. In other words, customers can make future vacations simple by storing these preferences in his/her profile on the database so that only options that apply to his/her specific desires are offered in his/her profile. Even more user-friendly than that is the ability that customers have to set a Travel Window, where he/she chooses when to be solicited with only offers that apply to his/her preferences and that of his/her travel companion(s). Adding, inviting, chatting, and sharing service options make this possible and easier for each travel opportunity. FIGS. 9A-9C are illustrative.

The same preferences can be applied and restricted from others, as well, in the database profile system. Customers can choose whom he/she would like to add and can restrict access to what they can see. For example, a customer's spouse may be the only family/friend/associate with access to a customer's underwear preference. Moreover, for security reasons, it is desirable that members' information not be shared with any third party. The owner of the system described herein will acquire the customer's permission to use their preference and purchase profiles for use by any consultants or vendors within the network or companies outside of the network.

Accessing the Database

As noted above, the database is characterized by a number of profiles for each customer that may be personal and/or business profiles. Such profiles include inputs (ex: meal pre-order, event ticket order, gift registry location . . . ) and presets (ex: size 6, athletic cut, front row seating only, water only, etc. . . . ) as well as windows (ex: dates available, seat section preference, time request, etc. . . . ) and data regarding actual purchases at vendor locations. The data in the customer's personal and/or business profiles may be accessible to varying degrees by the customer's friends, family, business colleagues, and others ("associates") within the network.

Members (customers) can choose from two options in order to access his/her personal and/or business profile stored on the database under his/her member account. The purchasing options are as follows: Precision Purchasing™ and Precision Gifting™. While these options can be used exclusively by a customer, he/she may also further specify his/her profile(s) by adding inputs, presets, windows, and other tools in the database to make purchases for his/her selves and/or others within his/her network, according to his/her privacy settings and associate user qualification requirements. He/she may make changes, even onsite at a kiosk. In addition, a customer can access his/her member account for a Precision Purchasing™ and Precision Gifting™ by using a Cardless service, whereby he/she can use the dollars within his/her profile to receive discounts and apply payment to a party's order prior to the party's order being processed and prepared, as in the Restaurant example above. Also, touch screen table applications make it convenient for users to pay at the table, as well. Customers can use these applications to make changes to the order, for example adding dessert or a take-out order to the party's or individual's order.

In a table or free-standing touch screen application at or near vendor locations in the Hospitality, Travel, Shopping, or Entertainment categories, customers can access his/her member account, on-the-go. Furthermore, while waiting in an airport terminal, seated on a plane, parked in an automobile, standing in a lobby/vestibule/mall, or nearby a vendor location, customer's can access his/her profile to make changes, purchases, and additions.

Technology advancement continues to make it easier to access a customer's personal/business profile account. For example, mobile devices may be used to access a customer's account, where he/she can add preferences, make purchases, and other convenient services to save time in his/her day. Once a profile account is detailed in each category, customers can access a combination of categories in order, for example, to make travel arrangements on-the-fly using his/her mobile device. In the example shown below, three options are provided that yield to every customer a personal/business profile criteria which is set in his/her account. The options will populate based on the profile criteria which may include all categories.

The customer's account allows him/her to access information based on the GPS which is a feature of his/her mobile device. Therefore, the system of the invention will populate distances and applicable maps to the desired vendor's locations. One can also choose from three or more options, according to his/her preset preferences. Going a step further with the same technology, a GPS Zone is identified by the satellite coordinates of a vendor's location. Using these coordinates, a customer's order is triggered by the customer's unique mobile phone identification and the order is put into queue once the customer has crossed the plane of the GPS Zone. The customer's device at either a walk-up or drive-up GPS Zone allows pre-ordered events to be processed without proper check-in. When the customer arrives at an onsite touch screen application, he/she will need only verify his/her identity and modify/approve his/her order in queue. The system thus enables on to arrive, verify, pay, and go.

Another way that a customer's mobile device can improve the efficiency in the system of the invention is that one can invite others to join an event, via text or e-mail, any time and any place. The look of the screen is a little simpler than the web application, but almost all of the same capabilities are available to customers via his/her mobile device.

Those skilled in the art will further appreciate that the system described herein offers many time-saving features to users. For example, in the case of travel, particularly air travel, a touch screen kiosk may populate the customer's pre-registration as the customer approaches based on detection of the customer's mobile device using GPS Zone technology described herein. Once biometric approval is provided, the ticket may be printed. Similarly, in the case of a car rental, the pre-registered rental documents may be printed upon the approach of the user to, and biometric approval at, a self-service kiosk. On the other hand, in a hospitality embodiment, even if a customer's room number changes, the orders (e.g., luggage service) may be transferred according to the updated room information using real-time updating. In an entertainment embodiment, the customer may have a touch screen device at the customer's seat so that the customer may order items for delivery to the customer's seat. For example, at a baseball game, the customer could request a beer and a hot dog for delivery in the $4^{th}$ inning and a beer and nachos for delivery in the $7^{th}$ inning to the customer's seat. Moreover, in a retail embodiment, the customer's profile may be accessed even when the customer is on a business trip or at a favorite vacation spot to select retail items for delivery to the customer's home, for example. A multitude of other such embodiments enabled by the system of the invention will become apparent to those skilled in the art.

Thus, on the whole, the system of the invention is a purchasing and gifting system as well as a profile database system. There are many service options that enhance its ease of use, adaptability, and personalization to one's lifestyle; however, the system is unique in its ability to combine all customer data: preferences, timelines, purchases, gifting, data share, and interaction with others within a network.

SUMMARY

The efficiency system of the invention frees service providers to spend more time on actual customer service with many attendant benefits including customization of services to the customer, reduced wait time for the customer, increased turnover and profits for the service provider, improved direct marketing options for the service provider, and better records of customer purchases. For example, the records may be used by the customer to access/track purchases for insurance, tax, or other security purposes. These and other beneficial characteristics will be apparent to those skilled in the art based on the above-mentioned features of the invention.

It should be understood that this invention is not limited to the particular embodiments disclosed, but it is intended to cover modifications within the spirit and scope of the present invention as defined by the appended claims. The invention is intended to cover all aspects of consumer purchasing whereby a consumer may select products and/or services in any and all categories of the consumer profile database of the invention, including categories other than restaurants, travel, shopping, hospitality and entertainment. Also, the consumer selections may be made as part of a single event or as part of a tour of events. Those skilled in the art will further appreciate that the method of the invention may be implemented in software and distributed using a computer storage medium and that such software may be processed by a computer processor to convert a general purpose computer into a special purpose processing system that implements the functional characteristics of the software as herein described. Also, the reservations including the food order and the shopping events, etc. may be printed out at the on-site kiosk and handed to the hostess or attendant for those situations where the hostess or attendant does not have access to a computer that may received the reservation/event electronically. All such aspects of the invention are intended to be covered by the appended claims.

What is claimed:

1. A system that stores customer purchasing and preference data and enables a customer to pre-register orders and events, the system comprising:
    a database configured to store:
        purchasing and preference data in customer profiles for a plurality of customers, said customer profiles configured to be updated with new purchases as new transaction are performed and new preference data, the new preference data being provided by the customer; and,
        vendor data related to at least one vendor within a network of vendors, said vendor data pertaining to products or services available from the at least one vendor within said network of vendors
    a data management system operative to:

allow an ordering customer of said plurality of customers to pre-register an order or event with a selected vendor of said network of vendors, said order or event relating to at least one product or service offered by the selected vendor;

pre-register the order or event with the selected vendor;

enable a customer to provide gift dollars or gift credits to the account of another customer in the system; and, push promotional offers targeted to the ordering customer based on the ordering customer profile when the ordering customer has approved vendor access to the ordering customer's profile, wherein the ordering customer profile includes an indication of how the ordering customer desires to receive promotional offers;

at least one vendor GPS zone detection device associated uniquely with the one or more selected vendors operative to:

detect a GPS-enabled mobile device of the ordering customer entering a defined vendor GPS zone specific to the selected vendor utilizing a GPS feature of the mobile device;

present the pre-registered order or event via the mobile device of the ordering customer and solicit approval from the ordering customer for the pre-registered order or event; and, responsive to the ordering customer approving the pre-registered order or event, populate the pre-registered order or event to the selected vendor;

an onsite vendor touchscreen device located at the selected vendor comprising a touchscreen interface, the onsite vendor touchscreen device communicatively coupled to the at least one vendor GPS zone detection device and operative to:

automatically identify the ordering customer upon arrival of the ordering customer at the selected vendor;

display information related to the pre-registered order to the ordering customer via the touchscreen interface;

receive input via the touchscreen interface from a customer approving the pre-registered order.

2. The system of claim 1, wherein each customer profile includes at least the customer's purchases and preferences for restaurants, shopping, travel, hospitality, entertainment, or combinations thereof.

3. The system of claim 2, wherein said customer profiles include at least a business customer profile and a personal customer profile for each customer.

4. The system of claim 1, wherein the onsite vendor touchscreen device comprises a freestanding kiosk touchscreen device or a countertop touchscreen device.

5. The system of claim 1, wherein a customer's profile(s) are related to a bank account whereby the customer may make cardless purchases from vendors within the network of vendors based on authentication of the customer as belonging to a particular customer profile.

6. The system of claim 1, wherein the data management system provides the customer with access to a pre-registered order or event of the customer upon the customer's entry into said particular area.

7. The system of claim 1, further operative to allow the selected vendor to provide a targeted discount offer, special offer, or gifting option to the customer based on the pre-registered order or event.

8. The system of claim 1, further operative to allow a vendor to use the customer profile of a customer with the determined location of the customer to generate alerts regarding entertainment or shopping options in the vicinity of the customer during a particular time period.

9. A method for storing customer purchasing and preference data and enabling a customer to pre-register orders and events comprising the steps of:

storing, in a database:

purchasing and preference data in customer profiles for a plurality of customers; and, vendor data related to at least one vendor within a network of vendors, said vendor data pertaining to products or services available from the at least one vendor within said network of vendors;

updating, by a data management system, said customer profiles with new purchases as new transaction are performed and new preference data, the new preference data being provided by the customer;

pre-registering, via the data management system, an order or event with a selected vendor of the network of vendors by an ordering customer;

detecting, by a vendor GPS zone detection device associated uniquely with the selected vendor, a GPS-enabled mobile device of the ordering customer entering a defined vendor GPS zone specific to the selected vendor utilizing a GPS feature of the mobile device;

presenting, via the mobile device of the ordering customer, the pre-registered order or event;

soliciting approval from the ordering customer for the pre-registered order or event;

responsive to the ordering customer approving the pre-registered order or event, populating the pre-registered order or event to the selected vendor;

automatically identifying, by an onsite vendor touchscreen device communicatively coupled to the at least one vendor GPS zone detection device, the ordering customer upon arrival of the ordering customer at the selected vendor;

displaying, on the onsite vendor touchscreen device, information related to the pre-registered order to the ordering customer via a touchscreen interface;

receiving input from the ordering customer via the touchscreen interface approving the pre-registered order;

wherein, a profile of the ordering customer includes:

an indication that the ordering customer has approved vendor access to the profile of the ordering customer for use in targeting promotional offers to the ordering customer, and, an indication of how the ordering customer desires to receive promotional offers;

pushing promotional offers from at least one vendor to the ordering customer based at least on the location of the ordering customer, purchase history and preferences of the ordering customer, the location of the ordering customer, and the indication of how the ordering customer desires to receive promotional offers; and, providing a mechanism which enables the ordering customer to provide gift dollars or gift credits to the account of another customer.

10. The method of claim 9, wherein each customer profile includes at least the customer's purchases and preferences for restaurants, shopping, travel, hospitality, entertainment, or combinations thereof.

11. The method of claim 10, wherein said customer profiles include at least a business customer profile and a personal customer profile for each customer.

12. The method of claim 9, wherein the onsite vendor touchscreen device comprises a freestanding kiosk touchscreen device or a countertop touchscreen device.

13. The method of claim 9, further comprising relating a customer's profile(s) to a bank account whereby the customer may make cardless purchases from vendors within the network of vendors based on authentication of the customer as belonging to a particular customer profile.

14. The method of claim 9, further comprising accessing the ordering customer's profile via an interface of a handheld device.

15. The method of claim 9, further comprising queuing the pre-registered event or order for delivery by the vendor upon validation of the ordering customer.

16. The method of claim 9, further comprising using, by the selected vendor, the pre-registered order or event to provide a targeted discount offer, special offer, or gifting option to the ordering customer.

17. The method of claim 9, further comprising a vendor using the customer profile of a customer with the determined location of the customer to generate alerts regarding entertainment and/or shopping options in the vicinity of the customer during a particular time period.

18. A system that stores customer purchasing and preference data and enables a customer to pre-register orders and events, the system comprising:

a database configured to store:

purchasing and preference data in customer profiles for a plurality of customers, said customer profiles configured to be updated with new purchases as new transaction are performed and new preference data, the new preference data being provided by the customer; and, vendor data related to at least one vendor within a network of vendors, said vendor data pertaining to products or services available from the at least one vendor within said network of vendors a data management system operative to:

allow an ordering customer of said plurality of customers to pre-register an order or event with a selected vendor of said network of vendors, said order or event relating to at least one product or service offered by the selected vendor;

pre-register the order or event with the selected vendor;

push promotional offers targeted to the ordering customer based on the ordering customer profile when the ordering customer has approved vendor access to the ordering customer's profile, wherein the ordering customer profile includes an indication of how the ordering customer desires to receive promotional offers;

a point of service based remote access device comprising a touchscreen interface, the remote access device configured to be mounted in a vehicle and operative to:

receive input to begin a recording process from the ordering customer;

record voice data received from the mobile device of the ordering customer;

cause the recorded voice data to be stored in the profile of the ordering customer;

provide access to the stored voice data responsive to verification of the ordering customer.

19. The system of claim 15, wherein the vehicle includes an automobile or an airplane.

* * * * *